US011449533B2

(12) United States Patent
Williams et al.

(10) Patent No.: US 11,449,533 B2
(45) Date of Patent: Sep. 20, 2022

(54) CURATING KNOWLEDGE FOR STORAGE IN A KNOWLEDGE DATABASE

(71) Applicant: entigenlogic LLC, Schaumburg, IL (US)

(72) Inventors: Frank John Williams, Rossmoor, CA (US); David Ralph Lazzara, Huntington Beach, CA (US); Stephen Chen, Wheaton, IL (US); Karl Olaf Knutson, Palatine, IL (US); Jessy Thomas, Palatine, IL (US); David Michael Corns, II, Elgin, IL (US); Andrew Chu, St. Charles, IL (US); Gary W. Grube, Barrington Hills, IL (US)

(73) Assignee: entigenlogic LLC, Schaumburg, IL (US)

( * ) Notice: Subject to any disclaimer, the term of this patent is extended or adjusted under 35 U.S.C. 154(b) by 480 days.

(21) Appl. No.: 16/257,923

(22) Filed: Jan. 25, 2019

(65) Prior Publication Data

US 2019/0258655 A1 Aug. 22, 2019

Related U.S. Application Data

(60) Provisional application No. 62/633,638, filed on Feb. 22, 2018.

(51) Int. Cl.

| | |
|---|---|
| ***G06F 16/31*** | (2019.01) |
| *G06F 40/58* | (2020.01) |
| *G06F 17/18* | (2006.01) |
| *G06N 5/02* | (2006.01) |
| *G06F 40/30* | (2020.01) |
| *G06F 40/289* | (2020.01) |

(52) U.S. Cl.
CPC ............ *G06F 16/313* (2019.01); *G06F 17/18* (2013.01); *G06F 40/289* (2020.01); *G06F 40/30* (2020.01); *G06F 40/58* (2020.01); *G06N 5/022* (2013.01)

(58) Field of Classification Search
CPC ........ G06F 16/313; G06F 17/18; G06N 5/022
See application file for complete search history.

(56) References Cited

U.S. PATENT DOCUMENTS 6,175,834 B1 1/2001 Cai
6,253,170 B1 * 6/2001 Dolan .................. G06F 40/247 704/10

(Continued)

*Primary Examiner* — Miranda Le
(74) *Attorney, Agent, or Firm* — Gary W. Grube

(57) ABSTRACT

A method includes generating a plurality of entigen groups from a plurality of phrases, where the plurality of entigen groups represents a plurality of most likely meanings for the plurality of phrases. The method further includes determining an initial interpretation of the related topic based on the plurality of most likely meanings for the plurality of phrases and generating a plurality of scores for the plurality of entigen groups based on the initial interpretation and source information of the plurality of phrases. The method further includes interpreting the plurality of scores in relation to the initial interpretation to determine a confidence level of the initial interpretation and when the confidence level of the initial interpretation compares favorably to a confidence threshold, indicating that the initial interpretation is reliable.

12 Claims, 58 Drawing Sheets

(56) References Cited

U.S. PATENT DOCUMENTS

| | | | | |
|---|---|---|---|---|
| 6,487,545 | B1 * | 11/2002 | Wical | G06F 40/268 706/45 |
| 7,707,204 | B2 * | 4/2010 | Li | G06F 16/313 707/711 |
| 8,135,715 | B2 * | 3/2012 | King | G06F 16/313 707/737 |
| 8,744,835 | B2 * | 6/2014 | Abir | G06F 40/45 704/9 |
| 8,924,436 | B1 * | 12/2014 | Fortuna | G06F 40/143 707/811 |
| 9,171,267 | B2 * | 10/2015 | Ocke | G06N 20/00 |
| 9,489,370 | B2 * | 11/2016 | Onishi | G06F 40/30 |
| 2003/0097251 | A1 | 5/2003 | Yamada | |
| 2008/0208569 | A1 | 8/2008 | Simpson | |
| 2009/0070312 | A1 * | 3/2009 | Patterson | G06F 16/313 |
| 2014/0122239 | A1 * | 5/2014 | Depasquale | G06Q 30/0261 705/14.58 |
| 2014/0127647 | A1 * | 5/2014 | Petri | G09B 19/0053 434/118 |
| 2015/0006563 | A1 * | 1/2015 | Carattini | G06F 16/24534 707/765 |
| 2016/0132773 | A1 * | 5/2016 | Chandrasekaran | G06N 5/04 706/11 |
| 2016/0147979 | A1 | 5/2016 | Kato | |

* cited by examiner

FIG. 7C

| synonym words table 570 | | | |
|---|---|---|---|
| textual words 572 | identigen 518 | | entigens 520 |
| | meaning ID 538 | instance ID 540 | |
| car | 50 | 001 | e1000 |
| automobile | | 002 | |
| auto | | 003 | |
| bil (Swedish) | | 004 | |
| carro (Spanish) | | 005 | |
| bil (Danish) | | 006 | |

FIG. 7D

| polysemous words table 576 | | | |
|---|---|---|---|
| textual words 572 | identigen 518 | | entigens 520 |
| | meaning ID 538 | instance ID 540 | |
| duck (bird) | 116937 | 001 | e2000 |
| duck (fabric) | 116938 | 001 | e2001 |
| duck (to submerge) | 112195 | 056 | e2002 |
| duck (to elude) | 010654 | 051 | e2003 |

words table 580

| textual words 572 | identigen (IDN) 518 | | | entigens (ENI) 520 |
|---|---|---|---|---|
| | meaning ID 538 | instance ID 540 | type ID 542 | |
| pilot (flyer) | 150 | 001 | itenym (item) | e717 |
| pilot (to fly) | 291 | 001 | actenym (action) | e4320 |
| Tom (person) | 457 | 001 | itenym (item) | e61 |
| Tom (male animal) | 648 | 001 | itenym (item) | e930 |
| tall (attribute - height) | 823 | 001 | attrenym (attribute) | e90 |
| tall (attribute - unlikely) | 399 | 001 | attrenym (attribute) | e729 |

apply rules to identigens of word strings to validate

| | | | | |
|---|---|---|---|---|
| pilot (to fly) | Tom (male an) | IDN 291.001 | IDN 648.001 | X |
| pilot (flyer) | Tom (male an) | IDN 150.001 | IDN 648.001 | X |
| pilot (to fly) | Tom (person) | IDN 291.001 | IDN 457.001 | X |
| pilot (flyer) | Tom (person) | IDN 150.001 | IDN 457.001 | ✓ |

| | | | | |
|---|---|---|---|---|
| tall (attribute - height) | Tom (male an) | IDN 823.001 | IDN 648.001 | ✓ |
| tall (attribute - unlikely) | Tom (male an) | IDN 399.001 | IDN 648.001 | X |
| tall (attribute - height) | Tom (person) | IDN 823.001 | IDN 457.001 | ✓ |
| tall (attribute - unlikely) | Tom (person) | IDN 399.001 | IDN 457.001 | X |

list valid groupings groupings table 584

| grouping ID 586 | word strings 588 | identigens (IDN) 518 | | | entigens (ENI) 520 | | |
|---|---|---|---|---|---|---|---|
| 3001 | pilot Tom | IDN 150.001 | IDN 457.001 | | e717 | e61 | |
| 3040 | tall Tom | IDN 823.001 | IDN 648.001 | | e90 | e930 | |
| 3041 | tall Tom | IDN 823.001 | IDN 457.001 | | e90 | e61 | |
| 3070 | tall pilot Tom | IDN 823.001 | IDN 150.001 | IDN 457.001 | e90 | e717 | e61 |

FIG. 7E groupings table 620

| | grouping (GRP) ID 586 | word strings 588 | IF string 622 | | THEN string 624 | |
|---|---|---|---|---|---|---|
| | | | IDN string 626 | ENI 628 | IDN string 626 | ENI 628 |
| | 5493 | If someone has a tumor, then someone is sick. | someone has | 12aa | someone sick | 12js |
| | | | tumor has | 06aa | | |
| | 5494 | If someone is sick, then someone is possibly sad. | someone sick | 12js | someone sad | 12ja |
| new knowledge inference 630 | 5495 | If someone has a tumor, then someone is possibly sad. | someone has | 12aa | someone sad | 12ja |
| | | | tumor has | 06aa | possibly sad | 05b |

FIG. 8B

CURATING KNOWLEDGE FOR STORAGE IN A KNOWLEDGE DATABASE

CROSS REFERENCE TO RELATED PATENTS

The present U.S. Utility Patent Application claims priority pursuant to 35 U.S.C. § 119(e) to U.S. Provisional Application No. 62/633,638, entitled "ANSWERING A QUESTION UTILIZING A KNOWLEDGE BASE," filed Feb. 22, 2018, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to generating data representations of data and analyzing the data utilizing the data representations.

Description of Related Art

It is well known that a massive amount of data is stored in information systems, such as files containing text. It is often difficult to extract useful information from this stored data. There is simply too much data for humans to analyze. While computers may be able to process data faster than humans, computers are challenged when it comes to comprehending concepts or even identifying context that is often helpful to understand the content of the data. Humans understand concepts and context, but cannot process the data like a computer.

It is well known that data is archived in computing systems as a more desirable alternative to pre-computer methods such as paper-document storage. Regardless of the reason why the data is found in the computing systems, the files created to communicate and store the data were created for human understanding, not necessarily for computer understanding. The information of the data can be even more useful if a truest possible meaning of the data can be identified in such a way as to enable sophisticated analysis. Computer systems struggle to understand the data since identifying the truest meaning has not been possible.

Understanding the content of data requires an ability to comprehend words people use to convey their thoughts. If the processing power of computers is to be relevant in the effort to mine massive data files, then a computerized approach must be able to comprehend text, not merely recognize patterns and apply statistical reasoning solutions. The promise of "Big Data" analytics has been difficult since the truest possible meaning of the data cannot be easily determined from massive storage repositories.

Relevant information is masked in an overwhelming volume of words due to ambiguities inherent in words. Increasing processor speed may reduce the challenge presented by data volume, but computer processing to produce the truest possible meaning of the words of the data words is an unmet need. Whether simply searching data files for specific elements of data or extracting specific elements from data for complex analysis, current technology is limited to search-and-retrieve operations driven by word-based pattern matching and statistical modeling. Therefore, even with increased computer processing power, the problem of understanding data still exists.

It is known that one such approach to determine truest meaning is to apply sophisticated pattern matching algorithms to identify similar word patterns in a user's query with those in the data. These algorithms have become quite pervasive, but the basic approach remains that of probabilistic scoring of queries and data indexes to establish the best match between query and data—i.e., statistical reasoning solutions. If a specific answer resides in the database, such as "George Washington was the first President of the United States", then current software can return that answer in response to the query, "Who was the first President of the United States?" The answer was explicit in the database. If the answer is not explicit in the data, then the matching algorithm will return a list of possible files where the answer might be found. It is then incumbent on a requester to read through the list of potentially relevant documents and find the answer implicit in the data.

A good example of the problem that such a lack of meaning understanding creates is demonstrated in the following; "Who died today?" In this simple three-word query, the requester wants to know the names of the people who died on this day. But a computer is challenged to comprehend this simple question. Instead, the computer algorithm focuses on the key words "died" and "today". Most algorithms are sufficiently sophisticated to deal with words similar to "died" or its general meaning, such as "death", "killed", "passed away", etc. But more challenging is dealing with the temporal nature of the word "today." Consequently, if one were to do an internet search with a "search engine", one would get about over 500,000 responses or hits—a list of links to over 500,000 uniform resource locators (URLs) to sift through. Even if a requester could open, read, and extract useful information from these URLs at the rate of one per second (which is not likely), it would take 150 person-hours (3.75 standard work weeks at 40-hours/week) to get through the entire list. But worse than that, because the computer algorithm did not understand the question, none of the results answer the question. Instead, the word-pattern matching returns a list of URLs that link to deaths: reported in media records with the word "today" in the title (e.g., "New York Today News"), that occurred today in history, or that were reported today, etc. When answering a query requires understanding both the query and the text files, word-based pattern matching is inadequate.

It is further well known that answering queries with current technology relies on the answer being explicit in the text. In order to increase the likelihood that an answer to a potential query will be explicit in the data, one known approach is to seed the data with answers to likely questions. For example, a super computer downloads large data base files and then sets an army of human experts to work reading though the files and preparing a list of question/answer pairs which are loaded into the super computer. When asked a question by a requester, the super computer statistically searches for the highest correlation between the word pattern in the query and the word pattern in the pre-loaded answers. This approach is known as statistical reasoning. Not only is this process of generating question and answer pairs exceedingly expensive and time consuming, it also limits the information that can be extracted from the data to those questions that have been previously created and stored. What is advertised to a layperson as "thinking", but it is actually no more than retrieving preselected answers from large data files. While such an approach may be adequate for static data sources, such as voluminous government regulations, historical fact tables, or medical diagnostic decision trees, it cannot provide insights into dynamic data (e.g., real time), nor can it leverage the inexhaustible power of a computer's ability to find all relevant, co-related data in huge data files.

It is also well known that many industry leaders are attempting to use deep neural networks to identify objects in photos and recognize the individual words we speak into digital assistants (e.g., consumer voice recognition computer assistance systems). The hope is that this type of artificial intelligence can dramatically improve a machine's ability to grasp the significance of those words by understanding how those words interact to form meaningful sentences. These industry leaders have recognized the importance of comprehending words as an enabler for a wide range of computer functions. But, the neural-net approach still relies on pattern matching and probabilistic scoring and requires some level of supervised learning.

Currently, available technology simply cannot provide insightful knowledge. It can only provide a list of potentially relevant sources to serve as leads for humans to process manually who then generate insightful knowledge, or it can search a database of pre-loaded knowledge generated by experts. But it cannot provide insightful knowledge, or extract all the relevant data for additional analysis from data files because it cannot comprehend the meaning(s) in data, such as text.

As an interesting comparison, humans can read and comprehend text files, but cannot process data fast enough to sort through massive files quickly. Computers can process data quickly, but cannot comprehend the concepts and context conveyed by text as humans do. Either humans need to process at computer speeds or computers need to comprehend at human levels. The technology required to achieve the former is not on the horizon. The technology to achieve the latter has not yet been demonstrated by known approaches.

Therefore, there is useful information that resides in massive data stored in information systems that cannot currently be understood by computers for analysis. The promise of "Big Data" analytics cannot be met if the relevant data cannot be understood and extracted from its massive storage repositories. This current lack of understanding effectively buries relevant information in overwhelming volume and masks it with the ambiguities inherent in words. Increasing processor speed will reduce the challenge presented by data volume, but no currently available software will overcome the challenge presented by words.

Currently, the generalized approach employed by all the technologies and methodologies mentioned above is that the fundamental understanding of natural languages is based on grammar. Specifically, grammar classifies words into five major grammatical types such as functional words, nouns, adjectives, verbs and adverbs. Grammar then uses these grammatical types to study how words should be distributed within a string of words to form a properly constructed grammatical sentence. However, understanding natural languages from a grammatical stance encourages the desertion of two major and crucial points. The first point is that grammar does not reflect the mind's natural ability to learn, create and achieve language and speech. People from all ages and cultures can communicate using natural languages without any formal grammatical training or expertise. The second point is that grammar is not concerned with the words' descriptive purpose or with the things that words are actually trying to describe or identify, but rather with the words' own grammatical operations and purpose (how the word is used within sentences).

This later point forces grammar to divide words that describe single ideas into separate grammatical identifications. For example, grammatically speaking, the word "human" is divided into a noun and an adjective based on how the word "human" is being used within a given sentence. In the sentence "the feelings of a human are profound" the word "human" is a noun, because "human" operates as a noun. But in the sentence "human feelings are profound" the word "human" is now an adjective, because grammatically speaking "human" in this example is operating as an adjective. Another example is what happens to the word "talking", which grammatically speaking is divided into three different elements such as a noun, an adjective or a verb. In "the talking of the president" the word "talking" is a noun; in "the talking president left the building" the word "talking" is an adjective; and in "the president is talking" the word "talking" is a verb. As a result, grammar not only divided "human" in two diverging terms and "talking" into three completely different terms, but in addition, grammar added complexity, because the grammatical classifications of "human" and "talking" were based on usage of each word within each sentence, not meaning.

But more importantly, grammar ignored the most important aspect behind each word, and that is what every word (human and talking) is actually trying to describe. Descriptively speaking (not grammatically speaking), the word "human" always describes a living being and the word "talking" always describes the same type of action on all sentences above. Another serious limitation that grammar endows is that most colloquial and conversational communications between people are informal and therefore do not follow the rigidness or sophistication demanded by the rules of grammar. This limits grammatical-based technologies from processing this type of data. Consequentially, grammar, aside from adding complexity and unnecessary partitioning of words, also reduces the capacity of computers and software to be flexible to process and understand what people are naturally saying, writing or implying. In view of the foregoing, there is an ongoing need for providing systems and methods of identifying words differently for processing natural languages including creating and maintaining searchable databases that when queried by a user produce results that are precisely and accurately responsive to the user's query. Moreover, because the purpose of ontological categories is to distinguish the elements it studies, failing to properly differentiate such elements from each other leads to serious inconsistencies. Indeed, if we select the wrong parameters to distinguish and study the elements of a given system, the resulting categories could be obtrusive and contradictory. For example, if "motion" is selected as the parameter to study the pieces of a train; then the engine, the passenger cars and the caboose can be confused, because all these pieces experience the same type of motion when the train moves. This is similar to what grammar has done by defining how words are used instead of what words describe. Stating how a word is used in a sentence does not identify what the word is actually trying to describe. This has led grammatical approaches to create obtrusive categories, confusion and contradictions in semantic and meaning-based analysis. For example, in many dictionaries the word "elected" is divided as an adjective and a verb (this is obtrusive within that dictionary); while in other dictionaries, "elected" is only an adjective or only a verb (this is contradictory among dictionaries).

In addition, current technology is focused on identifying the part of speech a word represents as opposed to what the word is describing or intending to describe. To date, this approach or methodology precludes current technology from recognizing the single unique individuals, unique items, or unique things that words represent or are trying to describe in time and space. Nor can current technology assign or associate actions and/or attributes to a unique single individual, item or thing and vice versa. Therefore, there is need in the art for methods and approaches that can analysis big data and address the limitations identified above.

BRIEF DESCRIPTION OF THE SEVERAL VIEWS OF THE DRAWING(S)

FIG. 7C is a diagram of an embodiment of a synonym words table within a computing system in accordance with the present invention;

FIG. 7D is a diagram of an embodiment of a polysemous words table within a computing system in accordance with the present invention;

FIG. 7E is a diagram of an embodiment of transforming words into groupings within a computing system in accordance with the present invention;

FIG. 8B is a diagram of an embodiment of a groupings table within a computing system in accordance with the present invention;

Figure 12A:
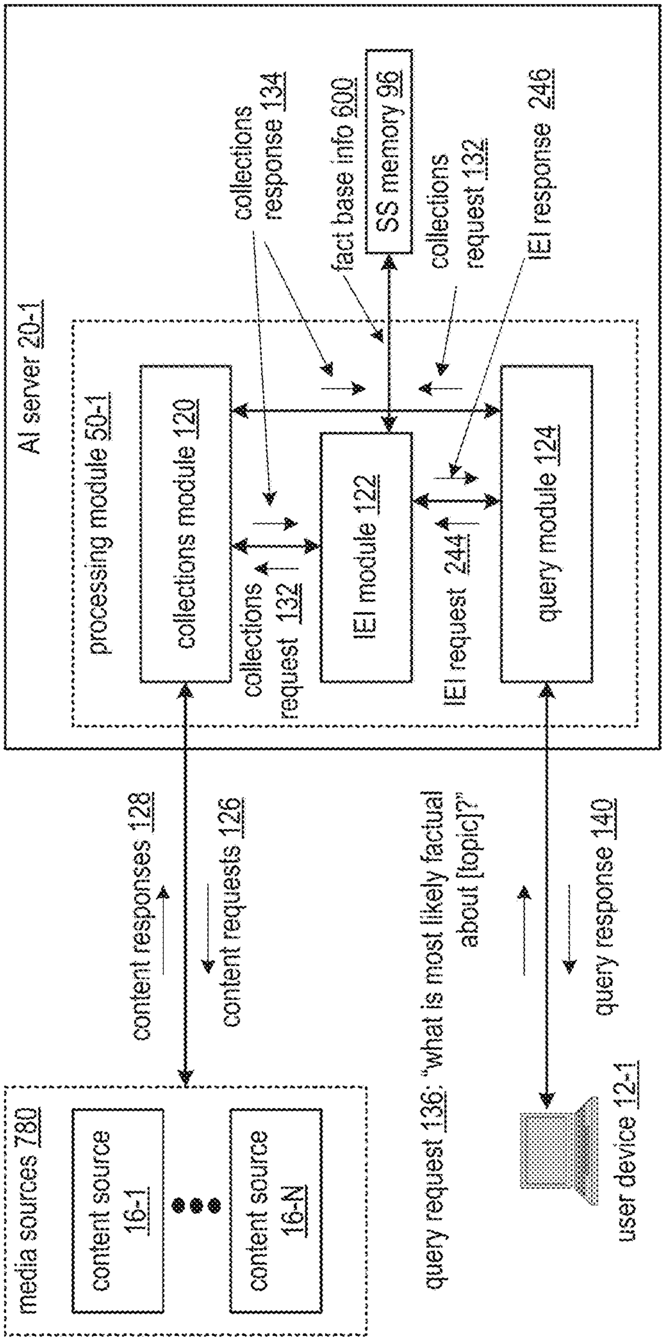
FIG. 12A is a schematic block diagram of another embodiment of a computing system in accordance with the present invention.
Figure 12B:
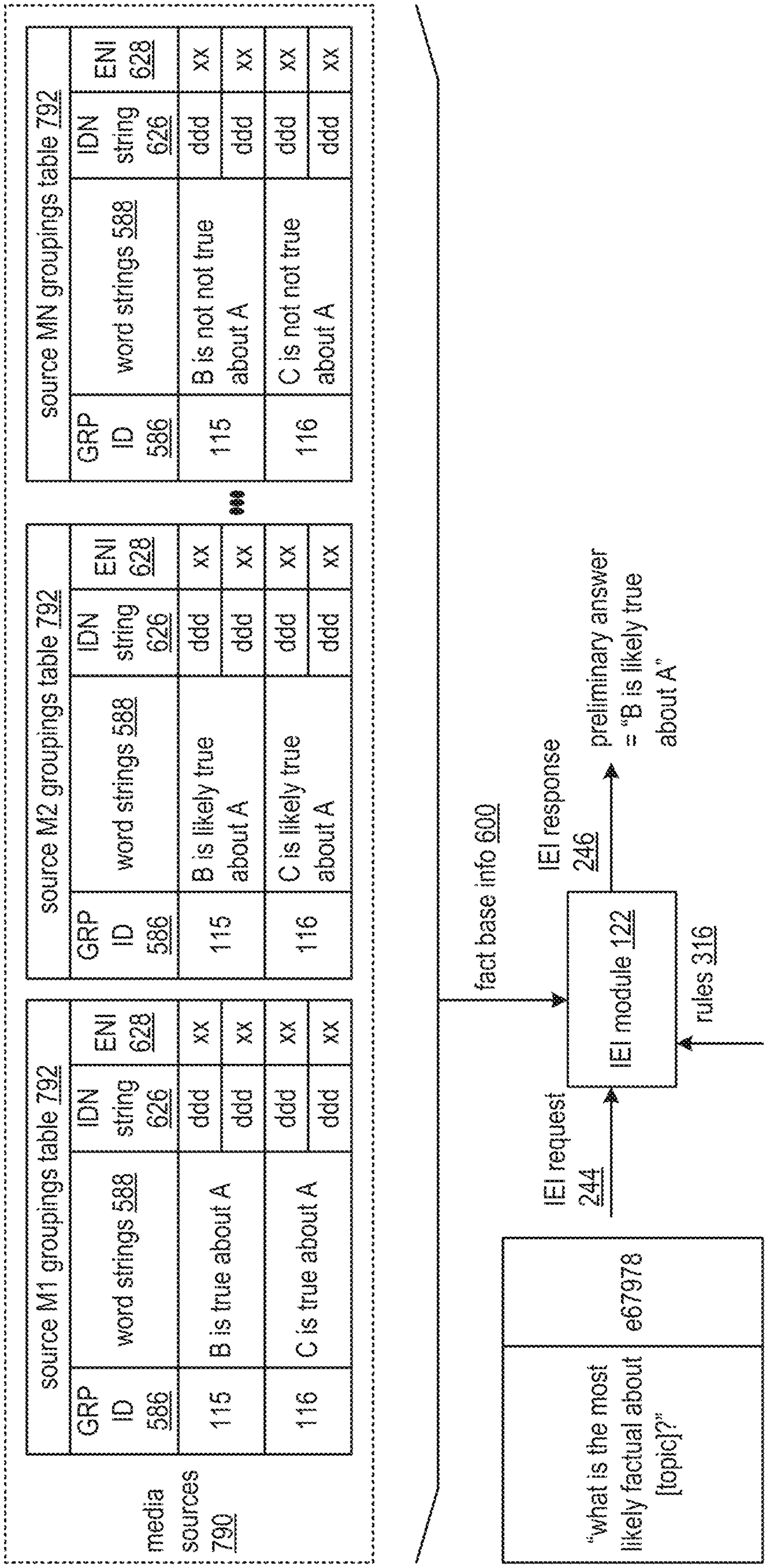
FIG. 12B is a data flow diagram for providing an answer to a question with regards to factual likelihood within a computing system in accordance with the present invention.
Figure 12C:
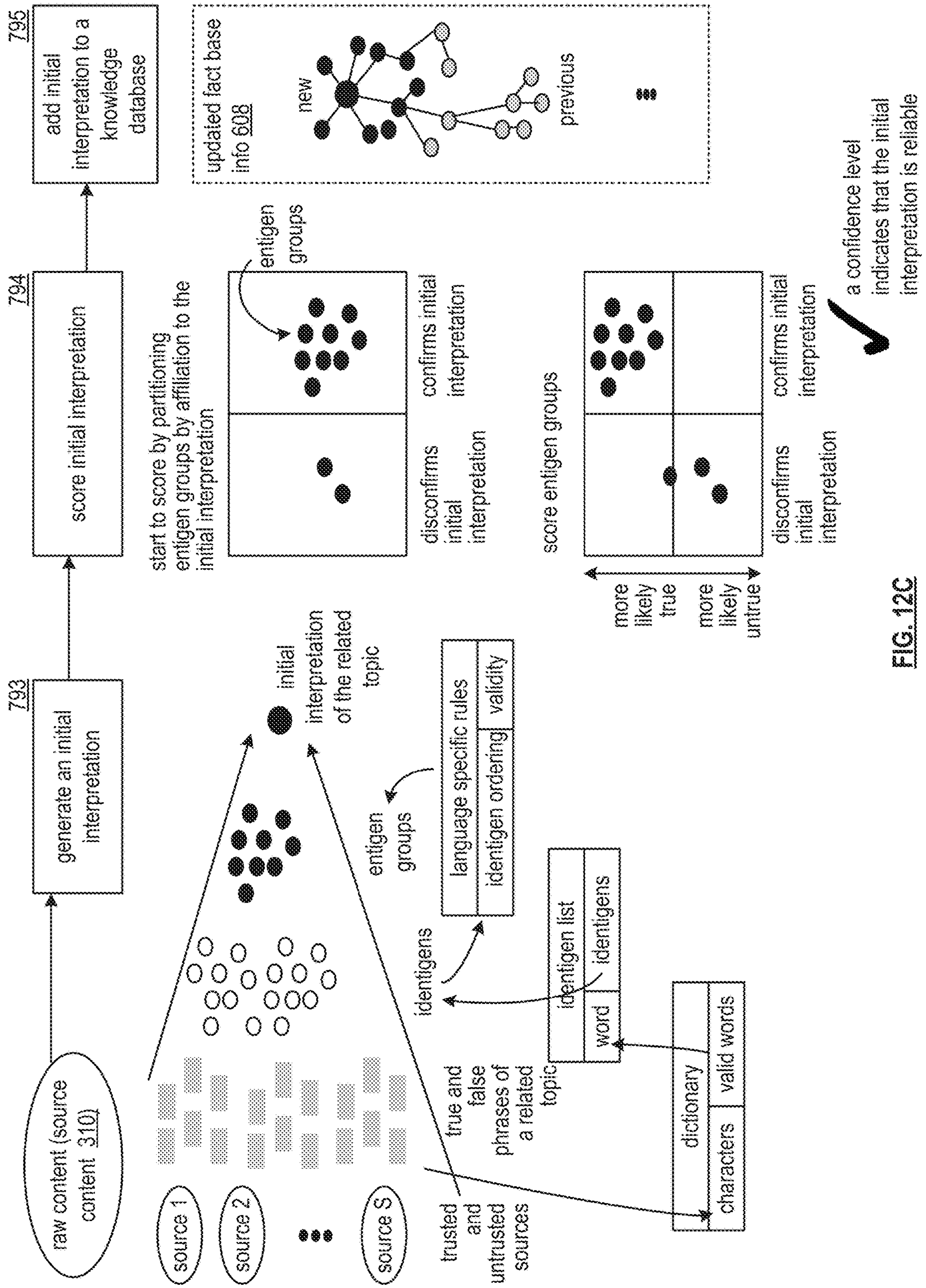
Figure 12D:
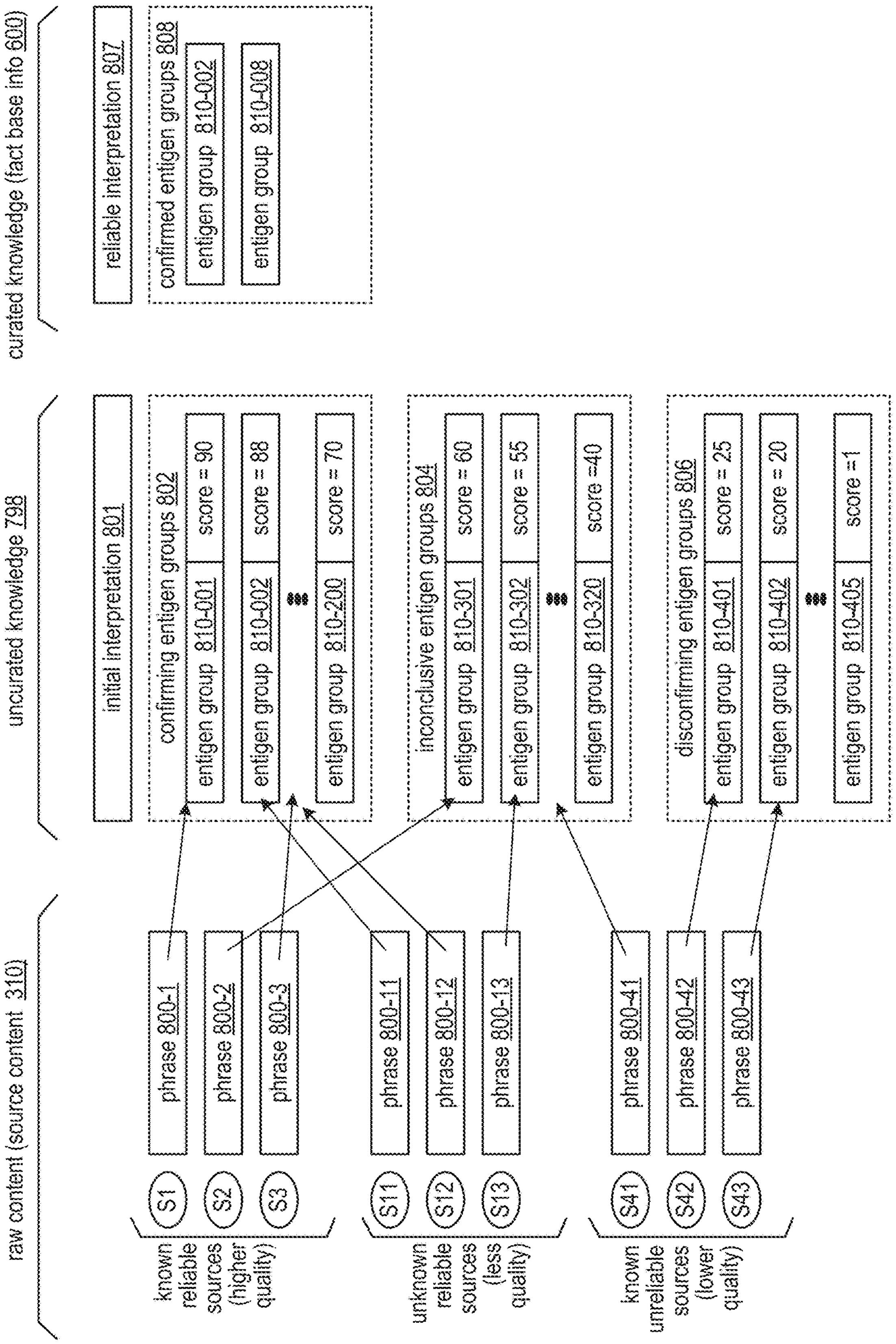
Figure 12E:
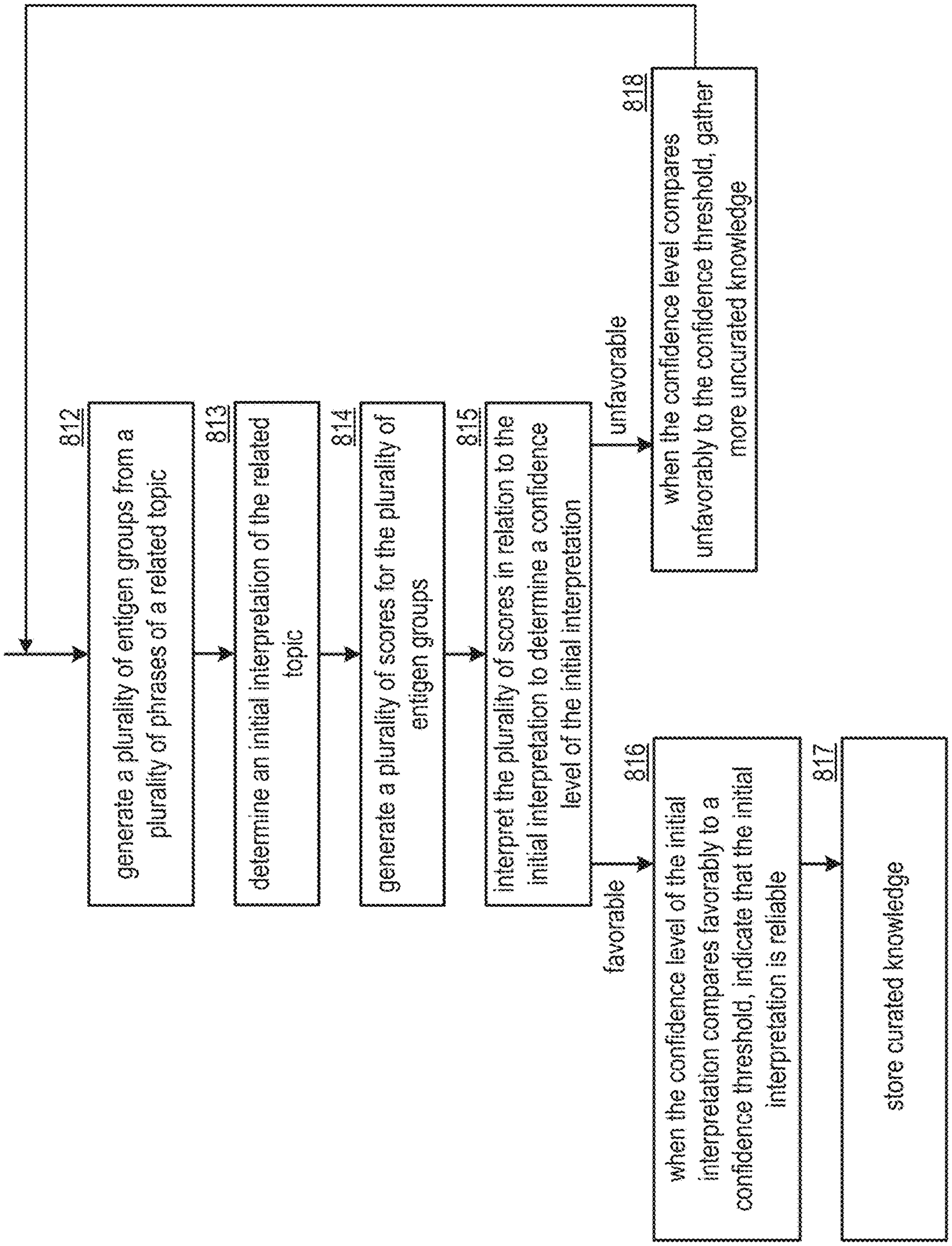
Figure 13A:
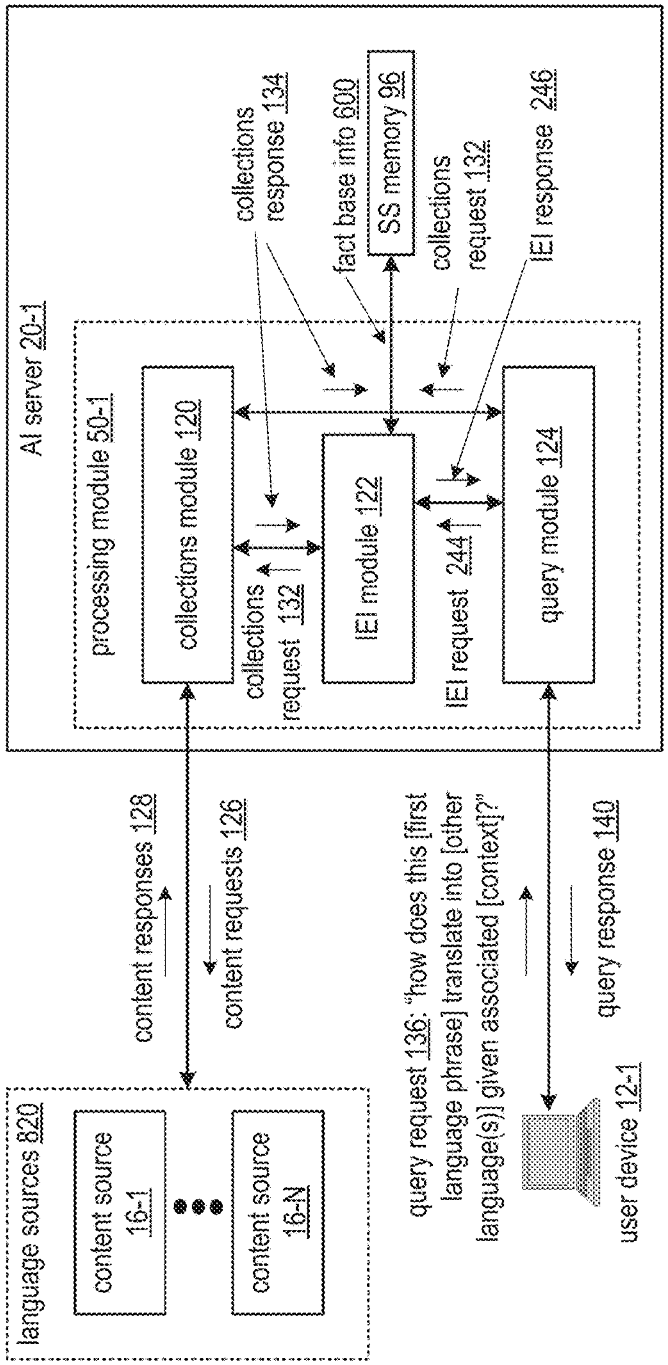
Figure 13B:
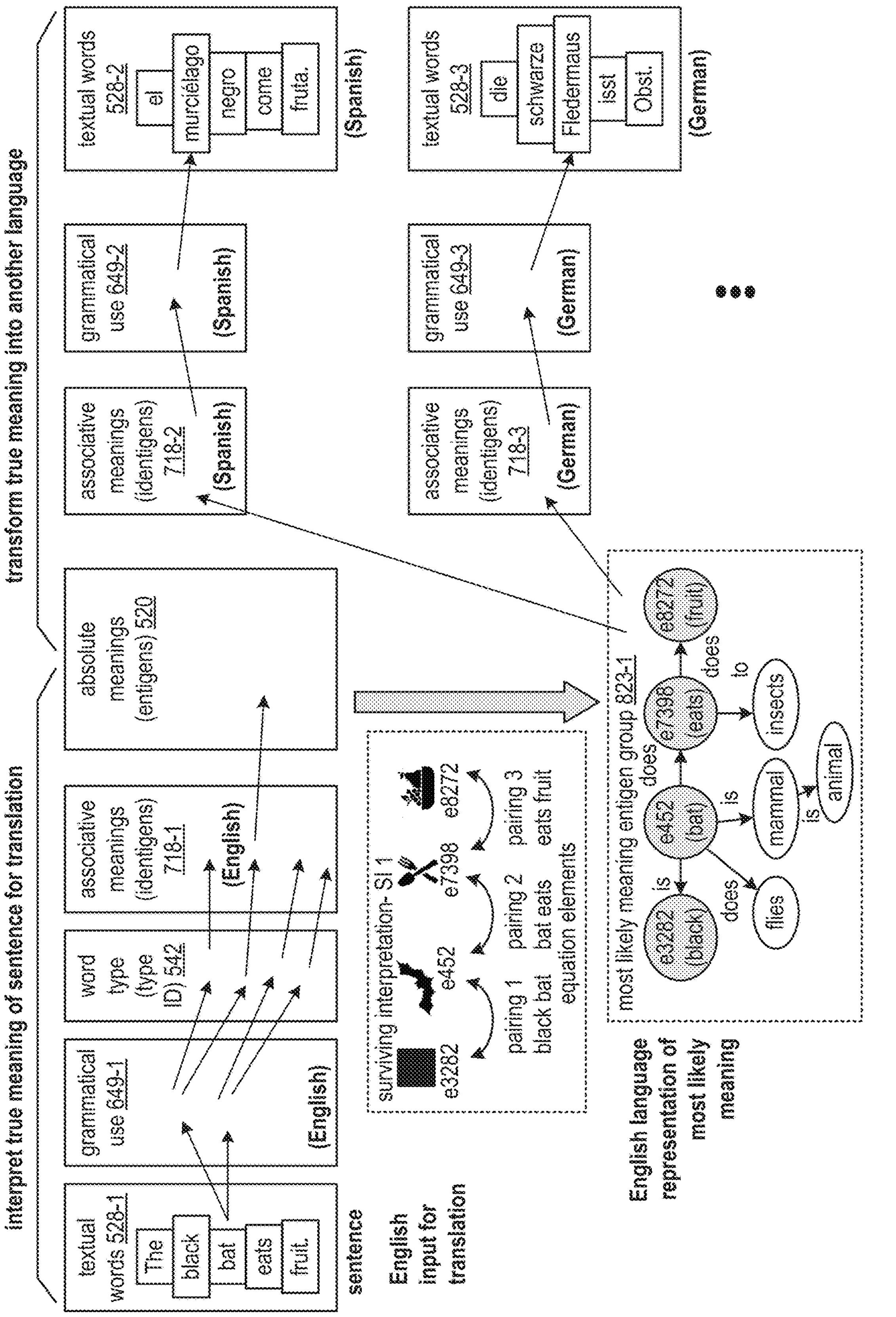
Figure 13C:
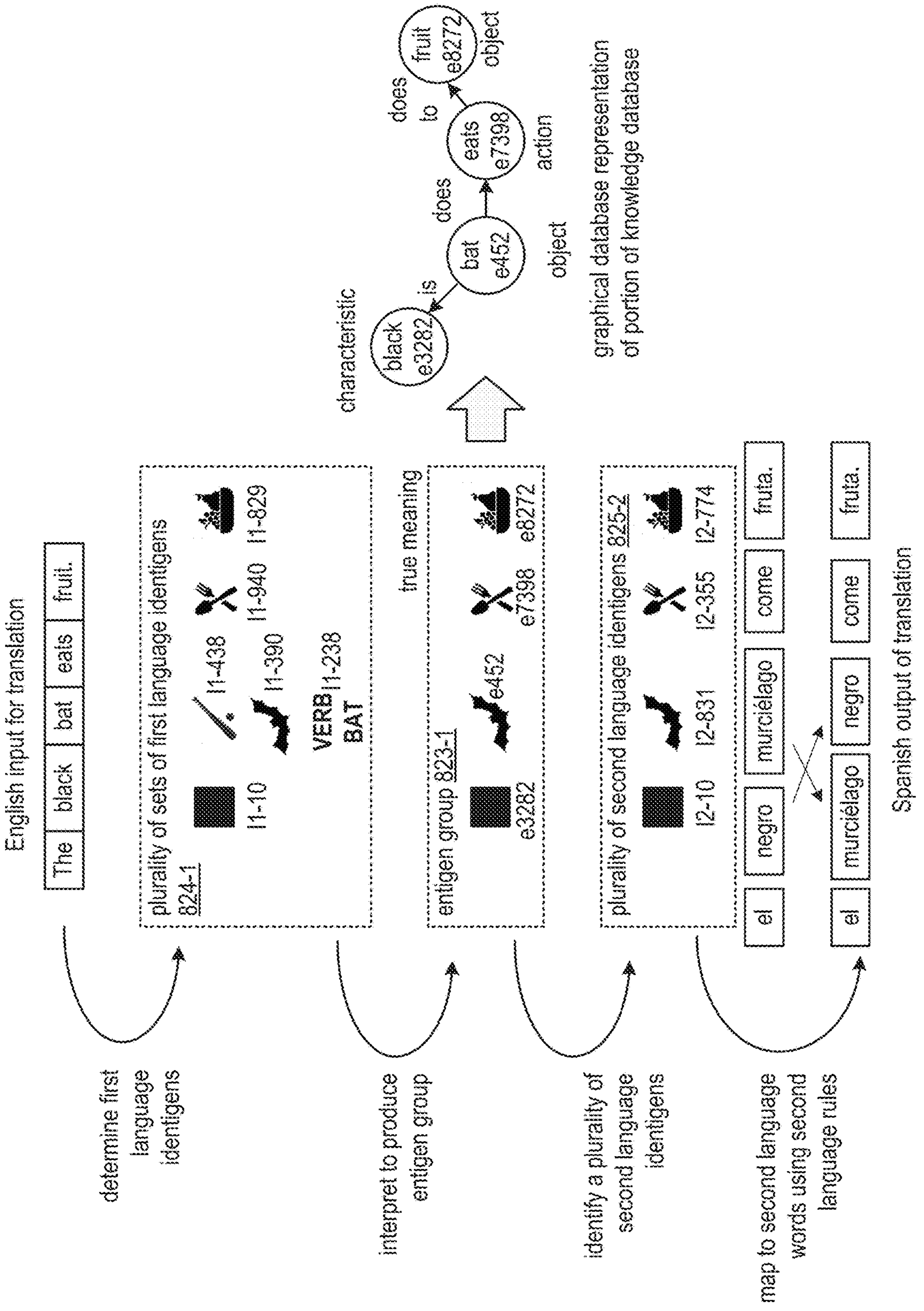
Figure 13D:
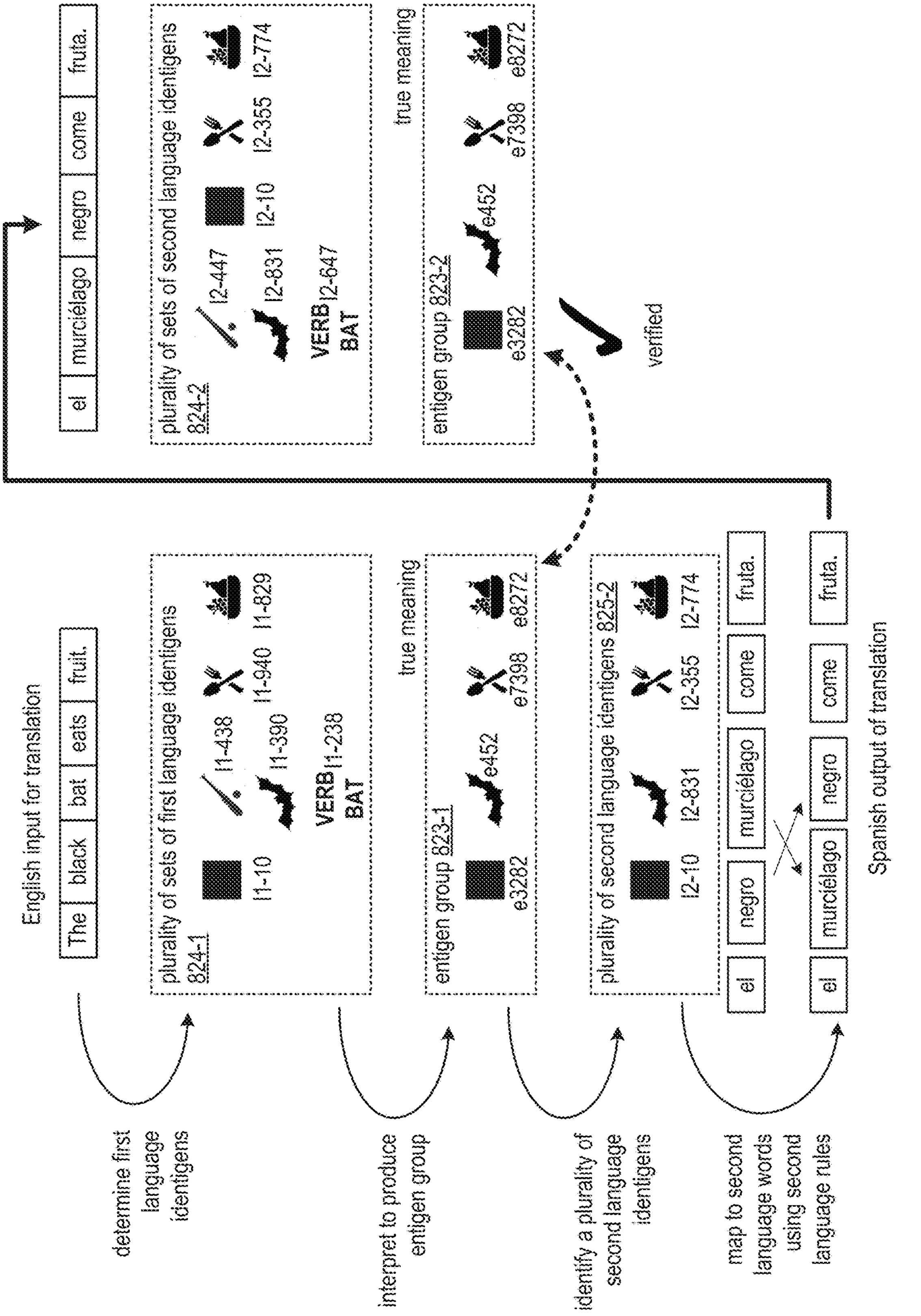
Figure 13E:
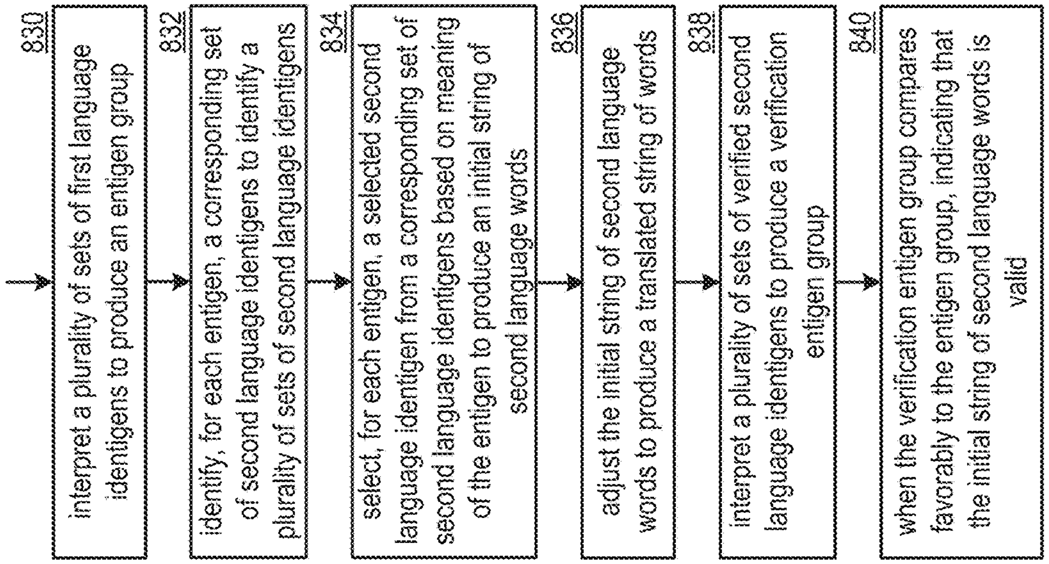
Figure 14A:
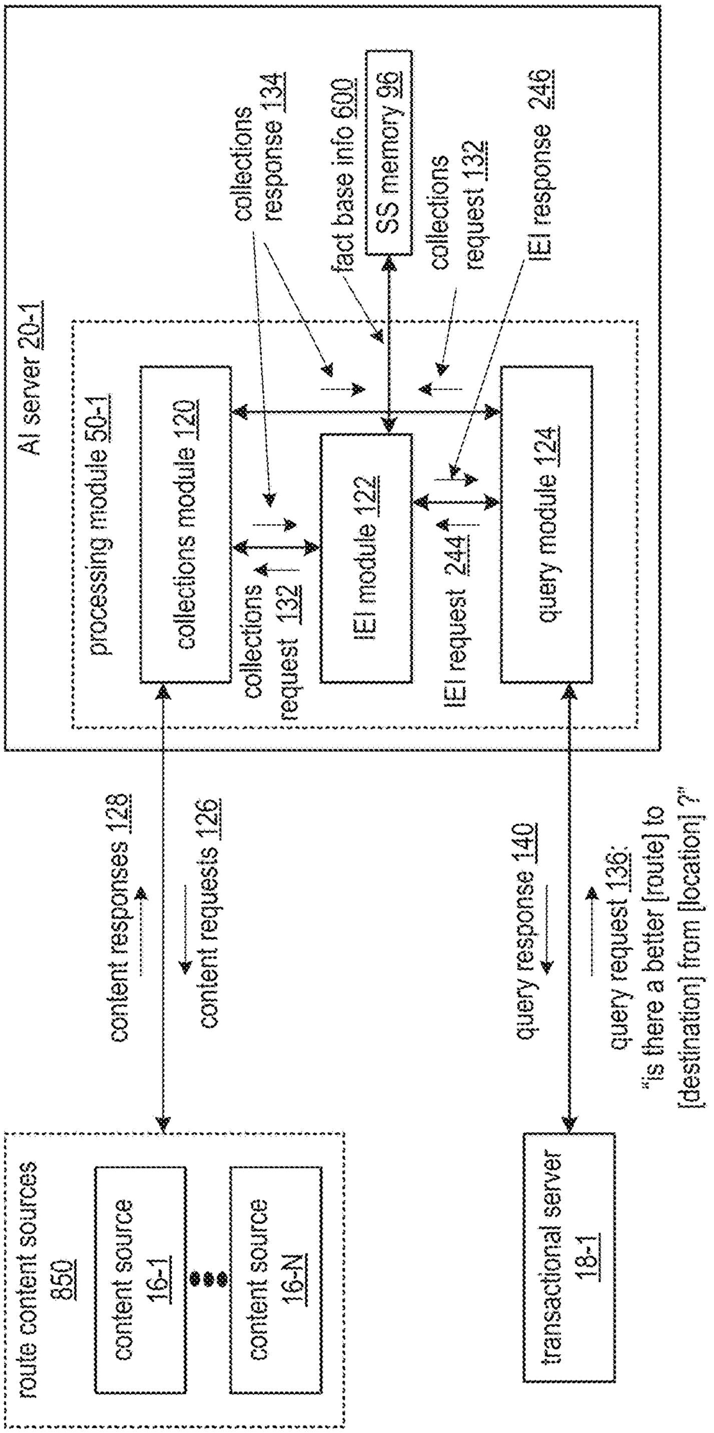
Figure 14B:
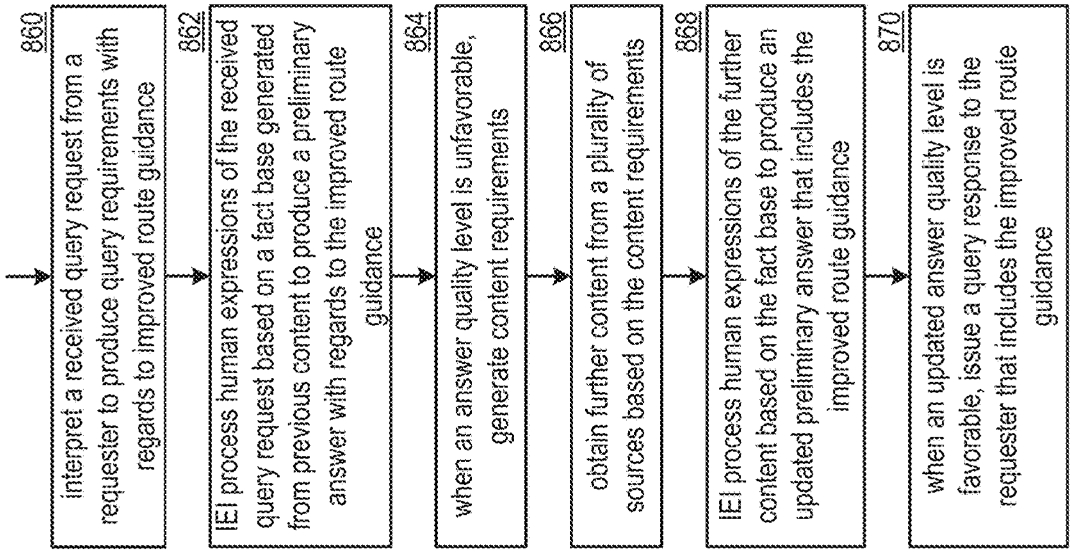
Figure 15A:
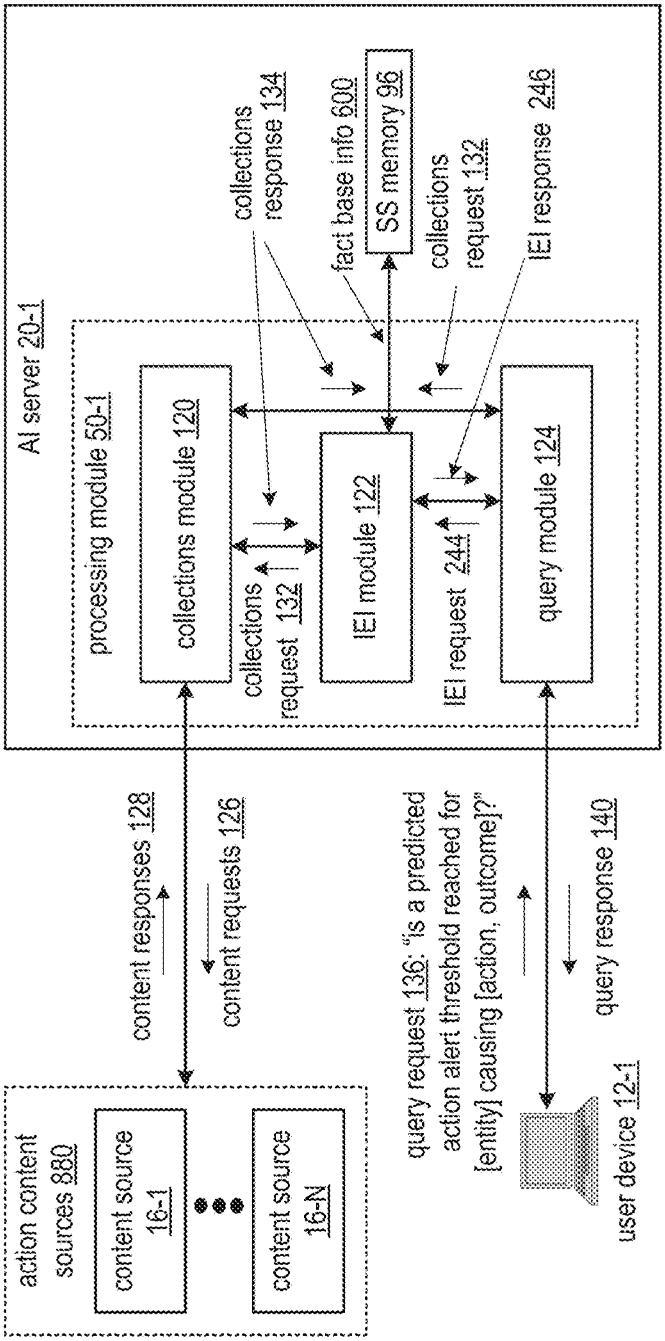
Figure 15B:
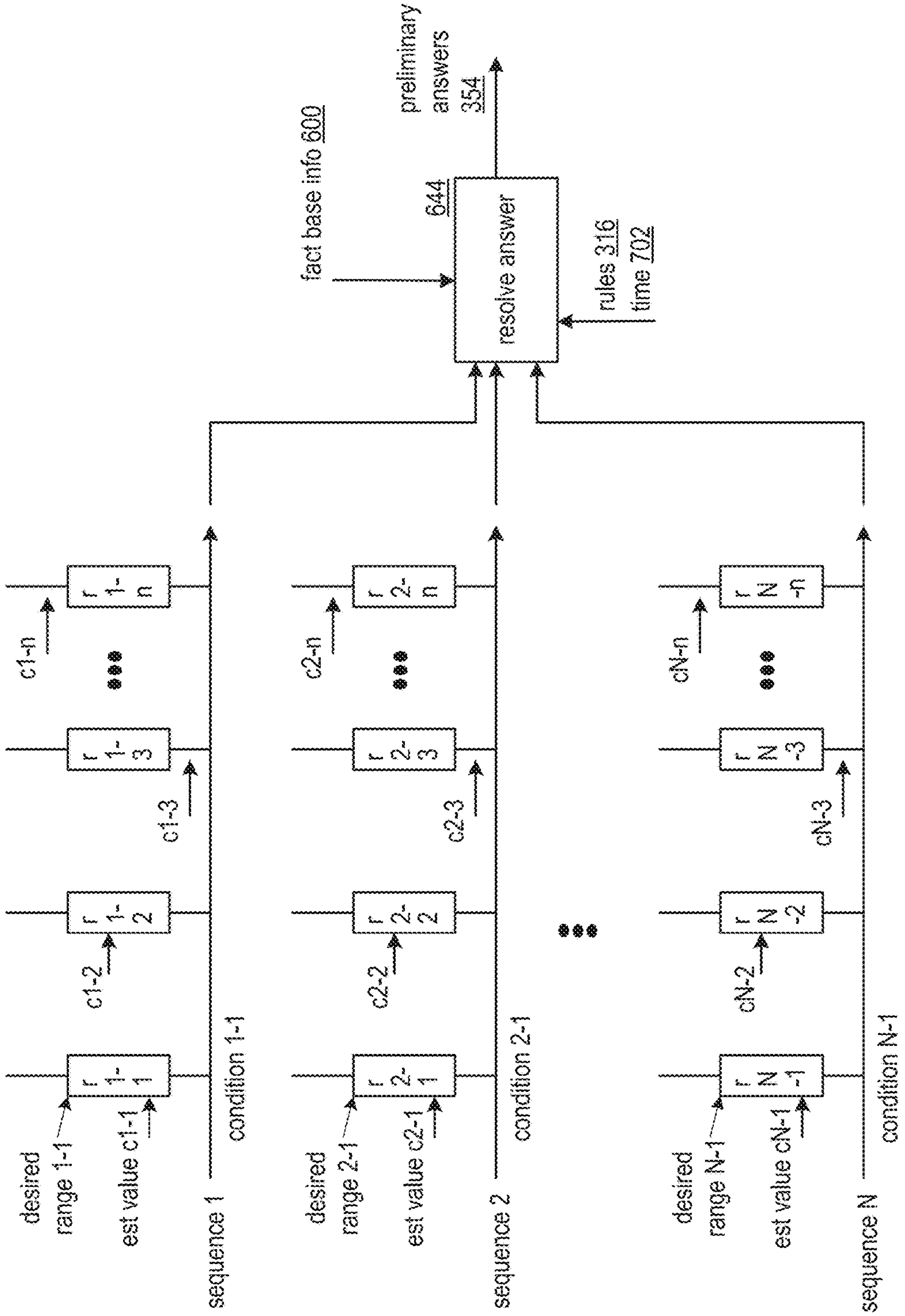
Figure 15C:
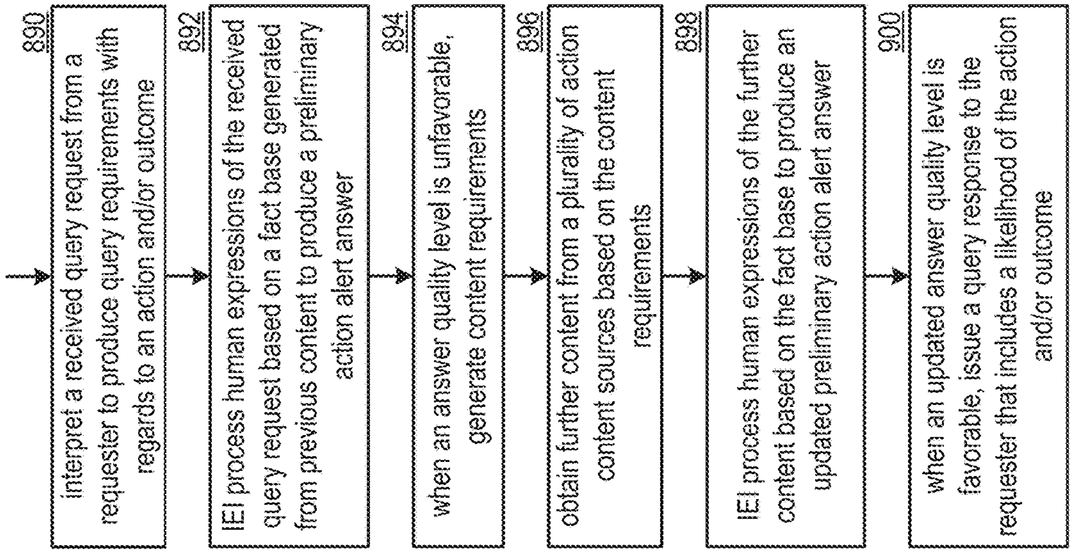
Figure 16A:
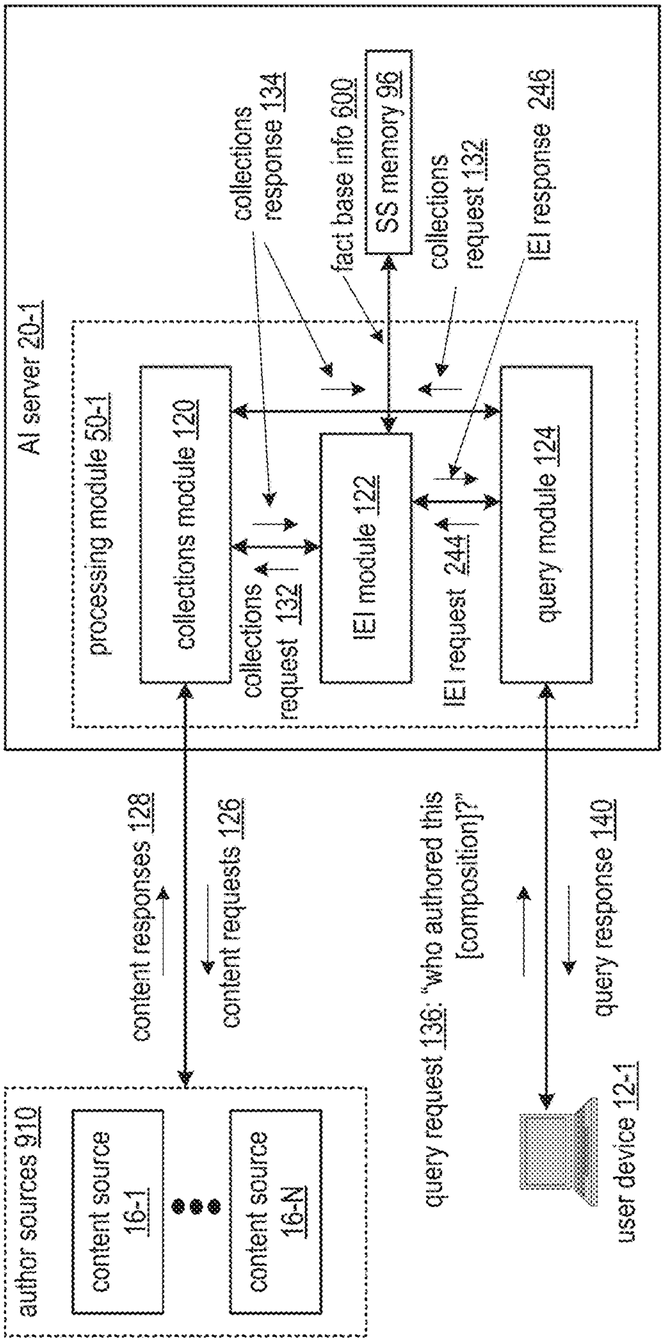
Figure 16B:
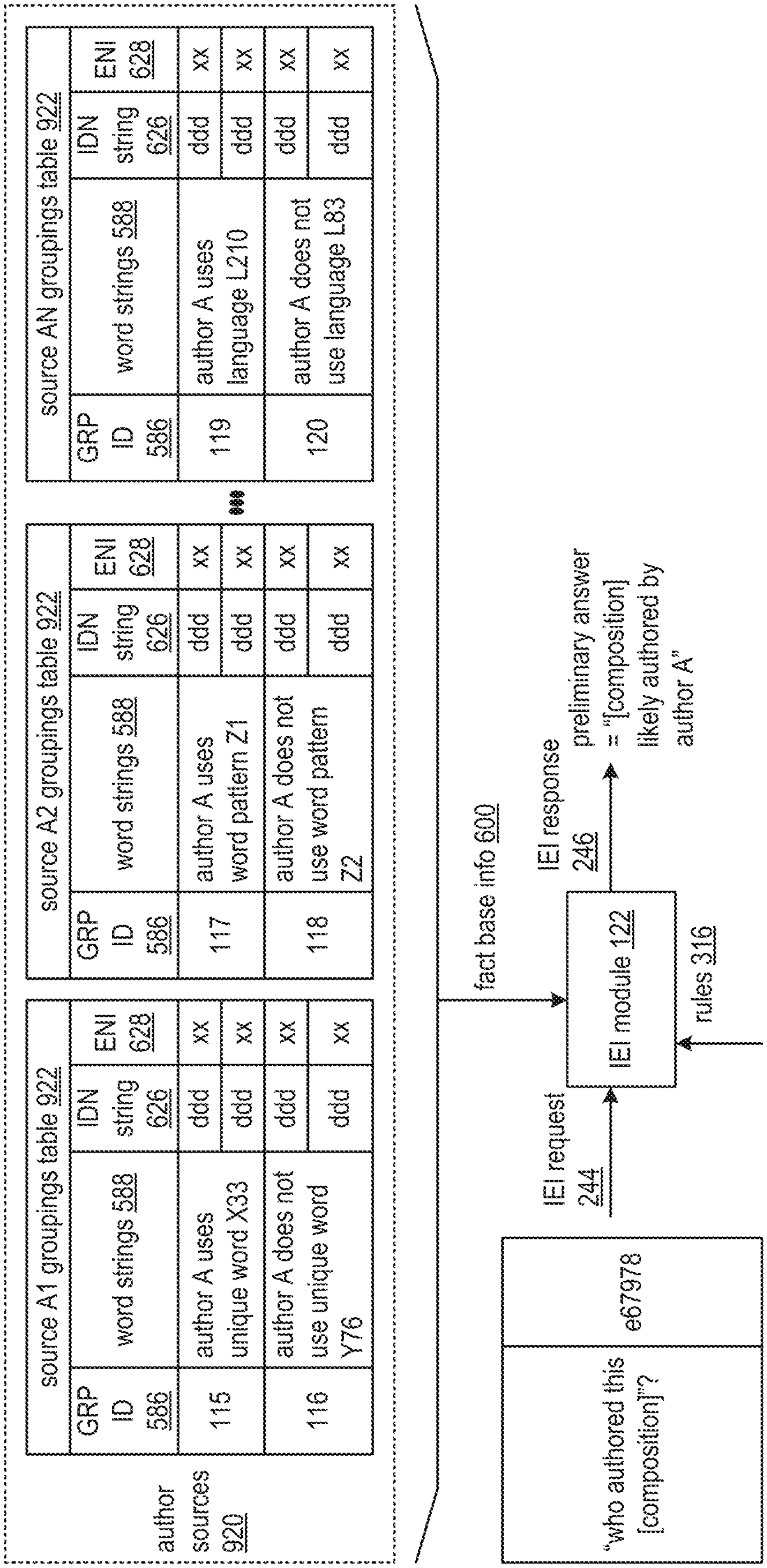
Figure 16C:
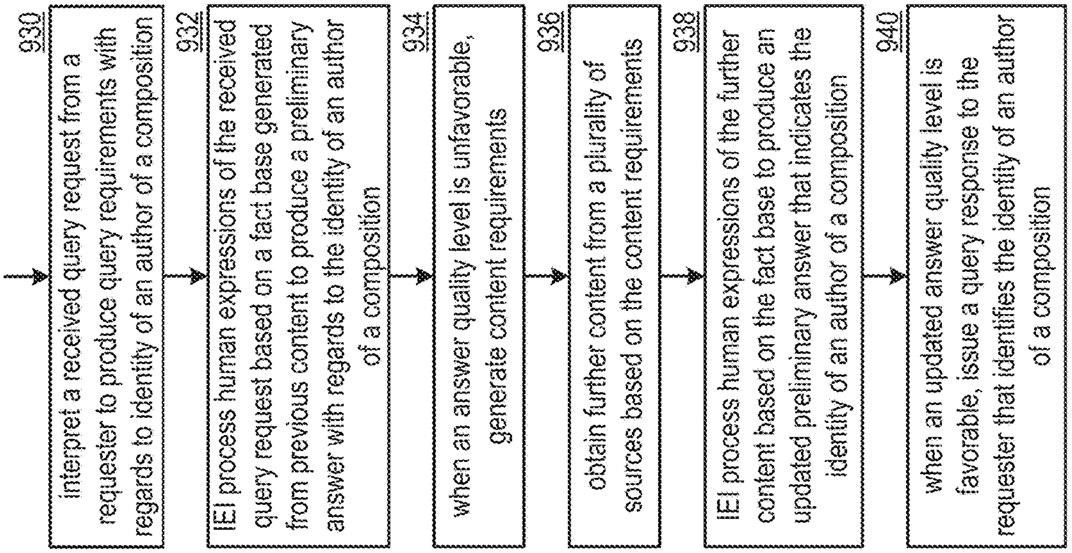

FIGS. 12C-D are data flow diagrams for curating knowledge within a computing system in accordance with the present invention;

FIG. 12E is a logic diagram of an embodiment of a method for curating knowledge within a computing system in accordance with the present invention;

FIG. 13A is a schematic block diagram of another embodiment of a computing system in accordance with the present invention;

FIGS. 13B-13D are process flow diagrams of an embodiment of a method to translate words of a first language into words of a second language in accordance with the present invention;

FIG. 13E is a logic diagram of an embodiment of a method for translating words of a first language into words of a second language within a computing system in accordance with the present invention;

FIG. 14A is a schematic block diagram of another embodiment of a computing system in accordance with the present invention;

FIG. 14B is a logic diagram of an embodiment of a method for providing an answer to a question with regards to improved route guidance within a computing system in accordance with the present invention;

FIG. 15A is a schematic block diagram of another embodiment of a computing system in accordance with the present invention;

FIG. 15B is a data flow diagram for generating a predicted action alert within a computing system in accordance with the present invention;

FIG. 15C is a logic diagram of an embodiment of a method for generating a predicted action alert within a computing system in accordance with the present invention;

FIG. 16A is a schematic block diagram of another embodiment of a computing system in accordance with the present invention;

FIG. 16B is a data flow diagram for identifying an author within a computing system in accordance with the present invention; and FIG. 16C is a logic diagram of an embodiment of a method for identifying an author within a computing system in accordance with the present invention.

DETAILED DESCRIPTION OF THE INVENTION

Figure 1:
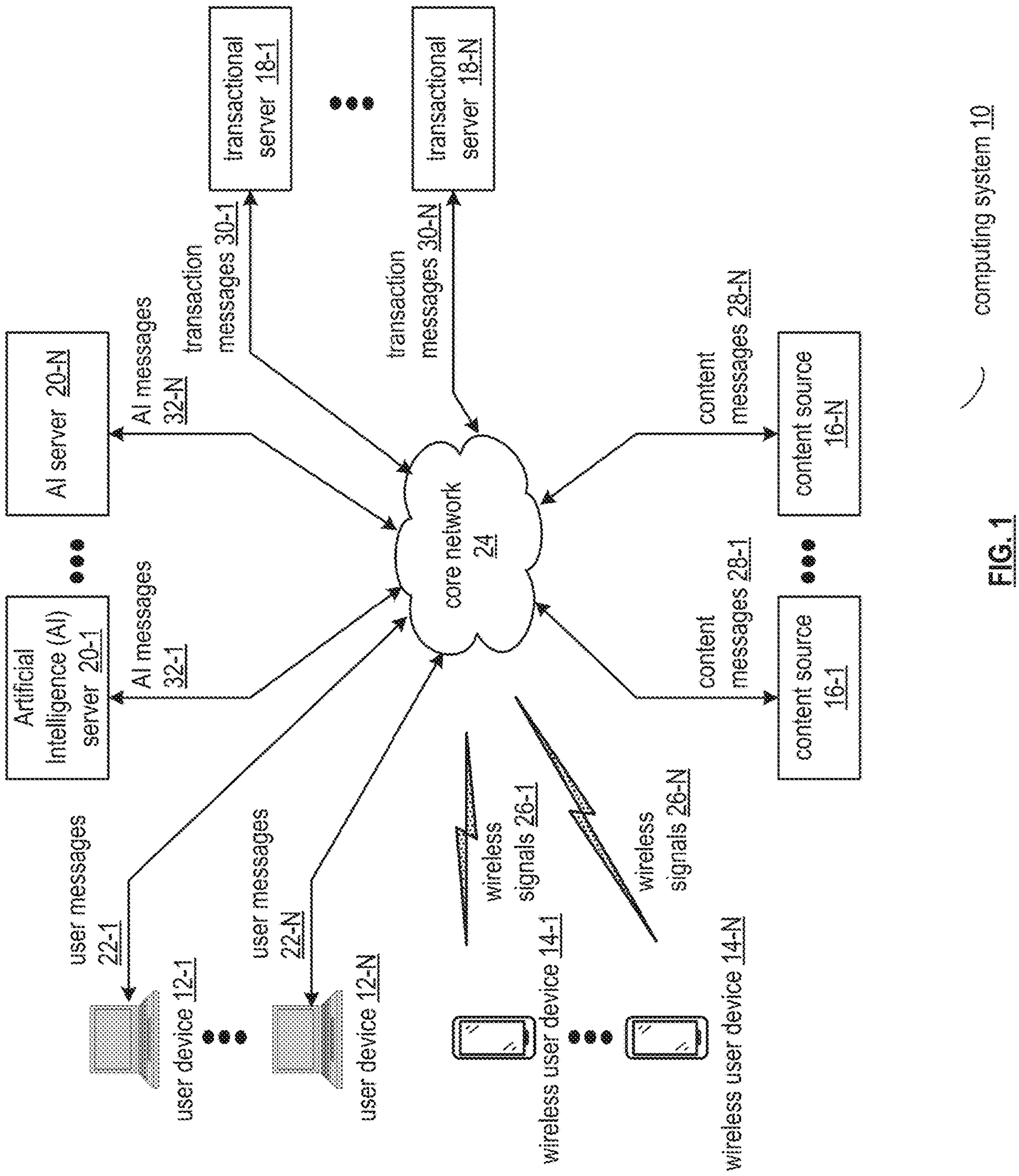
FIG. 1 is a schematic block diagram of an embodiment of a computing system in accordance with the present invention.

FIG. 1 is a schematic block diagram of an embodiment of a computing system 10 that includes a plurality of user devices 12-1 through 12-N, a plurality of wireless user devices 14-1 through 14-N, a plurality of content sources 16-1 through 16-N, a plurality of transactional servers 18-1 through 18-N, a plurality of artificial intelligence (AI) servers 20-1 through 20-N, and a core network 24. The core network 24 includes at least one of the Internet, a public radio access network (RAN), and any private network. Hereafter, the computing system 10 may be interchangeably referred to as a data network, a data communication network, a system, a communication system, and a data communication system. Hereafter, the user device and the wireless user device may be interchangeably referred to as user devices, and each of the transactional servers and the AI servers may be interchangeably referred to as servers.

Each user device, wireless user device, transactional server, and AI server includes a computing device that includes a computing core. In general, a computing device is any electronic device that can communicate data, process data, and/or store data. A further generality of a computing device is that it includes one or more of a central processing unit (CPU), a memory system, a sensor (e.g., internal or external), user input/output interfaces, peripheral device interfaces, communication elements, and an interconnecting bus structure.

As further specific examples, each of the computing devices may be a portable computing device and/or a fixed computing device. A portable computing device may be an embedded controller, a smart sensor, a smart pill, a social networking device, a gaming device, a cell phone, a smart phone, a robot, a personal digital assistant, a digital music player, a digital video player, a laptop computer, a handheld computer, a tablet, a video game controller, an engine controller, a vehicular controller, an aircraft controller, a maritime vessel controller, a spacecraft controller, and/or any other portable device that includes a computing core. A fixed computing device may be security camera, a sensor device, a household appliance, a machine, a robot, an embedded controller, a personal computer (PC), a computer server, a cable set-top box, a satellite receiver, a television set, a printer, a fax machine, home entertainment equipment, a camera controller, a video game console, a critical infrastructure controller, and/or any type of home or office computing equipment that includes a computing core. An embodiment of the various servers is discussed in greater detail with reference to FIG. 2. An embodiment of the various devices is discussed in greater detail with reference to FIG. 3.

Each of the content sources 16-1 through 16-N includes any source of content, where the content includes one or more of data files, a data stream, a tech stream, a text file, an audio stream, an audio file, a video stream, a video file, etc. Examples of the content sources include a weather service, a multi-language online dictionary, a fact server, a big data storage system, the Internet, social media systems, an email server, a news server, a schedule server, a traffic monitor, a security camera system, audio monitoring equipment, an information server, a service provider, a data aggregator, and airline traffic server, a shipping and logistics server, a banking server, a financial transaction server, etc. Alternatively, or in addition to, one or more of the various user devices may provide content. For example, a wireless user device may provide content (e.g., issued as a content message) when the wireless user device is able to capture data (e.g., text input, sensor input, etc.).

Generally, an embodiment of this invention presents solutions where the computing system 10 supports the generation and utilization of knowledge extracted from content. For example, the AI servers 20-1 through 20-N ingest content from the content sources 16-1 through 16-N by receiving, via the core network 24 content messages 28-1 through 28-N as AI messages 32-1 through 32-N, extract the knowledge from the ingested content, and interact with the various user devices to utilize the extracted knowledge by facilitating the issuing, via the core network 24, user messages 22-1 through 22-N to the user devices 12-1 through 12-N and wireless signals 26-1 through 26-N to the wireless user devices 14-1 through 14-N.

Each content message 28-1 through 28-N includes a content request (e.g., requesting content related to a topic, content type, content timing, one or more domains, etc.) or a content response, where the content response includes real-time or static content such as one or more of dictionary information, facts, non-facts, weather information, sensor data, news information, blog information, social media content, user daily activity schedules, traffic conditions, community event schedules, school schedules, user schedules airline records, shipping records, logistics records, banking records, census information, global financial history information, etc. Each AI message 32-1 through 32-N includes one or more of content messages, user messages (e.g., a query request, a query response that includes an answer to a query request), and transaction messages (e.g., transaction information, requests and responses related to transactions). Each user message 22-1 through 22-N includes one or more of a query request, a query response, a trigger request, a trigger response, a content collection, control information, software information, configuration information, security information, routing information, addressing information, presence information, analytics information, protocol information, all types of media, sensor data, statistical data, user data, error messages, etc.

When utilizing a wireless signal capability of the core network 24, each of the wireless user devices 14-1 through 14-N encodes/decodes data and/or information messages (e.g., user messages such as user messages 22-1 through 22-N) in accordance with one or more wireless standards for local wireless data signals (e.g., Wi-Fi, Bluetooth, ZigBee) and/or for wide area wireless data signals (e.g., 2G, 3G, 4G, 5G, satellite, point-to-point, etc.) to produce wireless signals 26-1 through 26-N. Having encoded/decoded the data and/or information messages, the wireless user devices 14-1 through 14-N and/receive the wireless signals to/from the wireless capability of the core network 24.

As another example of the generation and utilization of knowledge, the transactional servers 18-1 through 18-N communicate, via the core network 24, transaction messages 30-1 through 30-N as further AI messages 32-1 through 32-N to facilitate ingesting of transactional type content (e.g., real-time crypto currency transaction information) and to facilitate handling of utilization of the knowledge by one or more of the transactional servers (e.g., for a transactional function) in addition to the utilization of the knowledge by the various user devices. Each transaction message 30-1 through 30-N includes one or more of a query request, a query response, a trigger request, a trigger response, a content message, and transactional information, where the transactional information may include one or more of consumer purchasing history, crypto currency ledgers, stock market trade information, other investment transaction information, etc.

In another specific example of operation of the generation and utilization of knowledge extracted from the content, the user device 12-1 issues a user message 22-1 to the AI server 20-1, where the user message 22-1 includes a query request and where the query request includes a question related to a first domain of knowledge. The issuing includes generating the user message 22-1 based on the query request (e.g., the question), selecting the AI server 20-1 based on the first domain of knowledge, and sending, via the core network 24, the user message 22-1 as a further AI message 32-1 to the AI server 20-1. Having received the AI message 32-1, the AI server 20-1 analyzes the question within the first domain, generates further knowledge, generates a preliminary answer, generates a quality level indicator of the preliminary answer, and determines to gather further content when the quality level indicator is below a minimum quality threshold level.

When gathering the further content, the AI server 20-1 issues, via the core network 24, a still further AI message 32-1 as a further content message 28-1 to the content source 16-1, where the content message 28-1 includes a content request for more content associated with the first domain of knowledge and in particular the question. Alternatively, or in addition to, the AI server 20-1 issues the content request to another AI server to facilitate a response within a domain associated with the other AI server. Further alternatively, or in addition to, the AI server 20-1 issues the content request to one or more of the various user devices to facilitate a response from a subject matter expert. Having received the content message 28-1, the contents or 16-1 issues, via the core network 24, a still further content message 28-1 to the AI server 20-1 as a yet further AI message 32-1, where the still further content message 28-1 includes requested content. The AI server 20-1 processes the received content to generate further knowledge. Having generated the further knowledge, the AI server 20-1 re-analyzes the question, generates still further knowledge, generates another preliminary answer, generates another quality level indicator of the other preliminary answer, and determines to issue a query response to the user device 12-1 when the quality level indicator is above the minimum quality threshold level. When issuing the query response, the AI server 20-1 generates an AI message 32-1 that includes another user message 22-1, where the other user message 22-1 includes the other preliminary answer as a query response including the answer to the question. Having generated the AI message 32-1, the AI server 20-1 sends, via the core network 24, the AI message 32-1 as the user message 22-1 to the user device 12-1 thus providing the answer to the original question of the query request.

Figure 2:
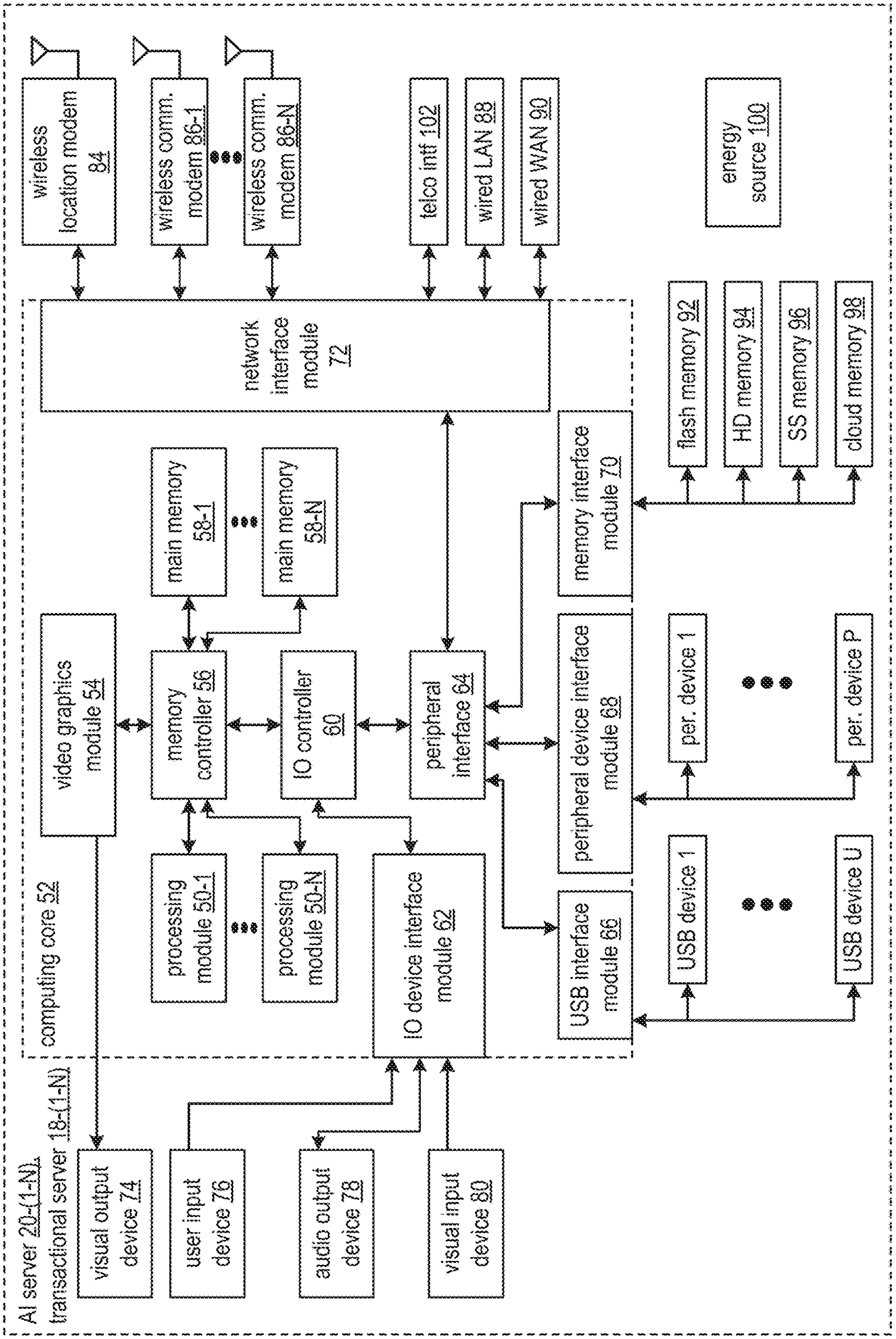
FIG. 2 is a schematic block diagram of an embodiment of various servers of a computing system in accordance with the present invention.

FIG. 2 is a schematic block diagram of an embodiment of the AI servers 20-1 through 20-N and the transactional servers 18-1 through 18-N of the computing system 10 of FIG. 1. The servers may include a computing core 52, one or more visual output devices 74 (e.g., video graphics display, touchscreen, LED, etc.), one or more user input devices 76 (e.g., keypad, keyboard, touchscreen, voice to text, a push button, a microphone, a card reader, a door position switch, a biometric input device, etc.), one or more audio output devices 78 (e.g., speaker(s), headphone jack, a motor, etc.), one or more visual input devices 80 (e.g., a still image camera, a video camera, photocell, etc.), one or more universal serial bus (USB) devices (USB devices 1-U), one or more peripheral devices (e.g., peripheral devices 1-P), one or more memory devices (e.g., one or more flash memory devices 92, one or more hard drive (HD) memories 94, one or more solid state (SS) memory devices 96, and/or cloud memory 98), one or more wireless location modems 84 (e.g., global positioning satellite (GPS), Wi-Fi, angle of arrival, time difference of arrival, signal strength, dedicated wireless location, etc.), one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.), a telco interface 102 (e.g., to interface to a public switched telephone network), a wired local area network (LAN) 88 (e.g., optical, electrical), a wired wide area network (WAN) 90 (e.g., optical, electrical), and an energy source 100 (e.g., a battery, a solar power source, a fuel cell, a capacitor, a generator, mains power, backup power, etc.).

The computing core 52 includes a video graphics module 54, one or more processing modules 50-1 through 50-N (e.g., which may include one or more secure co-processors), a memory controller 56, one or more main memories 58-1 through 58-N (e.g., RAM), one or more input/output (I/O) device interfaces 62, an input/output (I/O) controller 60, a peripheral interface 64, one or more USB interfaces 66, one or more network interfaces 72, one or more memory interfaces 70, and/or one or more peripheral device interfaces 68.

The processing modules may be a single processing device or a plurality of processing devices where the processing device may further be referred to as one or more of a "processing circuit", a "processor", and/or a "processing unit". Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Each of the interfaces 62, 66, 68, 70, and 72 includes a combination of hardware (e.g., connectors, wiring, etc.) and may further include operational instructions stored on memory (e.g., driver software) that are executed by one or more of the processing modules 50-1 through 50-N and/or a processing circuit within the interface. Each of the interfaces couples to one or more components of the servers. For example, one of the IO device interfaces 62 couples to an audio output device 78. As another example, one of the memory interfaces 70 couples to flash memory 92 and another one of the memory interfaces 70 couples to cloud memory 98 (e.g., an on-line storage system and/or on-line backup system). In other embodiments, the servers may include more or less devices and modules than shown in this example embodiment of the servers.

Figure 3:
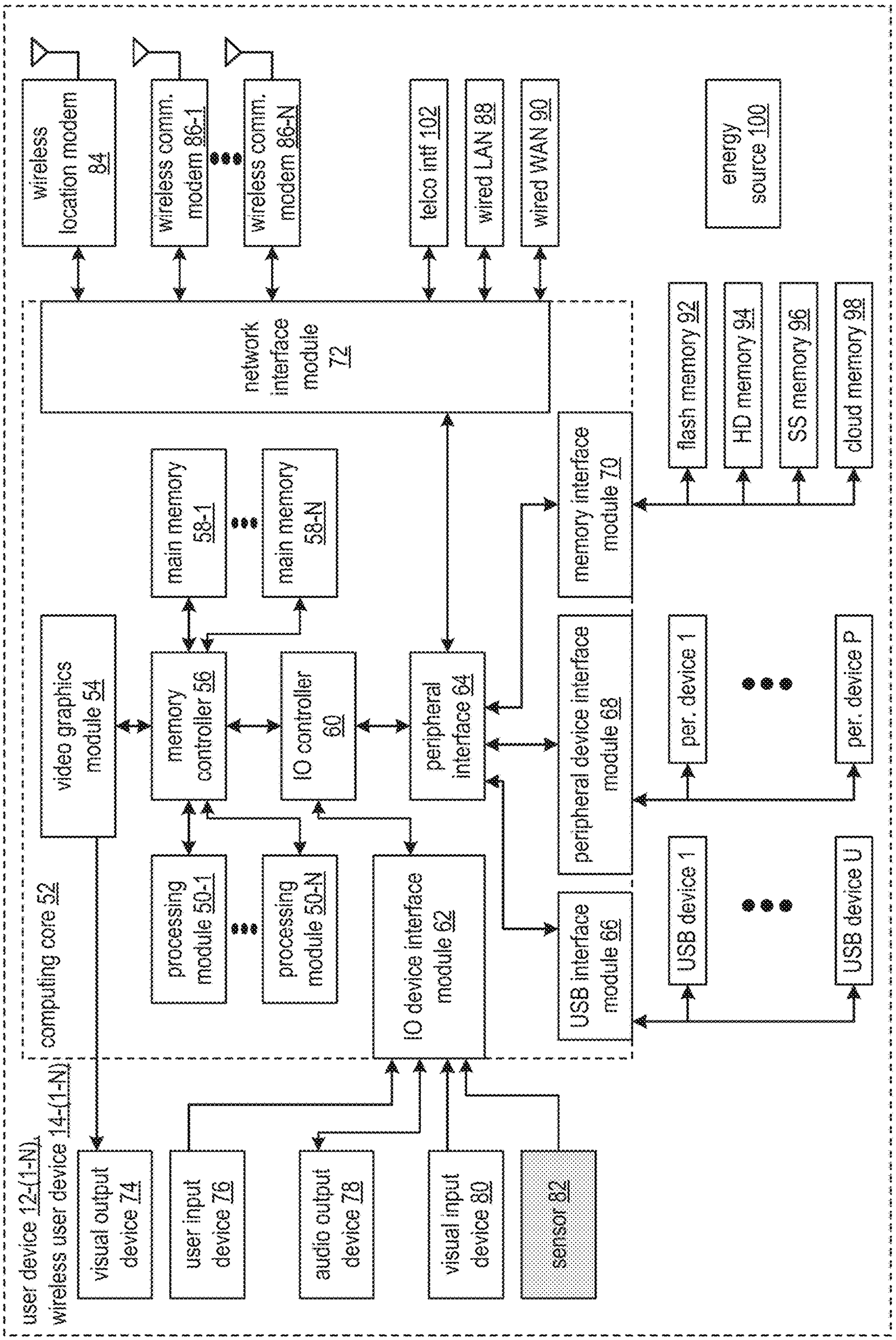
FIG. 3 is a schematic block diagram of an embodiment of various devices of a computing system in accordance with the present invention.

FIG. 3 is a schematic block diagram of an embodiment of the various devices of the computing system 10 of FIG. 1, including the user devices 12-1 through 12-N and the wireless user devices 14-1 through 14-N. The various devices include the visual output device 74 of FIG. 2, the user input device 76 of FIG. 2, the audio output device 78 of FIG. 2, the visual input device 80 of FIG. 2, and one or more sensors 82 implemented internally and/or externally to the device (e.g., a still camera, a video camera, servo motors associated with a camera, a position detector, a smoke detector, a gas detector, a motion sensor, an accelerometer, velocity detector, a compass, a gyro, a temperature sensor, a pressure sensor, an altitude sensor, a humidity detector, a moisture detector, an imaging sensor, a biometric sensor, an infrared sensor, an audio sensor, an ultrasonic sensor, a proximity detector, a magnetic field detector, a biomaterial detector, a radiation detector, a weight detector, a density detector, a chemical analysis detector, a fluid flow volume sensor, a DNA reader, a wind speed sensor, a wind direction sensor, an object detection sensor, an object identifier sensor, a motion recognition detector, a battery level detector, a room temperature sensor, a sound detector, a smoke detector, an intrusion detector, a motion detector, a door position sensor, a window position sensor, a sunlight detector, and medical category sensors including: a pulse rate monitor, a heart rhythm monitor, a breathing detector, a blood pressure monitor, a blood glucose level detector, blood type, an electrocardiogram sensor, a body mass detector, an imaging sensor, a microphone, body temperature, etc.).

The various devices further include the computing core 52 of FIG. 2, the one or more universal serial bus (USB) devices (USB devices 1-U) of FIG. 2, the one or more peripheral devices (e.g., peripheral devices 1-P) of FIG. 2, the one or more memories of FIG. 2 (e.g., flash memories 92, HD memories 94, SS memories 96, and/or cloud memories 98), the one or more wireless location modems 84 of FIG. 2, the one or more wireless communication modems 86-1 through 86-N of FIG. 2, the telco interface 102 of FIG. 2, the wired local area network (LAN) 88 of FIG. 2, the wired wide area network (WAN) 90 of FIG. 2, and the energy source 100 of FIG. 2. In other embodiments, the various devices may include more or less internal devices and modules than shown in this example embodiment of the various devices.

Figure 4A:
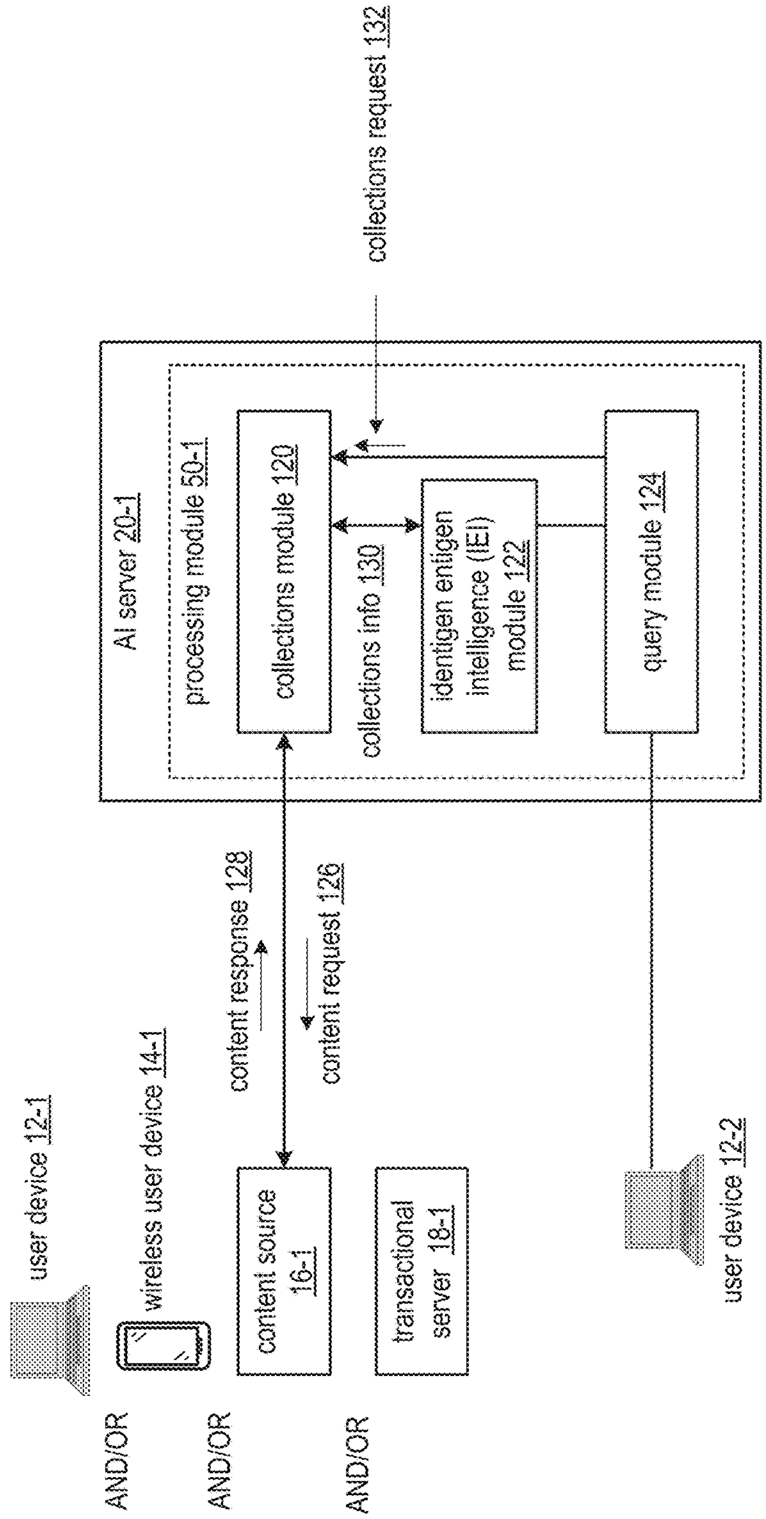
FIGS. 4A and 4B are schematic block diagrams of another embodiment of a computing system in accordance with the present invention.
Figure 4B:
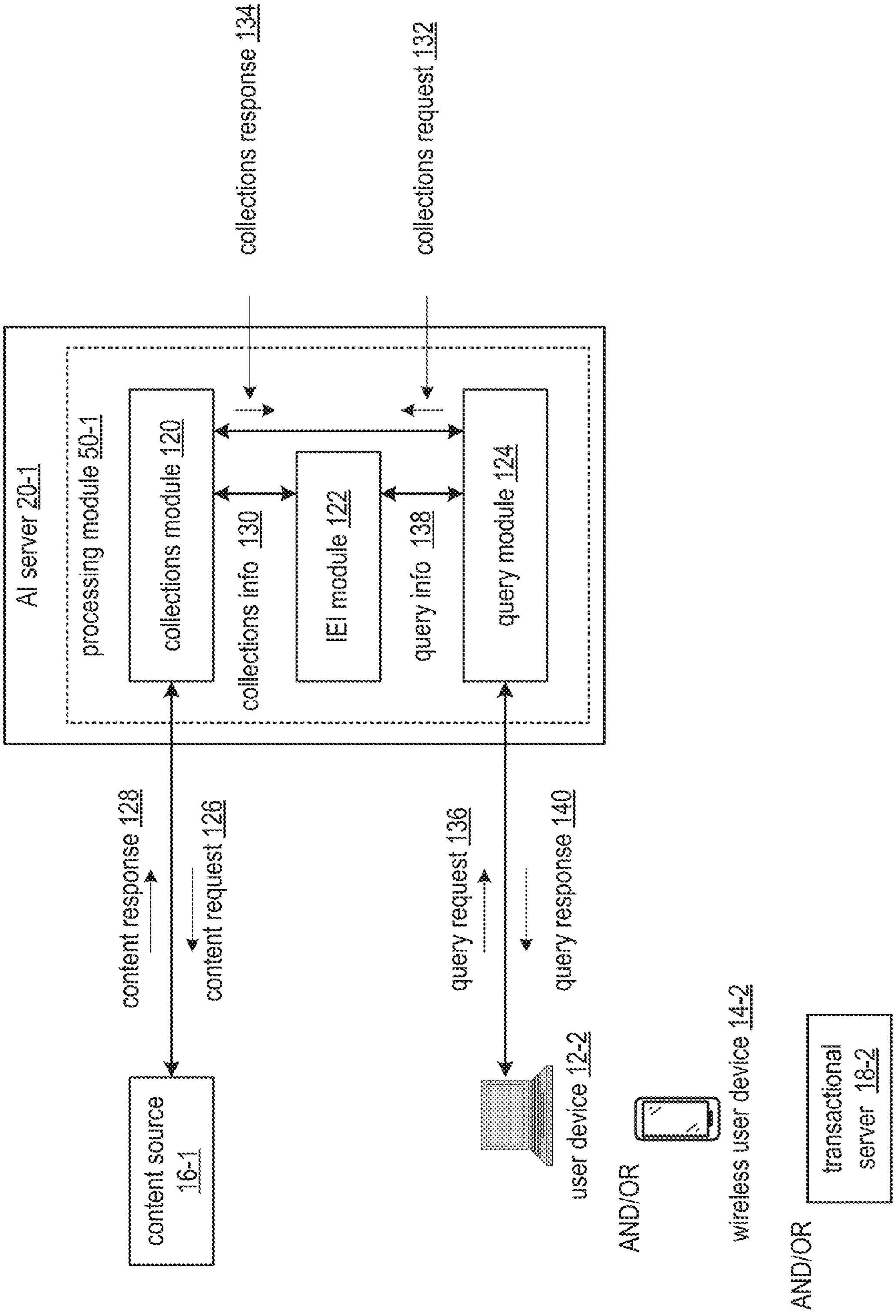

FIGS. 4A and 4B are schematic block diagrams of another embodiment of a computing system that includes one or more of the user device 12-1 of FIG. 1, the wireless user device 14-1 of FIG. 1, the content source 16-1 of FIG. 1, the transactional server 18-1 of FIG. 1, the user device 12-2 of FIG. 1, and the AI server 20-1 of FIG. 1. The AI server 20-1 includes the processing module 50-1 (e.g., associated with the servers) of FIG. 2, where the processing module 50-1 includes a collections module 120, an identigen entigen intelligence (IEI) module 122, and a query module 124. Alternatively, the collections module 120, the IEI module 122, and the query module 124 may be implemented by the processing module 50-1 (e.g., associated with the various user devices) of FIG. 3. The computing system functions to interpret content to produce a response to a query.

FIG. 4A illustrates an example of the interpreting of the content to produce the response to the query where the collections module 120 interprets (e.g., based on an interpretation approach such as rules) at least one of a collections request 132 from the query module 124 and a collections request within collections information 130 from the IEI module 122 to produce content request information (e.g., potential sources, content descriptors of desired content). Alternatively, or in addition to, the collections module 120 may facilitate gathering further content based on a plurality of collection requests from a plurality of devices of the computing system 10 of FIG. 1.

The collections request 132 is utilized to facilitate collection of content, where the content may be received in a real-time fashion once or at desired intervals, or in a static fashion from previous discrete time frames. For instance, the query module 124 issues the collections request 132 to facilitate collection of content as a background activity to support a long-term query (e.g., how many domestic airline flights over the next seven days include travelers between the age of 18 and 35 years old). The collections request 132 may include one or more of a requester identifier (ID), a content type (e.g., language, dialect, media type, topic, etc.), a content source indicator, security credentials (e.g., an authorization level, a password, a user ID, parameters utilized for encryption, etc.), a desired content quality level, trigger information (e.g., parameters under which to collect content based on a pre-event, an event (i.e., content quality level reaches a threshold to cause the trigger, trueness), or a timeframe), a desired format, and a desired timing associated with the content.

Having interpreted the collections request 132, the collections module 120 selects a source of content based on the content request information. The selecting includes one or more of identifying one or more potential sources based on the content request information, selecting the source of content from the potential sources utilizing a selection approach (e.g., favorable history, a favorable security level, favorable accessibility, favorable cost, favorable performance, etc.). For example, the collections module 120 selects the content source 16-1 when the content source 16-1 is known to provide a favorable content quality level for a domain associated with the collections request 132.

Having selected the source of content, the collections module 120 issues a content request 126 to the selected source of content. The issuing includes generating the content request 126 based on the content request information for the selected source of content and sending the content request 126 to the selected source of content. The content request 126 may include one or more of a content type indicator, a requester ID, security credentials for content access, and any other information associated with the collections request 132. For example, the collections module 120 sends the content request 126, via the core network 24 of FIG. 1, to the content source 16-1. Alternatively, or in addition to, the collections module 120 may send a similar content request 126 to one or more of the user device 12-1, the wireless user device 14-1, and the transactional server 18-1 to facilitate collecting of further content.

In response to the content request 126, the collections module 120 receives one or more content responses 128. The content response 128 includes one or more of content associated with the content source, a content source identifier, security credential processing information, and any other information pertaining to the desired content. Having received the content response 128, the collections module 120 interprets the received content response 128 to produce collections information 130, where the collections information 130 further includes a collections response from the collections module 120 to the IEI module 122. The collections response includes one or more of transformed content (e.g., completed sentences and paragraphs), timing information associated with the content, a content source ID, and a content quality level. Having generated the collections response of the collections information 130, the collections module 120 sends the collections information 130 to the IEI module 122. Having received the collections information 130 from the collections module 120, the IEI module 122 interprets the further content of the content response to generate further knowledge, where the further knowledge is stored in a memory associated with the IEI module 122 to facilitate subsequent answering of questions posed in received queries.

FIG. 4B further illustrates the example of the interpreting of the content to produce the response to the query where, the query module 124 interprets a received query request 136 from a requester to produce an interpretation of the query request. For example, the query module 124 receives the query request 136 from the user device 12-2, and/or from one or more of the wireless user device 14-2 and the transactional server 18-2. The query request 136 includes one or more of an identifier (ID) associated with the request (e.g., requester ID, ID of an entity to send a response to), a question, question constraints (e.g., within a timeframe, within a geographic area, within a domain of knowledge, etc.), and content associated with the question (e.g., which may be analyzed for new knowledge itself).

The interpreting of the query request 136 includes determining whether to issue a request to the IEI module 122 (e.g., a question, perhaps with content) and/or to issue a request to the collections module 120 (e.g., for further background content). For example, the query module 124 produces the interpretation of the query request to indicate to send the request directly to the IEI module 122 when the question is associated with a simple non-time varying function answer (e.g., question: "how many hydrogen atoms does a molecule of water have?").

Having interpreted the query request 136, the query module 124 issues at least one of an IEI request as query information 138 to the IEI module 122 (e.g., when receiving a simple new query request) and a collections request 132 to the collections module 120 (e.g., based on two or more query requests 136 requiring more substantive content gathering). The IEI request of the query information 138 includes one or more of an identifier (ID) of the query module 124, an ID of the requester (e.g., the user device 12-2), a question (e.g., with regards to content for analysis, with regards to knowledge minded by the AI server from general content), one or more constraints (e.g., assumptions, restrictions, etc.) associated with the question, content for analysis of the question, and timing information (e.g., a date range for relevance of the question).

Having received the query information 138 that includes the IEI request from the query module 124, the IEI module 122 determines whether a satisfactory response can be generated based on currently available knowledge, including that of the query request 136. The determining includes indicating that the satisfactory response cannot be generated when an estimated quality level of an answer falls below a minimum quality threshold level. When the satisfactory response cannot be generated, the IEI module 122 facilitates collecting more content. The facilitating includes issuing a collections request to the collections module 120 of the AI server 20-1 and/or to another server or user device, and interpreting a subsequent collections response 134 of collections information 130 that includes further content to produce further knowledge to enable a more favorable answer.

When the IEI module 122 indicates that the satisfactory response can be generated, the IEI module 122 issues an IEI response as query information 138 to the query module 124. The IEI response includes one or more of one or more answers, timing relevance of the one or more answers, an estimated quality level of each answer, and one or more assumptions associated with the answer. The issuing includes generating the IEI response based on the collections response 134 of the collections information 130 and the IEI request, and sending the IEI response as the query information 138 to the query module 124. Alternatively, or in addition to, at least some of the further content collected by the collections module 120 is utilized to generate a collections response 134 issued by the collections module 120 to the query module 124. The collections response 134 includes one or more of further content, a content availability indicator (e.g., when, where, required credentials, etc.), a content freshness indicator (e.g., timestamps, predicted time availability), content source identifiers, and a content quality level.

Having received the query information 138 from the IEI module 122, the query module 124 issues a query response 140 to the requester based on the IEI response and/or the collections response 134 directly from the collections module 120, where the collection module 120 generates the collections response 134 based on collected content and the collections request 132. The query response 140 includes one or more of an answer, answer timing, an answer quality level, and answer assumptions.

Figure 4C:
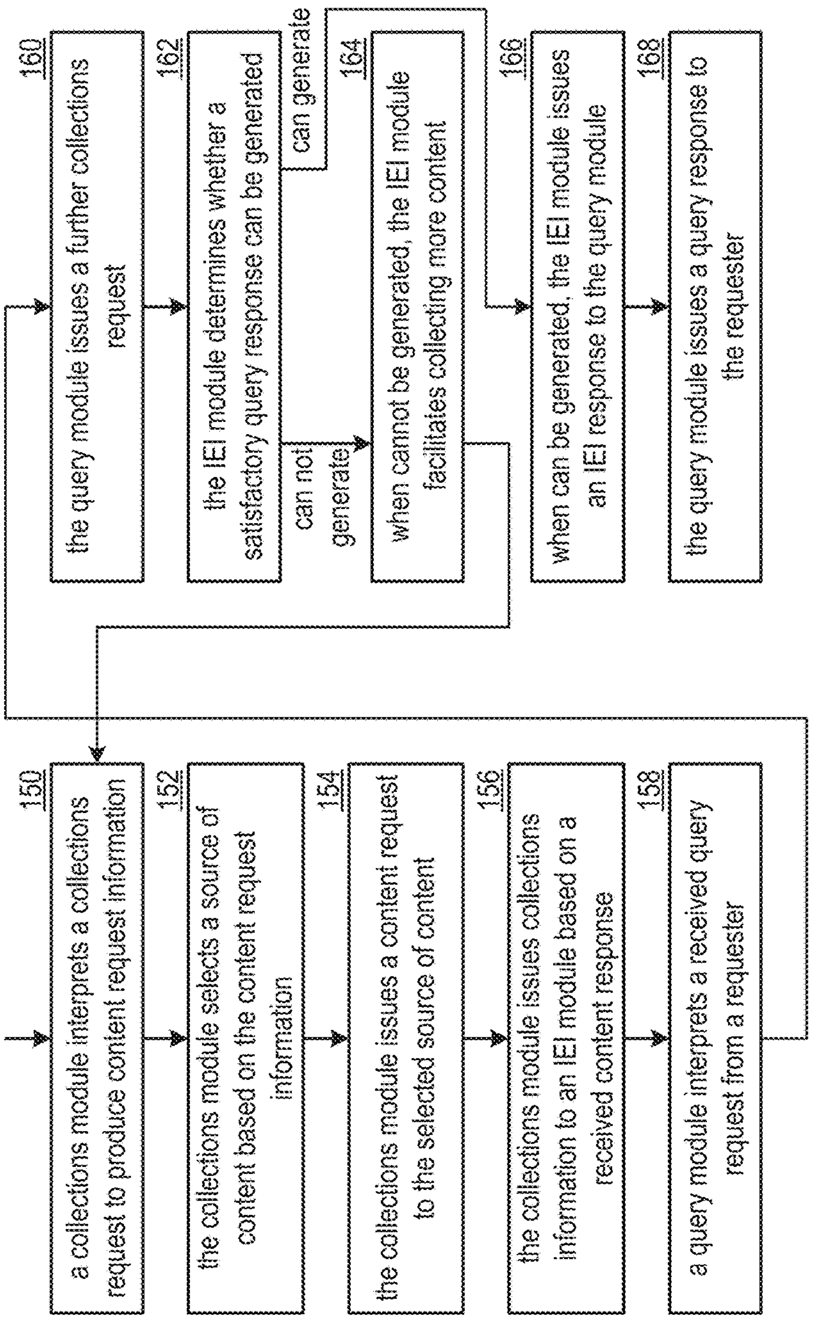
FIG. 4C is a logic diagram of an embodiment of a method for interpreting content to produce a response to a query within a computing system in accordance with the present invention.

FIG. 4C is a logic diagram of an embodiment of a method for interpreting content to produce a response to a query within a computing system. In particular, a method is presented for use in conjunction with one or more functions and features described in conjunction with FIGS. 1-3, 4A-4B, and also FIG. 4C. The method includes step 150 where a collections module of a processing module of one or more computing devices (e.g., of one or more servers) interprets a collections request to produce content request information. The interpreting may include one or more of identifying a desired content source, identifying a content type, identifying a content domain, and identifying content timing requirements.

The method continues at step 152 where the collections module selects a source of content based on the content request information. For example, the collections module identifies one or more potential sources based on the content request information and selects the source of content from the potential sources utilizing a selection approach (e.g., based on one or more of favorable history, a favorable security level, favorable accessibility, favorable cost, favorable performance, etc.). The method continues at step 154 where the collections module issues a content request to the selected source of content. The issuing includes generating a content request based on the content request information for the selected source of content and sending the content request to the selected source of content.

The method continues at step 156 where the collections module issues collections information to an identigen entigen intelligence (IEI) module based on a received content response, where the IEI module extracts further knowledge from newly obtained content from the one or more received content responses. For example, the collections module generates the collections information based on newly obtained content from the one or more received content responses of the selected source of content.

The method continues at step 158 where a query module interprets a received query request from a requester to produce an interpretation of the query request. The interpreting may include determining whether to issue a request to the IEI module (e.g., a question) or to issue a request to the collections module to gather further background content. The method continues at step 160 where the query module issues a further collections request. For example, when receiving a new query request, the query module generates a request for the IEI module. As another example, when receiving a plurality of query requests for similar questions, the query module generates a request for the collections module to gather further background content.

The method continues at step 162 where the IEI module determines whether a satisfactory query response can be generated when receiving the request from the query module. For example, the IEI module indicates that the satisfactory query response cannot be generated when an estimated quality level of an answer is below a minimum answer quality threshold level. The method branches to step 166 when the IEI module determines that the satisfactory query response can be generated. The method continues to step 164 when the IEI module determines that the satisfactory query response cannot be generated. When the satisfactory query response cannot be generated, the method continues at step 164 where the IEI module facilitates collecting more content. The method loops back to step 150.

When the satisfactory query response can be generated, the method continues at step 166 where the IEI module issues an IEI response to the query module. The issuing includes generating the IEI response based on the collections response and the IEI request, and sending the IEI response to the query module. The method continues at step 168 where the query module issues a query response to the requester. For example, the query module generates the query response based on the IEI response and/or a collections response from the collections module and sends the query response to the requester, where the collections module generates the collections response based on collected content and the collections request.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5A:
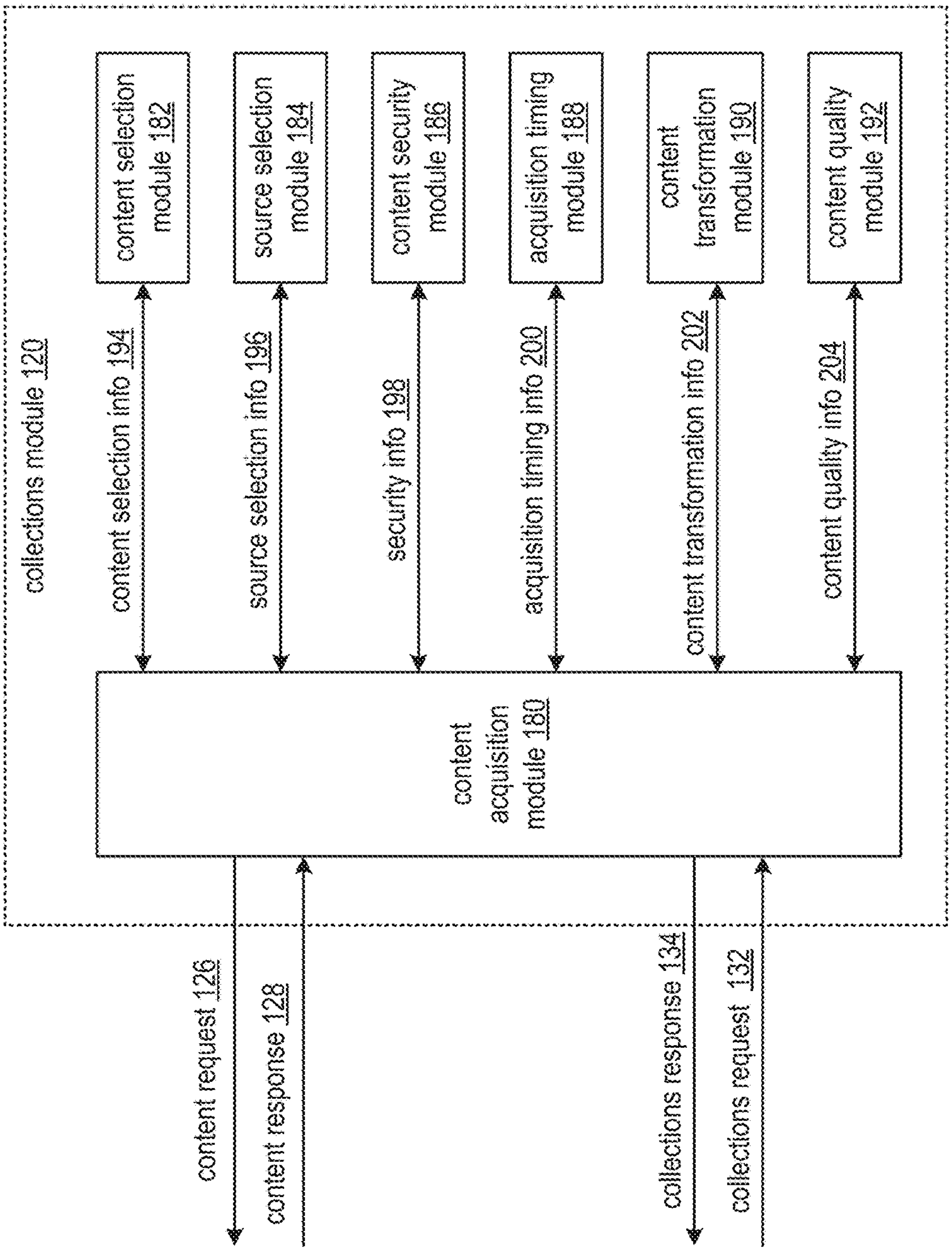
FIG. 5A is a schematic block diagram of an embodiment of a collections module of a computing system in accordance with the present invention.

FIG. 5A is a schematic block diagram of an embodiment of the collections module 120 of FIG. 4A that includes a content acquisition module 180, a content selection module 182, a source selection module 184, a content security module 186, an acquisition timing module 188, a content transformation module 190, and a content quality module 192. Generally, an embodiment of this invention presents solutions where the collections module 120 supports collecting content.

In an example of operation of the collecting of the content, the content acquisition module 180 receives a collections request 132 from a requester. The content acquisition module 180 obtains content selection information 194 based on the collections request 132. The content selection information 194 includes one or more of content requirements, a desired content type indicator, a desired content source identifier, a content type indicator, a candidate source identifier (ID), and a content profile (e.g., a template of typical parameters of the content). For example, the content acquisition module 180 receives the content selection information 194 from the content selection module 182, where the content selection module 182 generates the content selection information 194 based on a content selection information request from the content acquisition module 180 and where the content acquisition module 180 generates the content selection information request based on the collections request 132.

The content acquisition module 180 obtains source selection information 196 based on the collections request 132. The source selection information 196 includes one or more of candidate source identifiers, a content profile, selected sources, source priority levels, and recommended source access timing. For example, the content acquisition module 180 receives the source selection information 196 from the source selection module 184, where the source selection module 184 generates the source selection information 196 based on a source selection information request from the content acquisition module 180 and where the content acquisition module 180 generates the source selection information request based on the collections request 132.

The content acquisition module 180 obtains acquisition timing information 200 based on the collections request 132. The acquisition timing information 200 includes one or more of recommended source access timing, confirmed source access timing, source access testing results, estimated velocity of content update's, content precious, timestamps, predicted time availability, required content acquisition triggers, content acquisition trigger detection indicators, and a duplicative indicator with a pending content request. For example, the content acquisition module 180 receives the acquisition timing information 200 from the acquisition timing module 188, where the acquisition timing module 188 generates the acquisition timing information 200 based on an acquisition timing information request from the content acquisition module 180 and where the content acquisition module 180 generates the acquisition timing information request based on the collections request 132.

Having obtained the content selection information 194, the source selection information 196, and the acquisition timing information 200, the content acquisition module 180 issues a content request 126 to a content source utilizing security information 198 from the content security module 186, where the content acquisition module 180 generates the content request 126 in accordance with the content selection information 194, the source selection information 196, and the acquisition timing information 200. The security information 198 includes one or more of source priority requirements, requester security information, available security procedures, and security credentials for trust and/or encryption. For example, the content acquisition module 180 generates the content request 126 to request a particular content type in accordance with the content selection information 194 and to include security parameters of the security information 198, initiates sending of the content request 126 in accordance with the acquisition timing information 200, and sends the content request 126 to a particular targeted content source in accordance with the source selection information 196.

In response to receiving a content response 128, the content acquisition module 180 determines the quality level of received content extracted from the content response 128. For example, the content acquisition module 180 receives content quality information 204 from the content quality module 192, where the content quality module 192 generates the quality level of the received content based on receiving a content quality request from the content acquisition module 180 and where the content acquisition module 180 generates the content quality request based on content extracted from the content response 128. The content quality information includes one or more of a content reliability threshold range, a content accuracy threshold range, a desired content quality level, a predicted content quality level, and a predicted level of trust.

When the quality level is below a minimum desired quality threshold level, the content acquisition module 180 facilitates acquisition of further content. The facilitating includes issuing another content request 126 to a same content source and/or to another content source to receive and interpret further received content. When the quality level is above the minimum desired quality threshold level, the content acquisition module 180 issues a collections response 134 to the requester. The issuing includes processing the content in accordance with a transformation approach to produce transformed content, generating the collections response 134 to include the transformed content, and sending the collections response 134 to the requester. The processing of the content to produce the transformed content includes receiving content transformation information 202 from the content transformation module 190, where the content transformation module 190 transforms the content in accordance with the transformation approach to produce the transformed content. The content transformation information includes a desired format, available formats, recommended formatting, the received content, transformation instructions, and the transformed content.

Figure 5B:
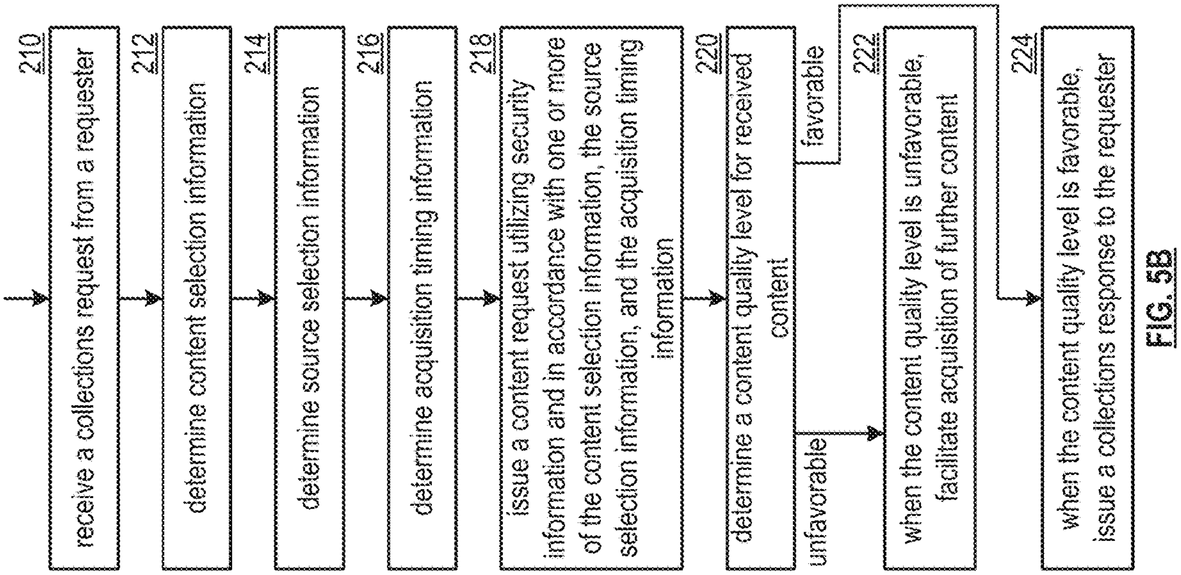
FIG. 5B is a logic diagram of an embodiment of a method for obtaining content within a computing system in accordance with the present invention.

FIG. 5B is a logic diagram of an embodiment of a method for obtaining content within a computing system. In particular, a method is presented for use in conjunction with one or more functions and features described in conjunction with FIGS. 1-3, 4A-4C, 5A, and also FIG. 5B. The method includes step 210 where a processing module of one or more processing modules of one or more computing devices of the computing system receives a collections request from the requester. The method continues at step 212 where the processing module determines content selection information. The determining includes interpreting the collections request to identify requirements of the content.

The method continues at step 214 for the processing module determines source selection information. The determining includes interpreting the collections request to identify and select one or more sources for the content to be collected. The method continues at step 216 for the processing module determines acquisition timing information. The determining includes interpreting the collections request to identify timing requirements for the acquisition of the content from the one or more sources. The method continues at step 218 where the processing module issues a content request utilizing security information and in accordance with one or more of the content selection information, the source selection information, and the acquisition timing information. For example, the processing module issues the content request to the one or more sources for the content in accordance with the content requirements, where the sending of the request is in accordance with the acquisition timing information.

The method continues at step 220 for the processing module determines a content quality level for received content area the determining includes receiving the content from the one or more sources, obtaining content quality information for the received content based on a quality analysis of the received content. The method branches to step 224 when the content quality level is favorable and the method continues to step 222 when the quality level is unfavorable. For example, the processing module determines that the content quality level is favorable when the content quality level is equal to or above a minimum quality threshold level and determines that the content quality level is unfavorable when the content quality level is less than the minimum quality threshold level.

When the content quality level is unfavorable, the method continues at step 222 where the processing module facilitates acquisition and further content. For example, the processing module issues further content requests and receives further content for analysis. When the content quality level is favorable, the method continues at step 224 where the processing module issues a collections response to the requester. The issuing includes generating the collections response and sending the collections response to the requester. The generating of the collections response may include transforming the received content into transformed content in accordance with a transformation approach (e.g., reformatting, interpreting absolute meaning and translating into another language in accordance with the absolute meaning, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5C:
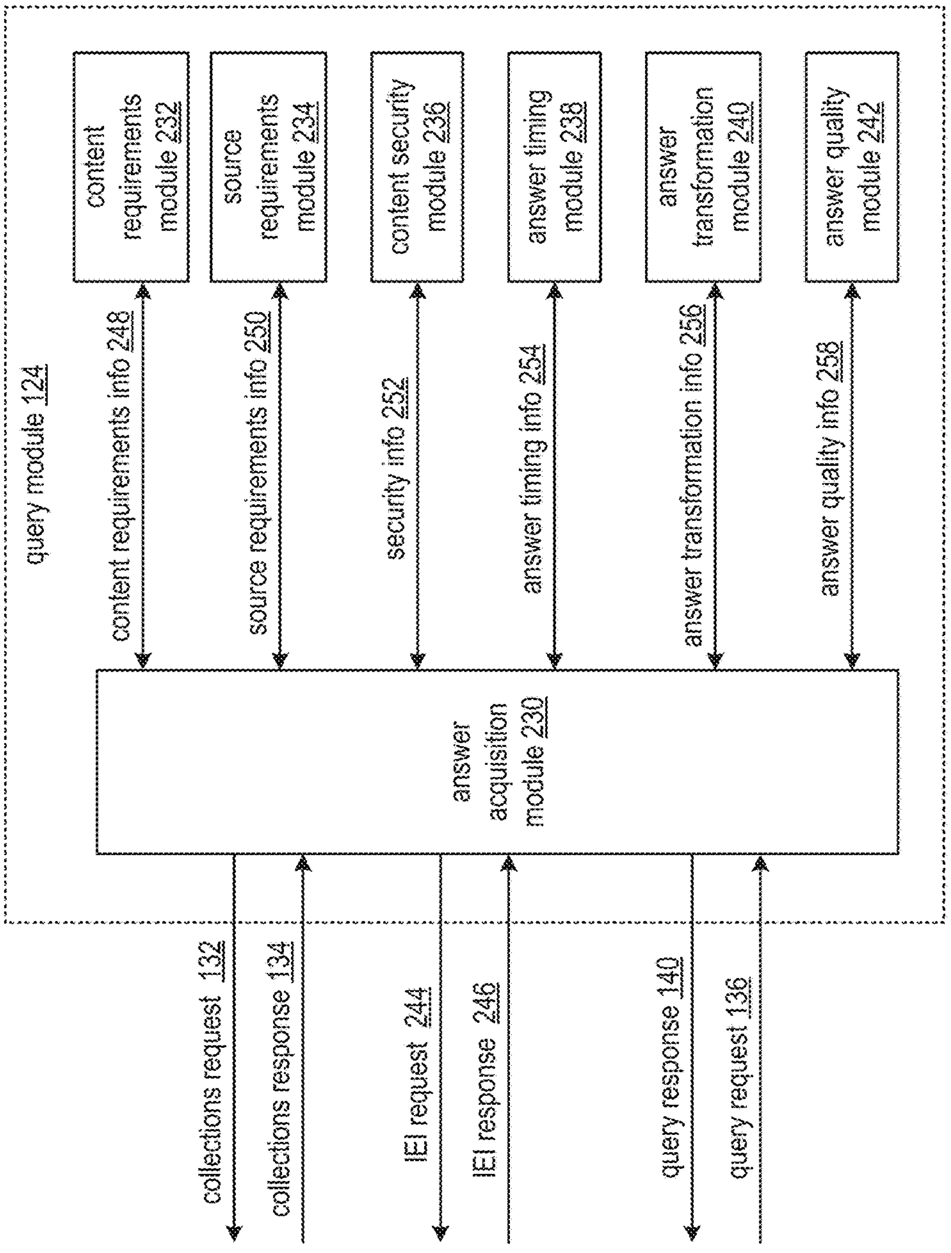
FIG. 5C is a schematic block diagram of an embodiment of a query module of a computing system in accordance with the present invention.

FIG. 5C is a schematic block diagram of an embodiment of the query module 124 of FIG. 4A that includes an answer acquisition module 230, a content requirements module 232 a source requirements module 234, a content security module 236, an answer timing module 238, an answer transformation module 240, and an answer quality module 242. Generally, an embodiment of this invention presents solutions where the query module 124 supports responding to a query.

In an example of operation of the responding to the query, the answer acquisition module 230 receives a query request 136 from a requester. The answer acquisition module 230 obtains content requirements information 248 based on the query request 136. The content requirements information 248 includes one or more of content parameters, a desired content type, a desired content source if any, a content type if any, candidate source identifiers, a content profile, and a question of the query request 136. For example, the answer acquisition module 230 receives the content requirements information 248 from the content requirements module 232, where the content requirements module 232 generates the content requirements information 248 based on a content requirements information request from the answer acquisition module 230 and where the answer acquisition module 230 generates the content requirements information request based on the query request 136.

The answer acquisition module 230 obtains source requirements information 250 based on the query request 136. The source requirements information 250 includes one or more of candidate source identifiers, a content profile, a desired source parameter, recommended source parameters, source priority levels, and recommended source access timing. For example, the answer acquisition module 230 receives the source requirements information 250 from the source requirements module 234, where the source requirements module 234 generates the source requirements information 250 based on a source requirements information request from the answer acquisition module 230 and where the answer acquisition module 230 generates the source requirements information request based on the query request 136.

The answer acquisition module 230 obtains answer timing information 254 based on the query request 136. The answer timing information 254 includes one or more of requested answer timing, confirmed answer timing, source access testing results, estimated velocity of content updates, content freshness, timestamps, predicted time available, requested content acquisition trigger, and a content acquisition trigger detected indicator. For example, the answer acquisition module 230 receives the answer timing information 254 from the answer timing module 238, where the answer timing module 238 generates the answer timing information 254 based on an answer timing information request from the answer acquisition module 230 and where the answer acquisition module 230 generates the answer timing information request based on the query request 136.

Having obtained the content requirements information 248, the source requirements information 250, and the answer timing information 254, the answer acquisition module 230 determines whether to issue an IEI request 244 and/or a collections request 132 based on one or more of the content requirements information 248, the source requirements information 250, and the answer timing information 254. For example, the answer acquisition module 230 selects the IEI request 244 when an immediate answer to a simple query request 136 is required and is expected to have a favorable quality level. As another example, the answer acquisition module 230 selects the collections request 132 when a longer-term answer is required as indicated by the answer timing information to before and/or when the query request 136 has an unfavorable quality level.

When issuing the IEI request 244, the answer acquisition module 230 generates the IEI request 244 in accordance with security information 252 received from the content security module 236 and based on one or more of the content requirements information 248, the source requirements information 250, and the answer timing information 254. Having generated the IEI request 244, the answer acquisition module 230 sends the IEI request 244 to at least one IEI module.

When issuing the collections request 132, the answer acquisition module 230 generates the collections request 132 in accordance with the security information 252 received from the content security module 236 and based on one or more of the content requirements information 248, the source requirements information 250, and the answer timing information 254. Having generated the collections request 132, the answer acquisition module 230 sends the collections request 132 to at least one collections module. Alternatively, the answer acquisition module 230 facilitate sending of the collections request 132 to one or more various user devices (e.g., to access a subject matter expert).

The answer acquisition module 230 determines a quality level of a received answer extracted from a collections response 134 and/or an IEI response 246. For example, the answer acquisition module 230 extracts the quality level of the received answer from answer quality information 258 received from the answer quality module 242 in response to an answer quality request from the answer acquisition module 230. When the quality level is unfavorable, the answer acquisition module 230 facilitates obtaining a further answer. The facilitation includes issuing at least one of a further IEI request 244 and a further collections request 132 to generate a further answer for further quality testing. When the quality level is favorable, the answer acquisition module 230 issues a query response 140 to the requester. The issuing includes generating the query response 140 based on answer transformation information 256 received from the answer transformation module 240, where the answer transformation module 240 generates the answer transformation information 256 to include a transformed answer based on receiving the answer from the answer acquisition module 230. The answer transformation information 250 6A further include the question, a desired format of the answer, available formats, recommended formatting, received IEI responses, transformation instructions, and transformed IEI responses into an answer.

Figure 5D:
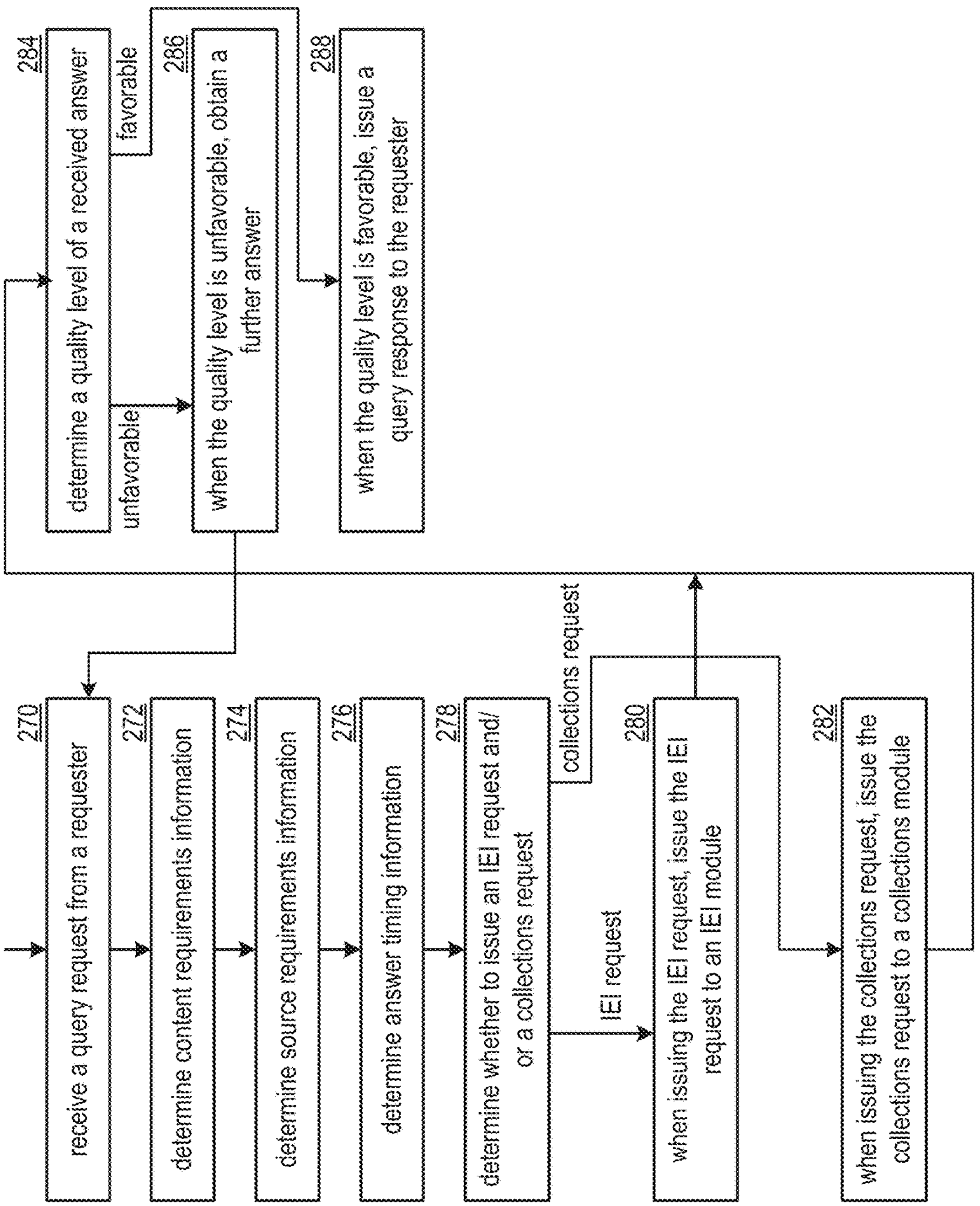
FIG. 5D is a logic diagram of an embodiment of a method for providing a response to a query within a computing system in accordance with the present invention.

FIG. 5D is a logic diagram of an embodiment of a method for providing a response to a query within a computing system. In particular, a method is presented for use in conjunction with one or more functions and features described in conjunction with FIGS. 1-3, 4A-4C, 5C, and also FIG. 5D. The method includes step 270 where a processing module of one or more processing modules of one or more computing devices of the computing system receives a query request (e.g., a question) from a requester. The method continues at step 272 where the processing module determines content requirements information. The determining includes interpreting the query request to produce the content requirements. The method continues at step 274 where the processing module determines source requirements information. The determining includes interpreting the query request to produce the source requirements. The method continues at step 276 where the processing module determines answer timing information. The determining includes interpreting the query request to produce the answer timing information.

The method continues at step 278 the processing module determines whether to issue an IEI request and/or a collections request. For example, the determining includes selecting the IEI request when the answer timing information indicates that a simple one-time answer is appropriate. As another example, the processing module selects the collections request when the answer timing information indicates that the answer is associated with a series of events over an event time frame. When issuing the IEI request, the method continues at step 280 where the processing module issues the IEI request to an IEI module. The issuing includes generating the IEI request in accordance with security information and based on one or more of the content requirements information, the source requirements information, and the answer timing information.

When issuing the collections request, the method continues at step 282 where the processing module issues the collections request to a collections module. The issuing includes generating the collections request in accordance with the security information and based on one or more of the content requirements information, the source requirements information, and the answer timing information. Alternatively, the processing module issues both the IEI request and the collections request when a satisfactory partial answer may be provided based on a corresponding IEI response and a further more generalized and specific answer may be provided based on a corresponding collections response and associated further IEI response.

The method continues at step 284 where the processing module determines a quality level of a received answer. The determining includes extracting the answer from the collections response and/or the IEI response and interpreting the answer in accordance with one or more of the content requirements information, the source requirements information, the answer timing information, and the query request to produce the quality level. The method branches to step 288 when the quality level is favorable and the method continues to step 286 when the quality level is unfavorable. For example, the processing module indicates that the quality level is favorable when the quality level is equal to or greater than a minimum answer quality threshold level. As another example, the processing module indicates that the quality level is unfavorable when the quality level is less than the minimum answer quality threshold level.

When the quality level is unfavorable, the method continues at step 286 where the processing module obtains a further answer. The obtaining includes at least one of issuing a further IEI request and a further collections request to facilitate obtaining of a further answer for further answer quality level testing as the method loops back to step 270. When the quality level is favorable, the method continues at step 288 where the processing module issues a query response to the requester. The issuing includes transforming the answer into a transformed answer in accordance with an answer transformation approach (e.g., formatting, further interpretations of the virtual question in light of the answer and further knowledge) and sending the transformed answer to the requester as the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5E:
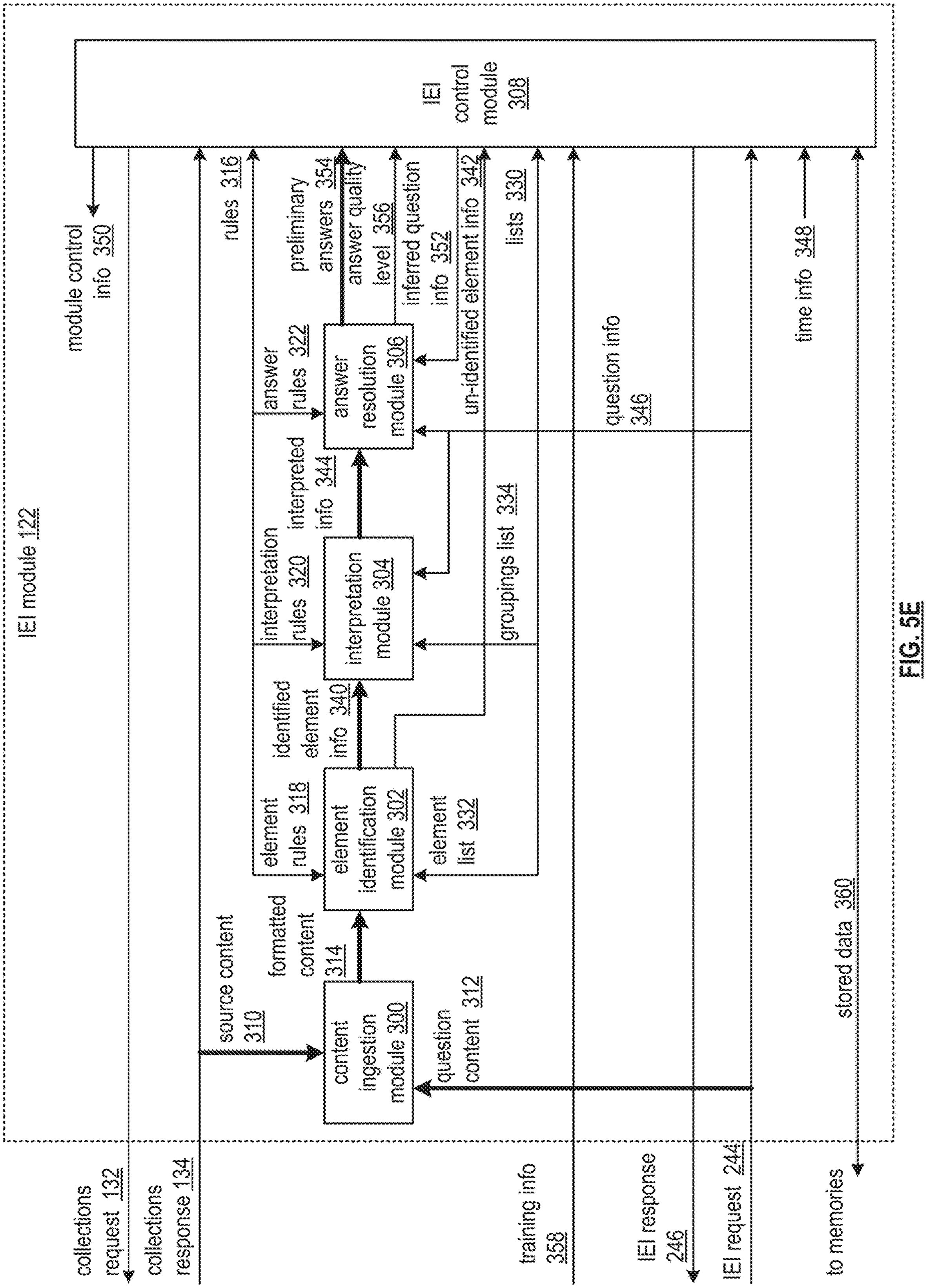
FIG. 5E is a schematic block diagram of an embodiment of an identigen entigen intelligence (WI) module of a computing system in accordance with the present invention.

FIG. 5E is a schematic block diagram of an embodiment of the identigen entigen intelligence (IEI) module 122 of FIG. 4A that includes a content ingestion module 300, an element identification module 302, and interpretation module 304, and answer resolution module 306, and an IEI control module 308. Generally, an embodiment of this invention presents solutions where the IEI module 122 supports interpreting content to produce knowledge that may be utilized to answer questions.

In an example of operation of the producing and utilizing of the knowledge, the content ingestion module 300 generates formatted content 314 based on question content 312 and/or source content 310, where the IEI module 122 receives an IEI request 244 that includes the question content 312 and the IEI module 122 receives a collections response 134 that includes the source content 310. The source content 310 includes content from a source extracted from the collections response 134. The question content 312 includes content extracted from the IEI request 244 (e.g., content paired with a question). The content ingestion module 300 generates the formatted content 314 in accordance with a formatting approach (e.g., creating proper sentences from words of the content). The formatted content 314 includes modified content that is compatible with subsequent element identification (e.g., complete sentences, combinations of words and interpreted sounds and/or inflection cues with temporal associations of words).

The element identification module 302 processes the formatted content 314 based on element rules 318 and an element list 332 to produce identified element information 340. Rules 316 includes the element rules 318 (e.g., match, partial match, language translation, etc.). Lists 330 includes the element list 332 (e.g., element ID, element context ID, element usage ID, words, characters, symbols etc.). The IEI control module 308 may provide the rules 316 and the lists 330 by accessing stored data 360 from a memory associated with the IEI module 122. Generally, an embodiment of this invention presents solutions where the stored data 360 may further include one or more of a descriptive dictionary, categories, representations of element sets, element list, sequence data, pending questions, pending request, recognized elements, unrecognized elements, errors, etc.

The identified element information 340 includes one or more of identifiers of elements identified in the formatted content 314, may include ordering and/or sequencing and grouping information. For example, the element identification module 302 compares elements of the formatted content 314 to known elements of the element list 332 to produce identifiers of the known elements as the identified element information 340 in accordance with the element rules 318. Alternatively, the element identification module 302 outputs un-identified element information 342 to the IEI control module 308, where the un-identified element information 342 includes temporary identifiers for elements not identifiable from the formatted content 314 when compared to the element list 332.

The interpretation module 304 processes the identified element information 340 in accordance with interpretation rules 320 (e.g., potentially valid permutations of various combinations of identified elements), question information 346 (e.g., a question extracted from the IEI request to hundred 44 which may be paired with content associated with the question), and a groupings list 334 (e.g., representations of associated groups of representations of things, a set of element identifiers, valid element usage IDs in accordance with similar, an element context, permutations of sets of identifiers for possible interpretations of a sentence or other) to produce interpreted information 344. The interpreted information 344 includes potentially valid interpretations of combinations of identified elements. Generally, an embodiment of this invention presents solutions where the interpretation module 304 supports producing the interpreted information 344 by considering permutations of the identified element information 340 in accordance with the interpretation rules 320 and the groupings list 334.

The answer resolution module 306 processes the interpreted information 344 based on answer rules 322 (e.g., guidance to extract a desired answer), the question information 346, and inferred question information 352 (e.g., posed by the IEI control module or analysis of general collections of content or refinement of a stated question from a request) to produce preliminary answers 354 and an answer quality level 356. The answer generally lies in the interpreted information 344 as both new content received and knowledge based on groupings list 334 generated based on previously received content. The preliminary answers 354 includes an answer to a stated or inferred question that subject further refinement. The answer quality level 356 includes a determination of a quality level of the preliminary answers 354 based on the answer rules 322. The inferred question information 352 may further be associated with time information 348, where the time information includes one or more of current real-time, a time reference associated with entity submitting a request, and a time reference of a collections response.

When the IEI control module 308 determines that the answer quality level 356 is below an answer quality threshold level, the IEI control module 308 facilitates collecting of further content (e.g., by issuing a collections request 132 and receiving corresponding collections responses 134 for analysis). When the answer quality level 356 compares favorably to the answer quality threshold level, the IEI control module 308 issues an IEI response 246 based on the preliminary answers 354. When receiving training information 358, the IEI control module 308 facilitates updating of one or more of the lists 330 and the rules 316 and stores the updated list 330 and the updated rules 316 in the memories as updated stored data 360.

Figure 5F:
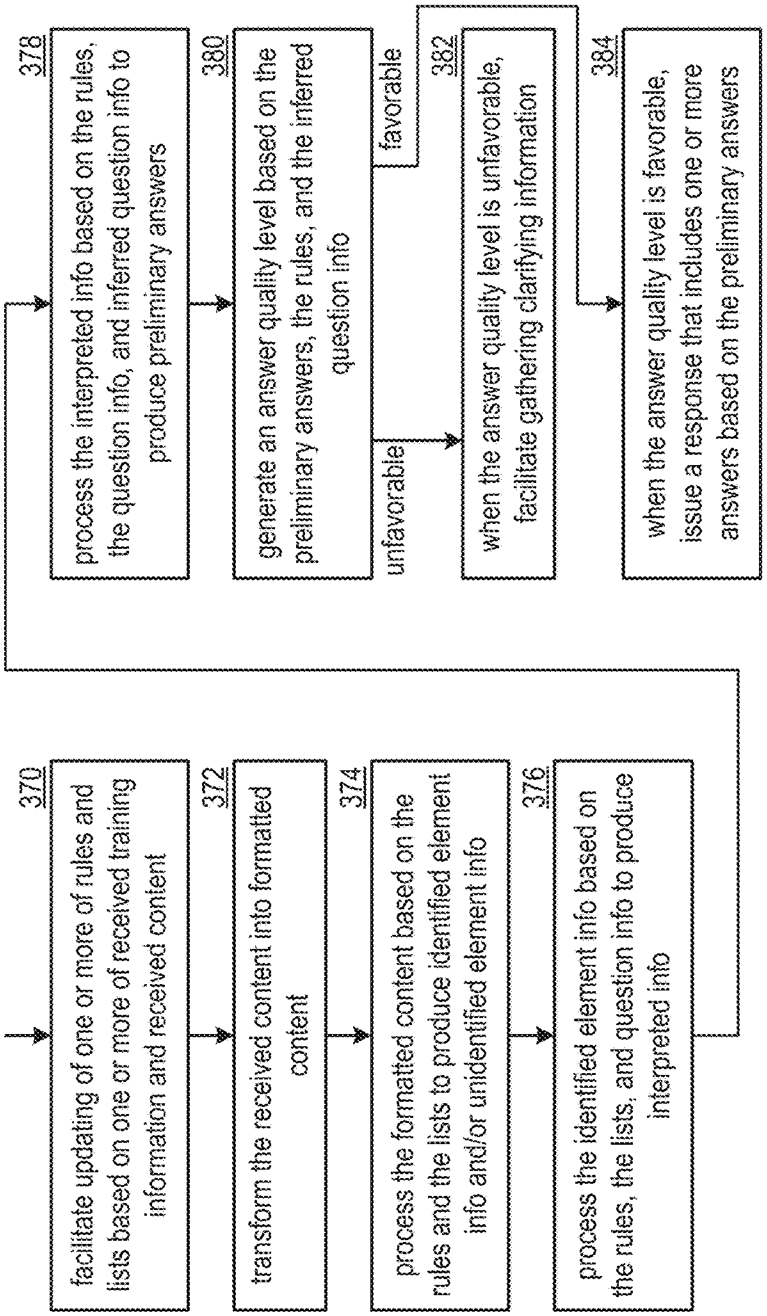
FIG. 5F is a logic diagram of an embodiment of a method for analyzing content within a computing system in accordance with the present invention.

FIG. 5F is a logic diagram of an embodiment of a method for analyzing content within a computing system. In particular, a method is presented for use in conjunction with one or more functions and features described in conjunction with FIGS. 1-3, 4A-4C, 5E, and also FIG. 5F. The method includes step 370 where a processing module of one or more processing modules of one or more computing devices of the computing system facilitates updating of one or more rules and lists based on one or more of received training information and received content. For example, the processing module updates rules with received rules to produce updated rules and updates element lists with received elements to produce updated element lists. As another example, the processing module interprets the received content to identify a new word for at least temporary inclusion in the updated element list.

The method continues at step 372 where the processing module transforms at least some of the received content into formatted content. For example, the processing module processes the received content in accordance with a transformation approach to produce the formatted content, where the formatted content supports compatibility with subsequent element identification (e.g., typical sentence structures of groups of words).

The method continues at step 374 where the processing module processes the formatted content based on the rules and the lists to produce identified element information and/or an identified element information. For example, the processing module compares the formatted content to element lists to identify a match producing identifiers for identified elements or new identifiers for unidentified elements when there is no match.

The method continues at step 376 with a processing module processes the identified element information based on rules, the lists, and question information to produce interpreted information. For example, the processing module compares the identified element information to associated groups of representations of things to generate potentially valid interpretations of combinations of identified elements.

The method continues at step 378 where the processing module processes the interpreted information based on the rules, the question information, and inferred question information to produce preliminary answers. For example, the processing module matches the interpreted information to one or more answers (e.g., embedded knowledge based on a fact base built from previously received content) with highest correctness likelihood levels that is subject to further refinement.

The method continues at step 380 where the processing module generates an answer quality level based on the preliminary answers, the rules, and the inferred question information. For example, the processing module predicts the answer correctness likelihood level based on the rules, the inferred question information, and the question information. The method branches to step 384 when the answer quality level is favorable and the method continues to step 382 when the answer quality level is unfavorable. For example, the generating of the answer quality level further includes the processing module indicating that the answer quality level is favorable when the answer quality level is greater than or equal to a minimum answer quality threshold level. As another example, the generating of the answer quality level further includes the processing module indicating that the answer quality level is unfavorable when the answer quality level is less than the minimum answer quality threshold level.

When the answer quality level is unfavorable, the method continues at step 382 where the processing module facilitates gathering clarifying information. For example, the processing module issues a collections request to facilitate receiving further content and or request question clarification from a question requester. When the answer quality level is favorable, the method continues at step 384 where the processing module issues a response that includes one or more answers based on the preliminary answers and/or further updated preliminary answers based on gathering further content. For example, the processing module generates a response that includes one or more answers and the answer quality level and issues the response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6A:
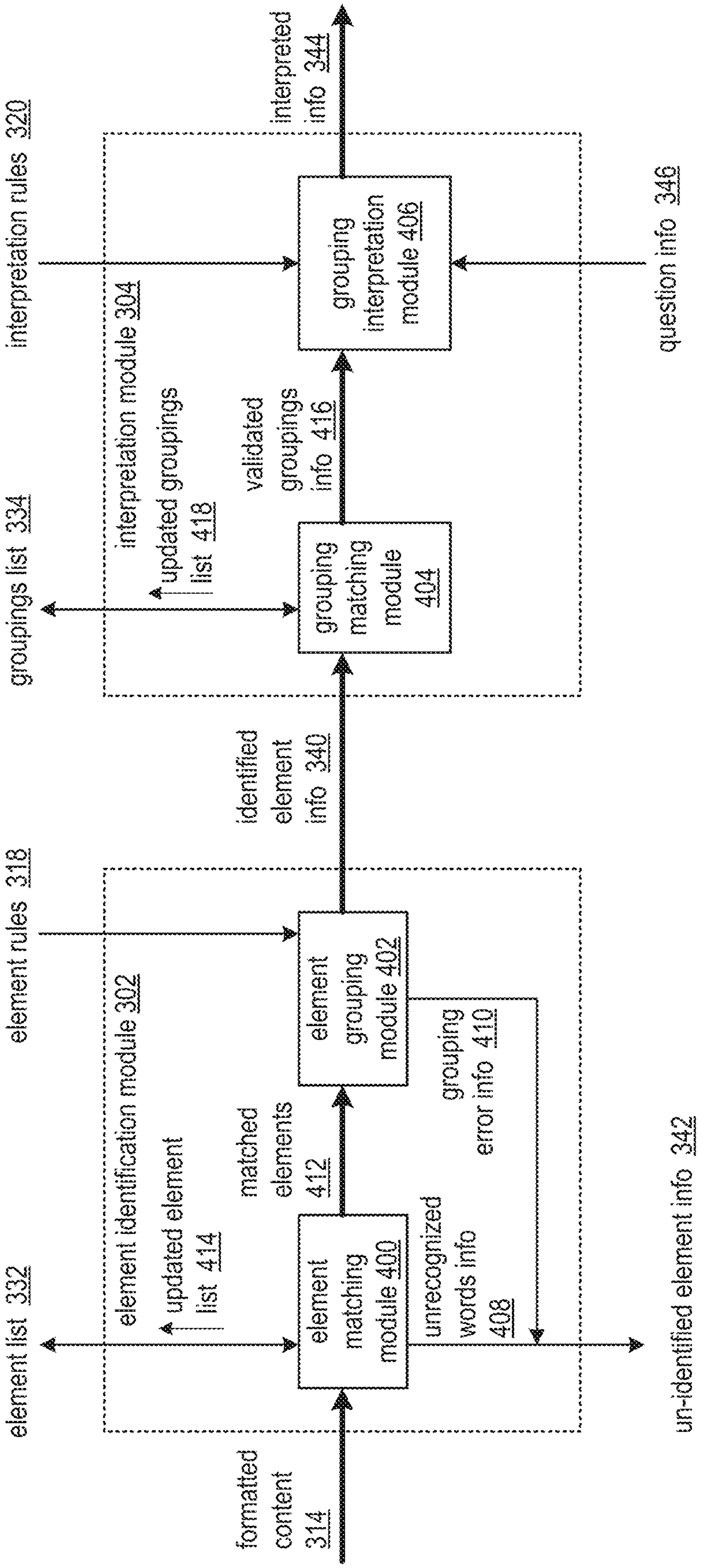
FIG. 6A is a schematic block diagram of an embodiment of an element identification module and an interpretation module of a computing system in accordance with the present invention.

FIG. 6A is a schematic block diagram of an embodiment of the element identification module 302 of FIG. 5A and the interpretation module 304 of FIG. 5A. The element identification module 302 includes an element matching module 400 and an element grouping module 402. The interpretation module 304 includes a grouping matching module 404 and a grouping interpretation module 406. Generally, an embodiment of this invention presents solutions where the element identification module 302 supports identifying potentially valid permutations of groupings of elements while the interpretation module 304 interprets the potentially valid permutations of groupings of elements to produce interpreted information that includes the most likely of groupings based on a question.

In an example of operation of the identifying of the potentially valid permutations of groupings of elements, when matching elements of the formatted content 314, the element matching module 400 generates matched elements 412 (e.g., identifiers of elements contained in the formatted content 314) based on the element list 332. For example, the element matching module 400 matches a received element to an element of the element list 332 and outputs the matched elements 412 to include an identifier of the matched element. When finding elements that are unidentified, the element matching module 400 outputs un-recognized words information 408 (e.g., words not in the element list 332, may temporarily add) as part of un-identified element information 342. For example, the element matching module 400 indicates that a match cannot be made between a received element of the formatted content 314, generates the unrecognized words info 408 to include the received element and/or a temporary identifier, and issues and updated element list 414 that includes the temporary identifier and the corresponding unidentified received element.

The element grouping module 402 analyzes the matched elements 412 in accordance with element rules 318 to produce grouping error information 410 (e.g., incorrect sentence structure indicators) when a structural error is detected. The element grouping module 402 produces identified element information 340 when favorable structure is associated with the matched elements in accordance with the element rules 318. The identified element information 340 may further include grouping information of the plurality of permutations of groups of elements (e.g., several possible interpretations), where the grouping information includes one or more groups of words forming an associated set and/or super-group set of two or more subsets when subsets share a common core element.

In an example of operation of the interpreting of the potentially valid permutations of groupings of elements to produce the interpreted information, the grouping matching module 404 analyzes the identified element information 340 in accordance with a groupings list 334 to produce validated groupings information 416. For example, the grouping matching module 404 compares a grouping aspect of the identified element information 340 (e.g., for each permutation of groups of elements of possible interpretations), generates the validated groupings information 416 to include identification of valid permutations aligned with the groupings list 334. Alternatively, or in addition to, the grouping matching module 404 generates an updated groupings list 418 when determining a new valid grouping (e.g., has favorable structure and interpreted meaning) that is to be added to the groupings list 334.

The grouping interpretation module 406 interprets the validated groupings information 416 based on the question information 346 and in accordance with the interpretation rules 320 to produce interpreted information 344 (e.g., most likely interpretations, next most likely interpretations, etc.). For example, the grouping interpretation module 406 obtains context, obtains favorable historical interpretations, processes the validated groupings based on interpretation rules 320, where each interpretation is associated with a correctness likelihood level.

Figure 6B:
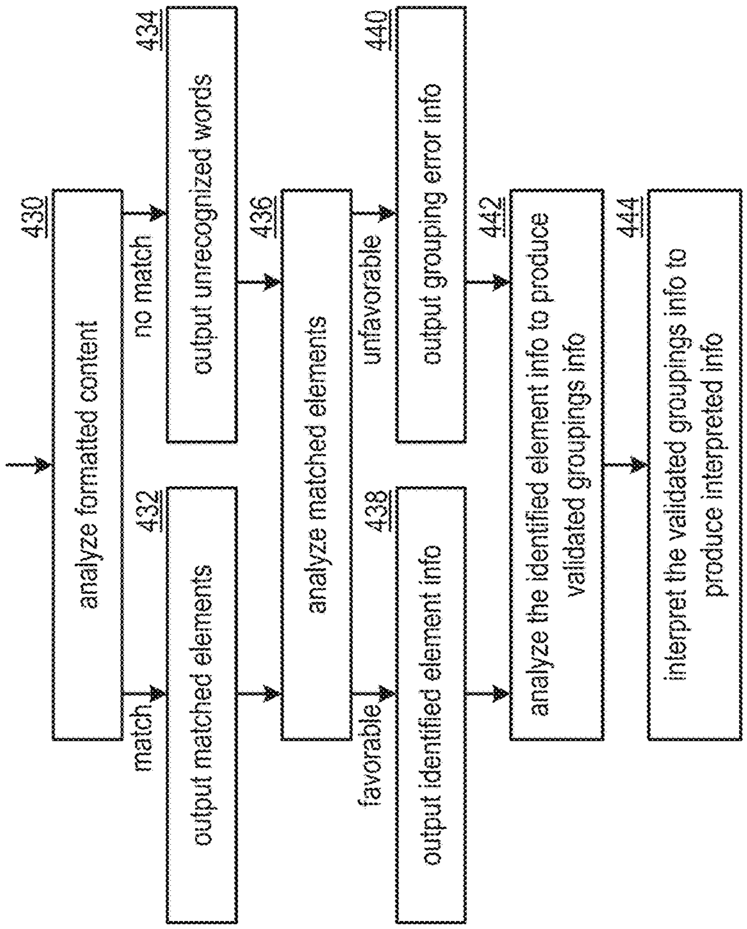
FIG. 6B is a logic diagram of an embodiment of a method for interpreting information within a computing system in accordance with the present invention.

FIG. 6B is a logic diagram of an embodiment of a method for interpreting information within a computing system. In particular, a method is presented for use in conjunction with one or more functions and features described in conjunction with FIGS. 1-3, 4A-4C, 5E-5F, 6A, and also FIG. 6B. The method includes step 430 where a processing module of one or more processing modules of one or more computing devices of the computing system analyzes formatted content. For example, the processing module attempt to match a received element of the formatted content to one or more elements of an elements list. When there is no match, the method branches to step 434 and when there is a match, the method continues to step 432. When there is a match, the method continues at step 432 for the processing module outputs matched elements (e.g., to include the matched element and/or an identifier of the matched element). When there is no match, the method continues at step 434 where the processing module outputs unrecognized words (e.g., elements and/or a temporary identifier for the unmatched element).

The method continues at step 436 for the processing module analyzes matched elements. For example, the processing module attempt to match a detected structure of the matched elements (e.g., chained elements as in a received sequence) to favorable structures in accordance with element rules. The method branches to step 440 when the analysis is unfavorable and the method continues to step 438 when the analysis is favorable. When the analysis is favorable matching a detected structure to the favorable structure of the element rules, the method continues at step 438 where the processing module outputs identified element information (e.g., an identifier of the favorable structure, identifiers of each of the detected elements). When the analysis is unfavorable matching a detected structure to the favorable structure of the element rules, the method continues at step 440 where the processing module outputs grouping error information (e.g., a representation of the incorrect structure, identifiers of the elements of the incorrect structure, a temporary new identifier of the incorrect structure).

The method continues at step 442 for the processing module analyzes the identified element information to produce validated groupings information. For example, the processing module compares a grouping aspect of the identified element information and generates the validated groupings information to include identification of valid permutations that align with the groupings list. Alternatively, or in addition to, the processing module generates an updated groupings list when determining a new valid grouping.

The method continues at step 444 where the processing module interprets the validated groupings information to produce interpreted information. For example, the processing module obtains one or more of context and historical interpretations and processes the validated groupings based on interpretation rules to generate the interpreted information, where each interpretation is associated with a correctness likelihood level (e.g., a quality level).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6C:
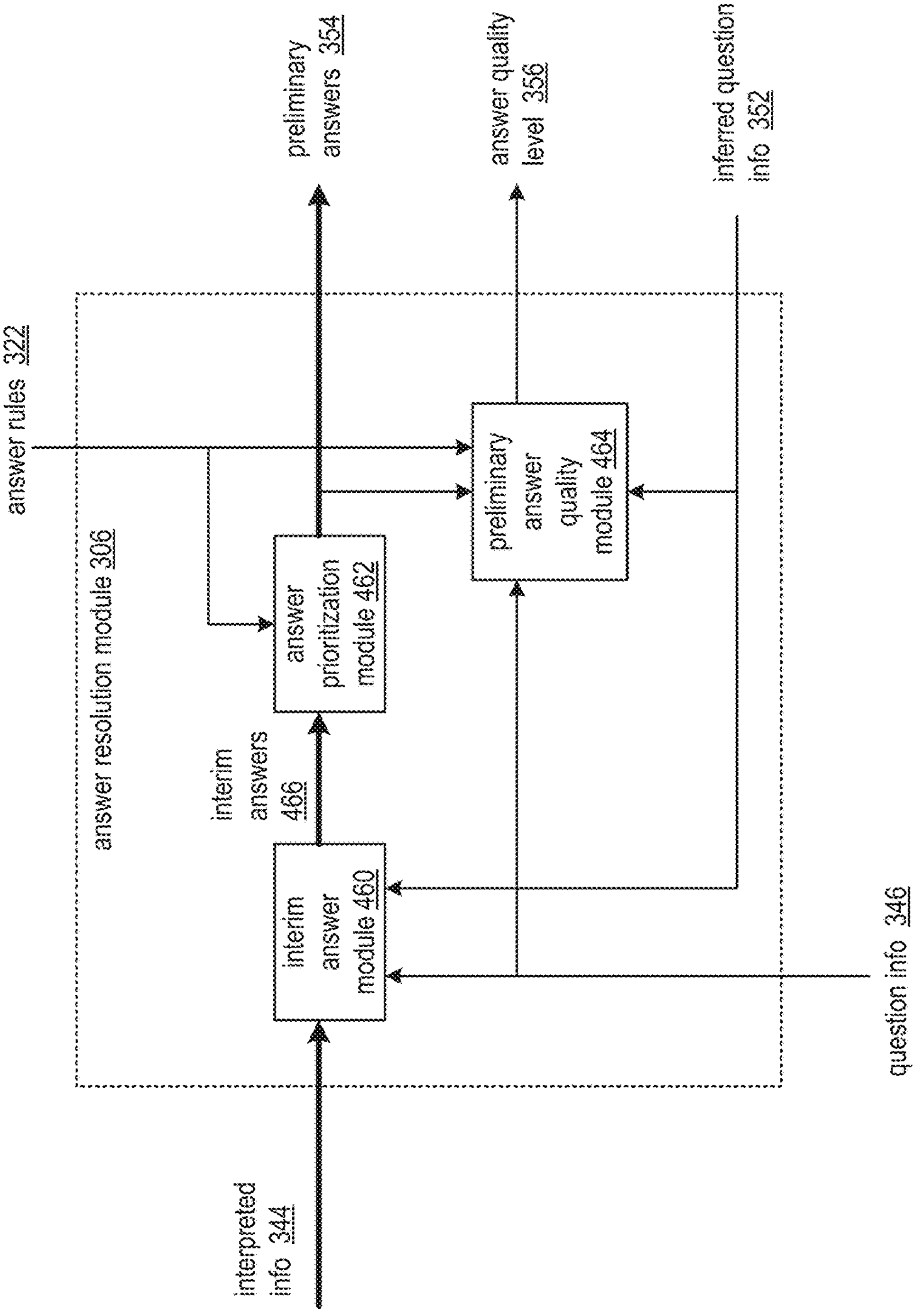
FIG. 6C is a schematic block diagram of an embodiment of an answer resolution module of a computing system in accordance with the present invention.

FIG. 6C is a schematic block diagram of an embodiment of the answer resolution module 306 of FIG. 5A that includes an interim answer module 460, and answer prioritization module 462, and a preliminary answer quality module 464. Generally, an embodiment of this invention presents solutions where the answer resolution module 306 supports producing an answer for interpreted information 344.

In an example of operation of the providing of the answer, the interim answer module 460 analyzes the interpreted information 344 based on question information 346 and inferred question information 352 to produce interim answers 466 (e.g., answers to stated and/or inferred questions without regard to rules that is subject to further refinement). The answer prioritization module 462 analyzes the interim answers 466 based on answer rules 322 to produce preliminary answer 354. For example, the answer prioritization module 462 identifies all possible answers from the interim answers 466 that conform to the answer rules 322.

The preliminary answer quality module 464 analyzes the preliminary answers 354 in accordance with the question information 346, the inferred question information 352, and the answer rules 322 to produce an answer quality level 356. For example, for each of the preliminary answers 354, the preliminary answer quality module 464 may compare a fit of the preliminary answer 354 to a corresponding previous answer and question quality level, calculate the answer quality level 356 based on a level of conformance to the answer rules 322, calculate the answer quality level 356 based on alignment with the inferred question information 352, and determine the answer quality level 356 based on an interpreted correlation with the question information 346.

Figure 6D:
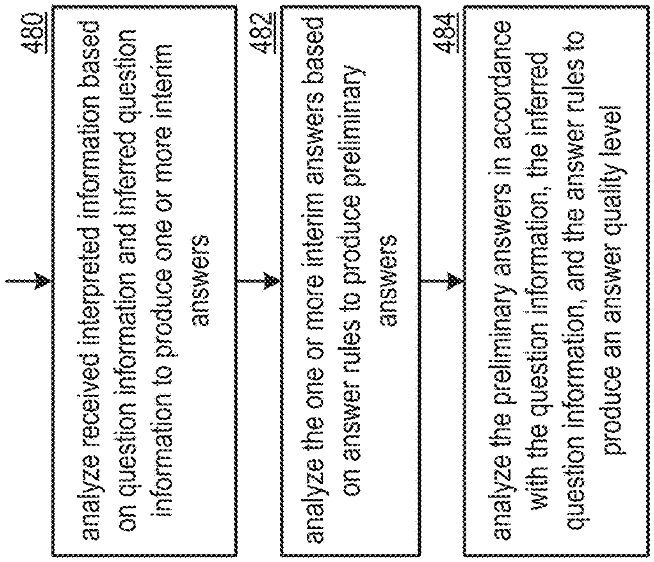
FIG. 6D is a logic diagram of an embodiment of a method for producing an answer within a computing system in accordance with the present invention.

FIG. 6D is a logic diagram of an embodiment of a method for producing an answer within a computing system. In particular, a method is presented for use in conjunction with one or more functions and features described in conjunction with FIGS. 1-3, 4A-4C, 5E-5F, 6C, and also FIG. 6D. The method includes step 480 where a processing module of one or more processing modules of one or more computing devices of the computing system analyzes received interpreted information based on question information and inferred question information to produce one or more interim answers. For example, the processing module generates potential answers based on patterns consistent with previously produced knowledge and likelihood of correctness.

The method continues at step 482 where the processing module analyzes the one or more interim answers based on answer rules to produce preliminary answers. For example, the processing module identifies all possible answers from the interim answers that conform to the answer rules. The method continues at step 484 for the processing module analyzes the preliminary answers in accordance with the question information, the inferred question information, and the answer rules to produce an answer quality level. For example, for each of the elementary answers, the processing module may compare a fit of the preliminary answer to a corresponding previous answer-and-answer quality level, calculate the answer quality level based on performance to the answer rules, calculate answer quality level based on alignment with the inferred question information, and determine the answer quality level based on interpreted correlation with the question information.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 7A:
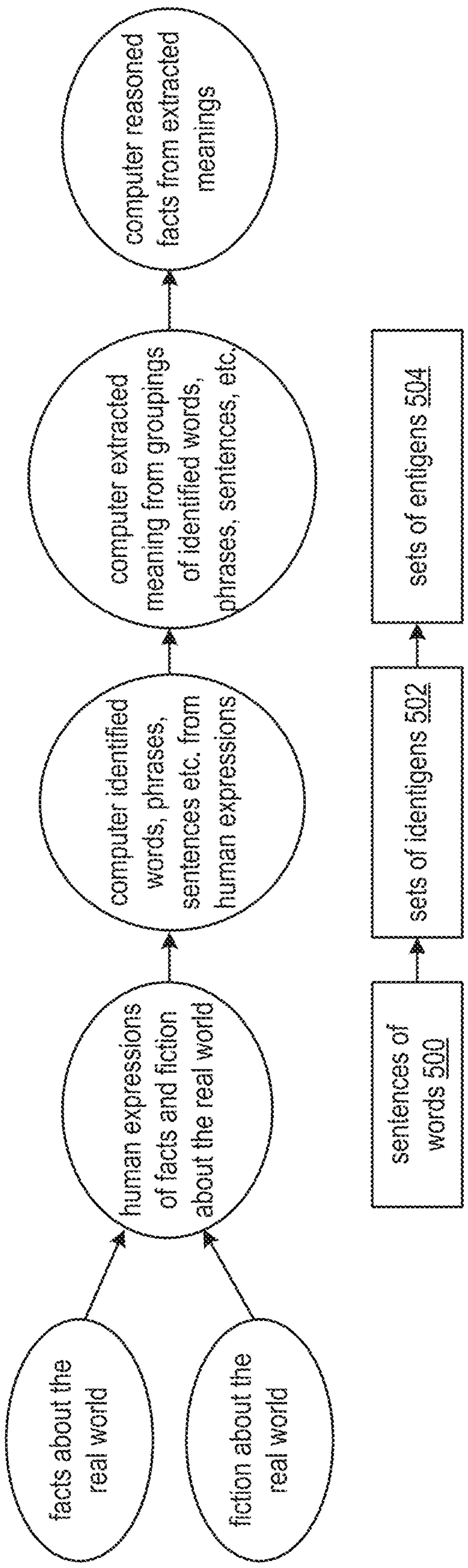
FIG. 7A is an information flow diagram for interpreting information within a computing system in accordance with the present invention.

FIG. 7A is an information flow diagram for interpreting information within a computing system, where sets of entigens 504 are interpreted from sets of identigens 502 which are interpreted from sentences of words 500. Such identigen entigen intelligence (IEI) processing of the words (e.g., to IEI process) includes producing one or more of interim knowledge, a preliminary answer, and an answer quality level. For example, the IEI processing includes identifying permutations of identigens of a phrase of a sentence (e.g., interpreting human expressions to produce identigen groupings for each word of ingested content), reducing the permutations of identigens (e.g., utilizing rules to eliminate unfavorable permutations), mapping the reduced permutations of identigens to at least one set of entigens (e.g., most likely identigens become the entigens) to produce the interim knowledge, processing the knowledge in accordance with a knowledge base (e.g., comparing the set of entigens to the knowledge base) to produce a preliminary answer, and generating the answer quality level based on the preliminary answer for a corresponding domain.

Human expressions are utilized to portray facts and fiction about the real world. The real-world includes items, actions, and attributes. The human expressions include textual words, textual symbols, images, and other sensorial information (e.g., sounds). It is known that many words, within a given language, can mean different things based on groupings and orderings of the words. For example, the sentences of words 500 can include many different forms of sentences that mean vastly different things even when the words are very similar.

The present invention presents solutions where the computing system 10 supports producing a computer-based representation of a truest meaning possible of the human expressions given the way that multitudes of human expressions relate to these meanings. As a first step of the flow diagram to transition from human representations of things to a most precise computer representation of the things, the computer identifies the words, phrases, sentences, etc. from the human expressions to produce the sets of identigens 502. Each identigen includes an identifier of their meaning and an identifier of an instance for each possible language, culture, etc. For example, the words car and automobile share a common meaning identifier but have different instance identifiers since they are different words and are spelled differently. As another example, the word duck is associated both with a bird and an action to elude even though they are spelled the same. In this example the bird duck has a different meaning than the elude duck and as such each has a different meaning identifier of the corresponding identigens.

As a second step of the flow diagram to transition from human representations of things to the most precise computer representation of the things, the computer extracts meaning from groupings of the identified words, phrases, sentences, etc. to produce the sets of entigens 504. Each entigen includes an identifier of a single conceivable and perceivable thing in space and time (e.g., independent of language and other aspects of the human expressions). For example, the words car and automobile are different instances of the same meaning and point to a common shared entigen. As another example, the word duck for the bird meaning has an associated unique entigen that is different than the entigen for the word duck for the elude meaning.

As a third step of the flow diagram to transition from human expressions of things to the most precise computer representation of the things, the computer reasons facts from the extracted meanings. For example, the computer maintains a fact-based of the valid meanings from the valid groupings or sets of entigens so as to support subsequent inferences, deductions, rationalizations of posed questions to produce answers that are aligned with a most factual view. As time goes on, and as an entigen has been identified, it can encounter an experience transformations in time, space, attributes, actions, and words which are used to identify it without creating contradictions or ever losing its identity.

Figure 7B:
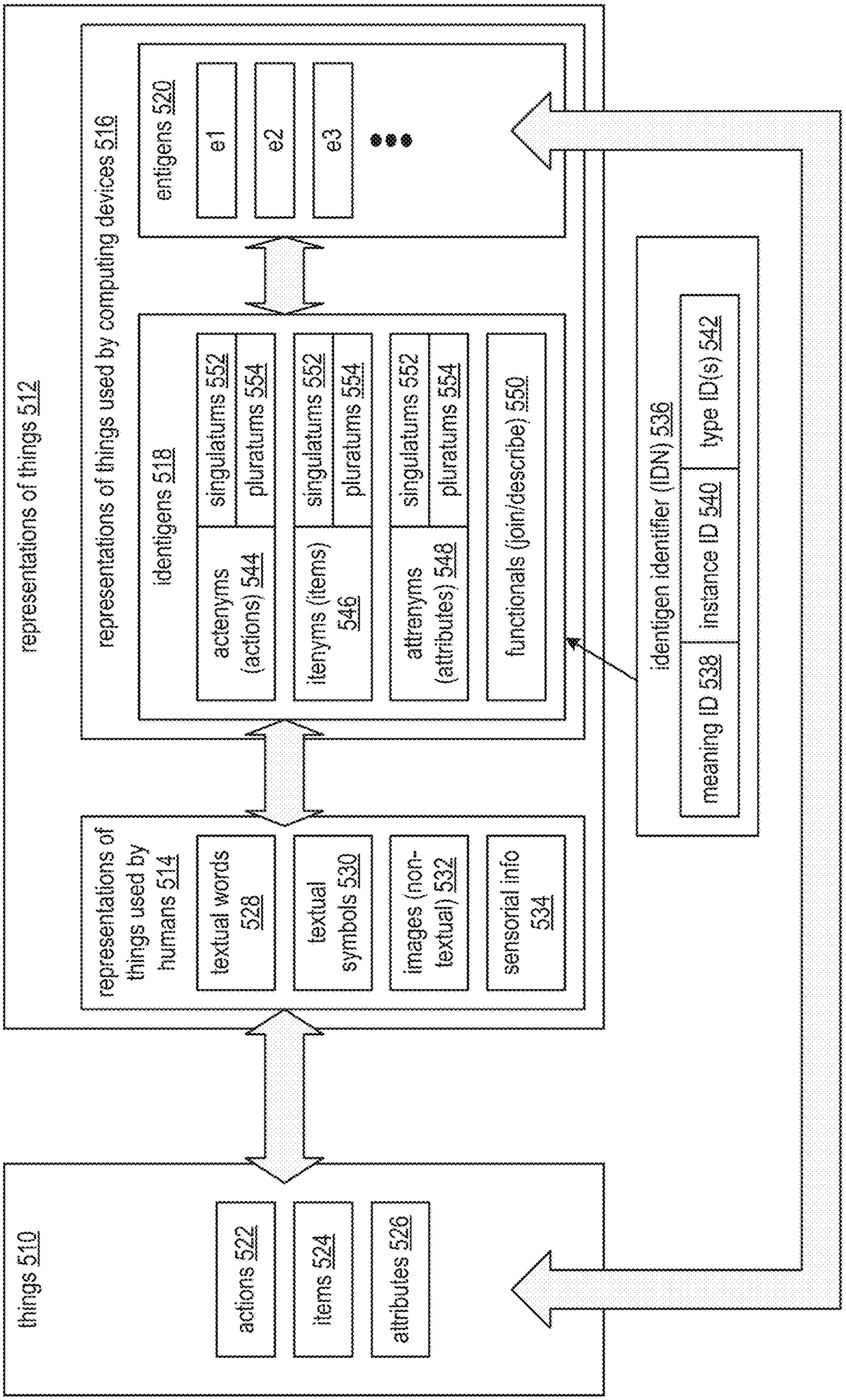
FIG. 7B is a relationship block diagram illustrating an embodiment of relationships between things and representations of things within a computing system in accordance with the present invention.

FIG. 7B is a relationship block diagram illustrating an embodiment of relationships between things 510 and representations of things 512 within a computing system. The things 510 includes conceivable and perceivable things including actions 522, items 524, and attributes 526. The representation of things 512 includes representations of things used by humans 514 and representation of things used by of computing devices 516 of embodiments of the present invention. The things 510 relates to the representations of things used by humans 514 where the invention presents solutions where the computing system 10 supports mapping the representations of things used by humans 514 to the representations of things used by computing devices 516, where the representations of things used by computing devices 516 map back to the things 510.

The representations of things used by humans 514 includes textual words 528, textual symbols 530, images (e.g., non-textual) 532, and other sensorial information 534 (e.g., sounds, sensor data, electrical fields, voice inflections, emotion representations, facial expressions, whistles, etc.). The representations of things used by computing devices 516 includes identigens 518 and entigens 520. The representations of things used by humans 514 maps to the identigens 518 and the identigens 518 map to the entigens 520. The entigens 520 uniquely maps back to the things 510 in space and time, a truest meaning the computer is looking for to create knowledge and answer questions based on the knowledge.

To accommodate the mapping of the representations of things used by humans 514 to the identigens 518, the identigens 518 is partitioned into actenyms 544 (e.g., actions), itenyms 546 (e.g., items), attrenyms 548 (e.g., attributes), and functionals 550 (e.g., that join and/or describe). Each of the actenyms 544, itenyms 546, and attrenyms 548 may be further classified into singulatums 552 (e.g., identify one unique entigen) and pluratums 554 (e.g., identify a plurality of entigens that have similarities).

Each identigen 518 is associated with an identigens identifier (IDN) 536. The IDN 536 includes a meaning identifier (ID) 538 portion, an instance ID 540 portion, and a type ID 542 portion. The meaning ID 538 includes an identifier of common meaning. The instance ID 540 includes an identifier of a particular word and language. The type ID 542 includes one or more identifiers for actenyms, itenyms, attrenyms, singulatums, pluratums, a time reference, and any other reference to describe the IDN 536. The mapping of the representations of things used by humans 514 to the identigens 518 by the computing system of the present invention includes determining the identigens 518 in accordance with logic and instructions for forming groupings of words.

Generally, an embodiment of this invention presents solutions where the identigens 518 map to the entigens 520. Multiple identigens may map to a common unique entigen. The mapping of the identigens 518 to the entigens 520 by the computing system of the present invention includes determining entigens in accordance with logic and instructions for forming groupings of identigens.

FIG. 7C is a diagram of an embodiment of a synonym words table 570 within a computing system, where the synonym words table 570 includes multiple fields including textual words 572, identigens 518, and entigens 520. The identigens 518 includes fields for the meaning identifier (ID) 538 and the instance ID 540. The computing system of the present invention may utilize the synonym words table 570 to map textual words 572 to identigens 518 and map the identigens 518 to entigens 520. For example, the words car, automobile, auto, bil (Swedish), carro (Spanish), and bil (Danish) all share a common meaning but are different instances (e.g., different words and languages). The words map to a common meaning ID but to individual unique instant identifiers. Each of the different identigens map to a common entigen since they describe the same thing.

FIG. 7D is a diagram of an embodiment of a polysemous words table 576 within a computing system, where the polysemous words table 576 includes multiple fields including textual words 572, identigens 518, and entigens 520. The identigens 518 includes fields for the meaning identifier (ID) 538 and the instance ID 540. The computing system of the present invention may utilize the polysemous words table 576 to map textual words 572 to identigens 518 and map the identigens 518 to entigens 520. For example, the word duck maps to four different identigens since the word duck has four associated different meanings (e.g., bird, fabric, to submerge, to elude) and instances. Each of the identigens represent different things and hence map to four different entigens.

FIG. 7E is a diagram of an embodiment of transforming words into groupings within a computing system that includes a words table 580, a groupings of words section to validate permutations of groupings, and a groupings table 584 to capture the valid groupings. The words table 580 includes multiple fields including textual words 572, identigens 518, and entigens 520. The identigens 518 includes fields for the meaning identifier (ID) 538, the instance ID 540, and the type ID 542. The computing system of the present invention may utilize the words table 580 to map textual words 572 to identigens 518 and map the identigens 518 to entigens 520. For example, the word pilot may refer to a flyer and the action to fly. Each meaning has a different identigen and different entigen.

The computing system the present invention may apply rules to the fields of the words table 580 to validate various groupings of words. Those that are invalid are denoted with a "X" while those that are valid are associated with a check mark. For example, the grouping "pilot Tom" is invalid when the word pilot refers to flying and Tom refers to a person. The identigen combinations for the flying pilot and the person Tom are denoted as invalid by the rules. As another example, the grouping "pilot Tom" is valid when the word pilot refers to a flyer and Tom refers to the person. The identigen combinations for the flyer pilot and the person Tom are denoted as valid by the rules.

The groupings table 584 includes multiple fields including grouping ID 586, word strings 588, identigens 518, and entigens 520. The computing system of the present invention may produce the groupings table 584 as a stored fact base for valid and/or invalid groupings of words identified by their corresponding identigens. For example, the valid grouping "pilot Tom" referring to flyer Tom the person is represented with a grouping identifier of 3001 and identity and identifiers 150.001 and 457.001. The entigen field 520 may indicate associated entigens that correspond to the identigens. For example, entigen e717 corresponds to the flyer pilot meaning and entigen e61 corresponds to the time the person meaning. Alternatively, or in addition to, the entigen field 520 may be populated with a single entigen identifier (ENI).

The word strings field 588 may include any number of words in a string. Different ordering of the same words can produce multiple different strings and even different meanings and hence entigens. More broadly, each entry (e.g., role) of the groupings table 584 may refer to groupings of words, two or more word strings, an idiom, just identigens, just entigens, and/or any combination of the preceding elements. Each entry has a unique grouping identifier. An idiom may have a unique grouping ID and include identifiers of original word identigens and replacing identigens associated with the meaning of the idiom not just the meaning of the original words. Valid groupings may still have ambiguity on their own and may need more strings and/or context to select a best fit when interpreting a truest meaning of the grouping.

Figure 8A:
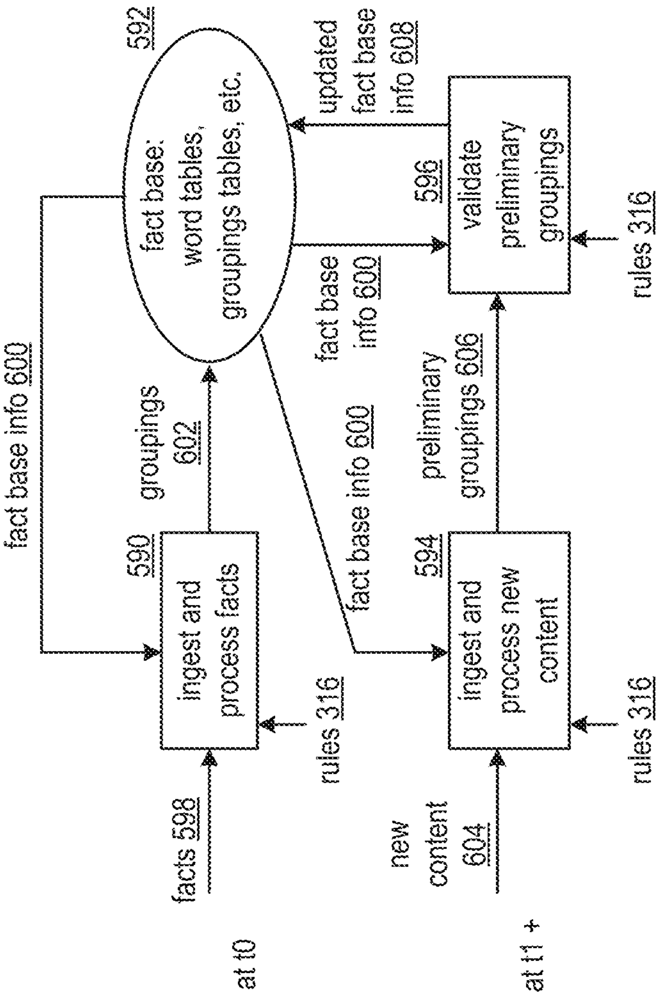
FIG. 8A is a data flow diagram for accumulating knowledge within a computing system in accordance with the present invention.

FIG. 8A is a data flow diagram for accumulating knowledge within a computing system, where a computing device, at a time=t0, ingests and processes facts 598 at a step 590 based on rules 316 and fact base information 600 to produce groupings 602 for storage in a fact base 592 (e.g., words, phrases, word groupings, identigens, entigens, quality levels). The facts 598 may include information from books, archive data, Central intelligence agency (CIA) world fact book, trusted content, etc. The ingesting may include filtering to organize and promote better valid groupings detection (e.g., considering similar domains together). The groupings 602 includes one or more of groupings identifiers, identigen identifiers, entigen identifiers, and estimated fit quality levels. The processing step 590 may include identifying identigens from words of the facts 598 in accordance with the rules 316 and the fact base info 600 and identifying groupings utilizing identigens in accordance with rules 316 and fact base info 600.

Subsequent to ingestion and processing of the facts 598 to establish the fact base 592, at a time=t1+, the computing device ingests and processes new content 604 at a step 594 in accordance with the rules 316 and the fact base information 600 to produce preliminary grouping 606. The new content may include updated content (e.g., timewise) from periodicals, newsfeeds, social media, etc. The preliminary grouping 606 includes one or more of preliminary groupings identifiers, preliminary identigen identifiers, preliminary entigen identifiers, estimated fit quality levels, and representations of unidentified words.

The computing device validates the preliminary groupings 606 at a step 596 based on the rules 316 and the fact base info 600 to produce updated fact base info 608 for storage in the fact base 592. The validating includes one or more of reasoning a fit of existing fact base info 600 with the new preliminary grouping 606, discarding preliminary groupings, updating just time frame information associated with an entry of the existing fact base info 600 (e.g., to validate knowledge for the present), creating new entigens, and creating a median entigen to summarize portions of knowledge within a median indicator as a quality level indicator (e.g., suggestive not certain).

Storage of the updated fact base information 608 captures patterns that develop by themselves instead of searching for patterns as in prior art artificial intelligence systems. Growth of the fact base 592 enables subsequent reasoning to create new knowledge including deduction, induction, inference, and inferential sentiment (e.g., a chain of sentiment sentences). Examples of sentiments includes emotion, beliefs, convictions, feelings, judgments, notions, opinions, and views.

FIG. 8B is a diagram of an embodiment of a groupings table 620 within a computing system. The groupings table 620 includes multiple fields including grouping ID 586, word strings 588, an IF string 622 and a THEN string 624. Each of the fields for the IF string 622 and the THEN string 624 includes fields for an identigen (IDN) string 626, and an entigen (ENI) string 628. The computing system of the present invention may produce the groupings table 620 as a stored fact base to enable IF THEN based inference to generate a new knowledge inference 630.

As a specific example, grouping 5493 points out the logic of IF someone has a tumor, THEN someone is sick and the grouping 5494 points of the logic that IF someone is sick, THEN someone is sad. As a result of utilizing inference, the new knowledge inference 630 may produce grouping 5495 where IF someone has a tumor, THEN someone is possibly sad (e.g., or is sad).

Figure 8C:
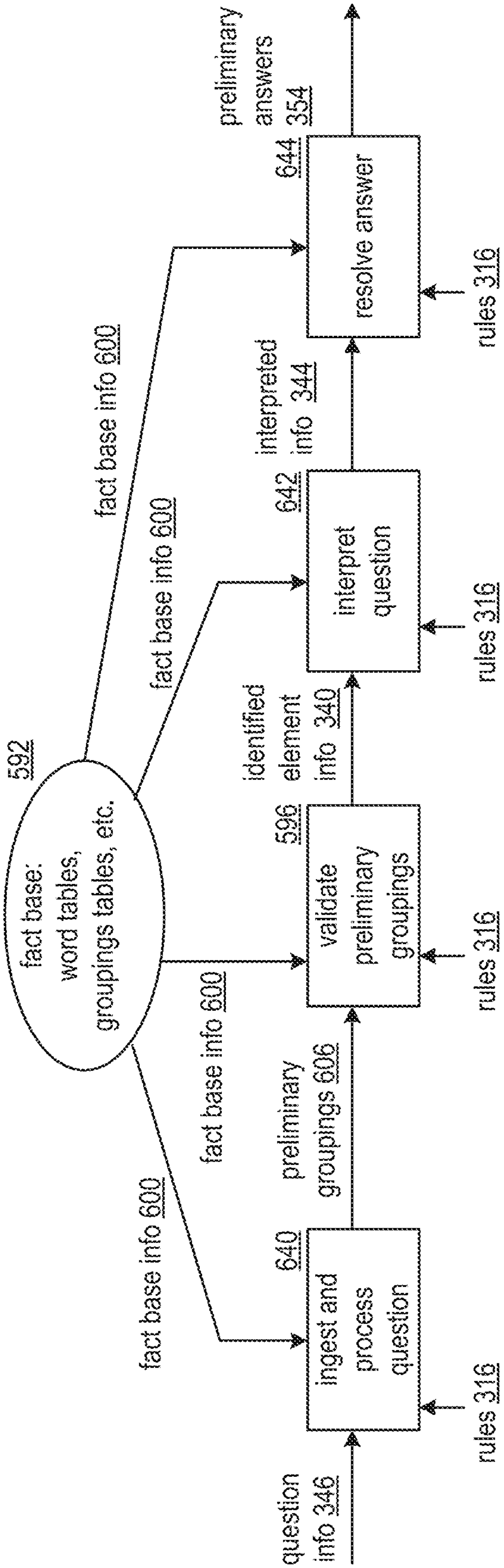
FIG. 8C is a data flow diagram for answering questions utilizing accumulated knowledge within a computing system in accordance with the present invention.

FIG. 8C is a data flow diagram for answering questions utilizing accumulated knowledge within a computing system, where a computing device ingests and processes question information 346 at a step 640 based on rules 316 and fact base info 600 from a fact base 592 to produce preliminary grouping 606. The ingesting and processing questions step 640 includes identifying identigens from words of a question in accordance with the rules 316 and the fact base information 600 and may also include identifying groupings from the identified identigens in accordance with the rules 316 and the fact base information 600.

The computing device validates the preliminary grouping 606 at a step 596 based on the rules 316 and the fact base information 600 to produce identified element information 340. For example, the computing device reasons fit of existing fact base information with new preliminary groupings 606 to produce the identified element information 340 associated with highest quality levels. The computing device interprets a question of the identified element information 340 at a step 642 based on the rules 316 and the fact base information 600. The interpreting of the question may include separating new content from the question and reducing the question based on the fact base information 600 and the new content.

The computing device produces preliminary answers 354 from the interpreted information 344 at a resolve answer step 644 based on the rules 316 and the fact base information 600. For example, the computing device compares the interpreted information 344 two the fact base information 600 to produce the preliminary answers 354 with highest quality levels utilizing one or more of deduction, induction, inferencing, and applying inferential sentiments logic. Alternatively, or in addition to, the computing device may save new knowledge identified from the question information 346 to update the fact base 592.

Figure 8D:
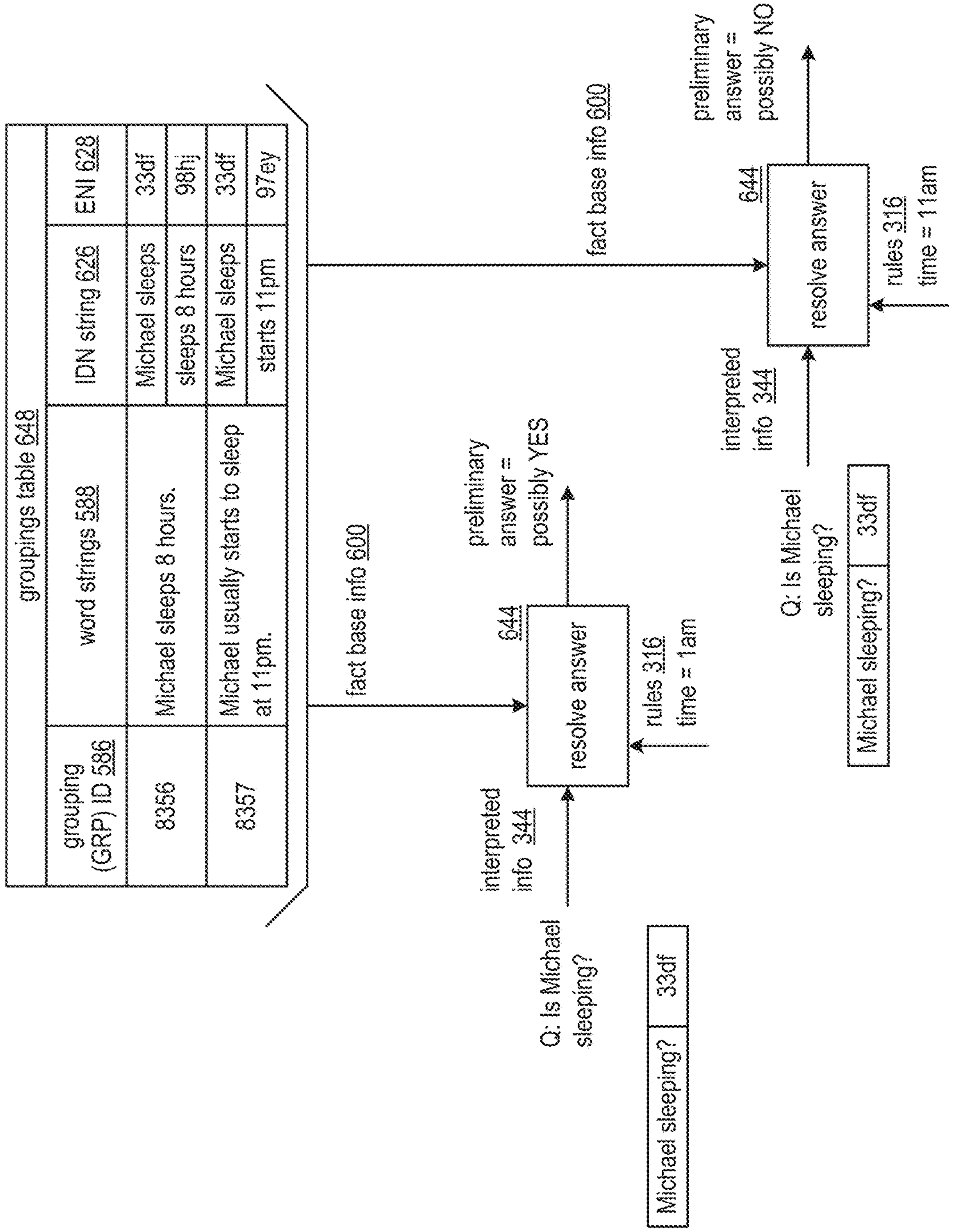
FIG. 8D is a data flow diagram for answering questions utilizing interference within a computing system in accordance with the present invention.

FIG. 8D is a data flow diagram for answering questions utilizing interference within a computing system that includes a groupings table 648 and the resolve answer step 644 of FIG. 8C. The groupings table 648 includes multiple fields including fields for a grouping (GRP) identifier (ID) 586, word strings 588, an identigen (IDN) string 626, and an entigen (ENI) 628. The groupings table 648 may be utilized to build a fact base to enable resolving a future question into an answer. For example, the grouping 8356 notes knowledge that Michael sleeps eight hours and grouping 8357 notes that Michael usually starts to sleep at 11 PM.

In a first question example that includes a question "Michael sleeping?", the resolve answer step 644 analyzes the question from the interpreted information 344 in accordance with the fact base information 600, the rules 316, and a real-time indicator that the current time is 1 AM to produce a preliminary answer of "possibly YES" when inferring that Michael is probably sleeping at 1 AM when Michael usually starts sleeping at 11 PM and Michael usually sleeps for a duration of eight hours.

In a second question example that includes the question "Michael sleeping?", the resolve answer step 644 analyzes the question from the interpreted information 344 in accordance with the fact base information 600, the rules 316, and a real-time indicator that the current time is now 11 AM to produce a preliminary answer of "possibly NO" when inferring that Michael is probably not sleeping at 11 AM when Michael usually starts sleeping at 11 PM and Michael usually sleeps for a duration of eight hours.

Figure 8E:
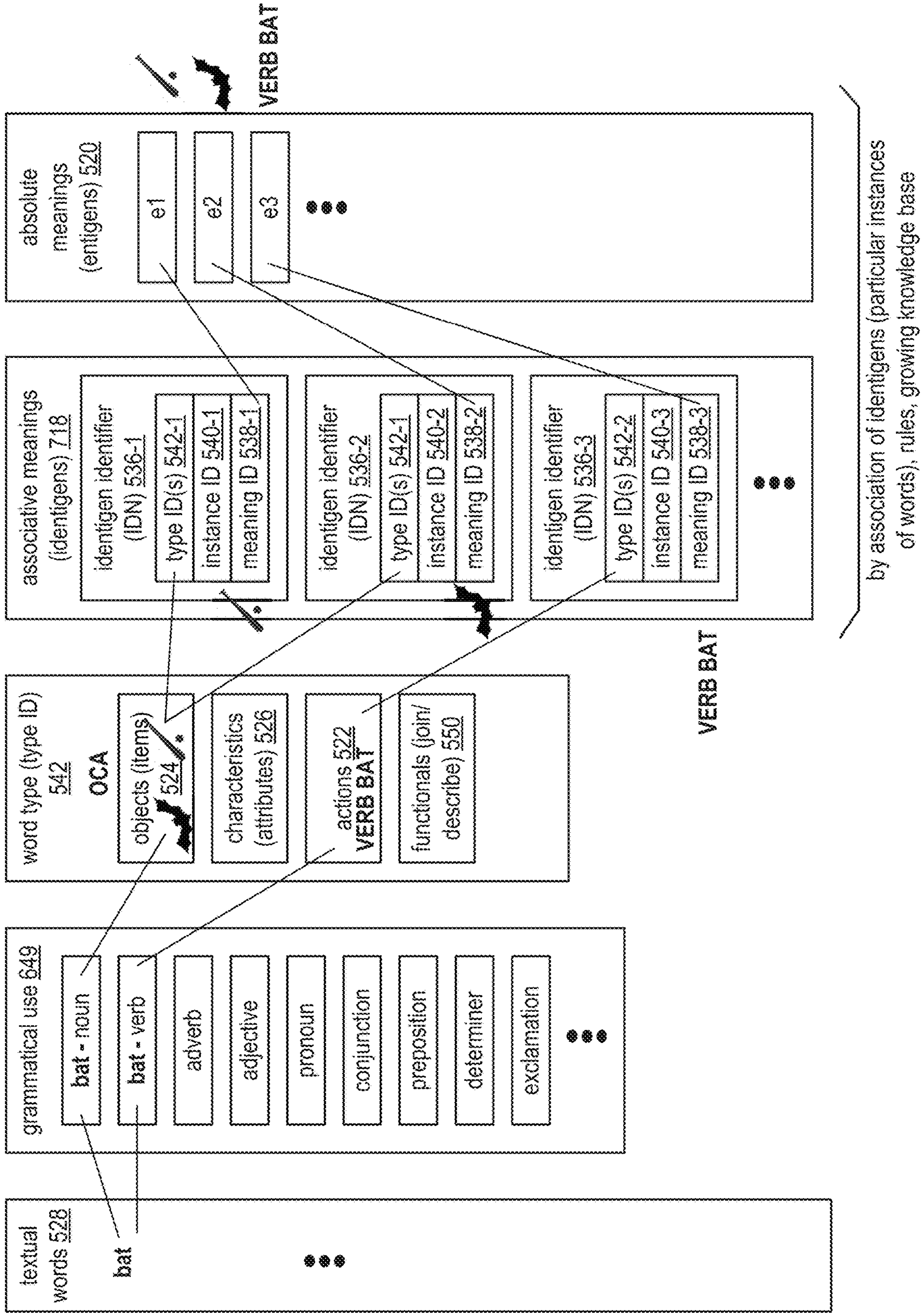
FIG. 8E is a relationship block diagram illustrating another embodiment of relationships between things and representations of things within a computing system in accordance with the present invention.

FIG. 8E is a relationship block diagram illustrating another embodiment of relationships between things and representations of things within a computing system. While things in the real world are described with words, it is often the case that a particular word has multiple meanings in isolation. Interpreting the meaning of the particular word may hinge on analyzing how the word is utilized in a phrase, a sentence, multiple sentences, paragraphs, and even whole documents or more. Describing and stratifying the use of words, word types, and possible meanings help in interpreting a true meaning.

Humans utilize textual words 528 to represent things in the real world. Quite often a particular word has multiple instances of different grammatical use when part of a phrase of one or more sentences. The grammatical use 649 of words includes the nouns and the verbs, and also includes adverbs, adjectives, pronouns, conjunctions, prepositions, determiners, exclamations, etc.

As an example of multiple grammatical use, the word "bat" in the English language can be utilized as a noun or a verb. For instance, when utilized as a noun, the word "bat" may apply to a baseball bat or may apply to a flying "bat." As another instance, when utilized as a verb, the word "bat" may apply to the action of hitting or batting an object, i.e., "bat the ball."

To stratify word types by use, the words are associated with a word type (e.g., type identifier 542). The word types include objects (e.g., items 524), characteristics (e.g., attributes 526), actions 522, and the functionals 550 for joining other words and describing words. For example, when the word "bat" is utilized as a noun, the word is describing the object of either the baseball bat or the flying bat. As another example, when the word "bat" is utilized as a verb, the word is describing the action of hitting.

To determine possible meanings, the words, by word type, are mapped to associative meanings (e.g., identigens 718). For each possible associative meaning, the word type is documented with the meaning and further with an identifier (ID) of the instance (e.g., an identigen identifier).

For the example of the word "bat" when utilized as a noun for the baseball bat, a first identigen identifier 536-1 includes a type ID 542-1 associated with the object 524, an instance ID 540-1 associated with the first identigen identifier (e.g., unique for the baseball bat), and a meaning ID 538-1 associated with the baseball bat. For the example of the word "bat" when utilized as a noun for the flying bat, a second identigen identifier 536-2 includes a type ID 542-1 associated with the object 524, an instance ID 540-2 associated with the second identigen identifier (e.g., unique for the flying bat), and a meaning ID 538-2 associated with the flying bat. For the example of the word "bat" when utilized as a verb for the bat that hits, a third identigen identifier 536-2 includes a type ID 542-2 associated with the actions 522, an instance ID 540-3 associated with the third identigen identifier (e.g., unique for the bat that hits), and a meaning ID 538-3 associated with the bat that hits.

With the word described by a type and possible associative meanings, a combination of full grammatical use of the word within the phrase etc., application of rules, and utilization of an ever-growing knowledge base that represents knowledge by linked entigens, the absolute meaning (e.g., entigen 520) of the word is represented as a unique entigen. For example, a first entigen e1 represents the absolute meaning of a baseball bat (e.g., a generic baseball bat not a particular baseball bat that belongs to anyone), a second entigen e2 represents the absolute meaning of the flying bat (e.g., a generic flying bat not a particular flying bat), and a third entigen e3 represents the absolute meaning of the verb bat (e.g., to hit).

An embodiment of methods to ingest text to produce absolute meanings for storage in a knowledge base are discussed in greater detail with reference to FIGS. 8F-H. Those embodiments further discuss the discerning of the grammatical use, the use of the rules, and the utilization of the knowledge base to definitively interpret the absolute meaning of a string of words.

Another embodiment of methods to respond to a query to produce an answer based on knowledge stored in the knowledge base are discussed in greater detail with reference to FIGS. 8J-L. Those embodiments further discuss the discerning of the grammatical use, the use of the rules, and the utilization of the knowledge base to interpret the query. The query interpretation is utilized to extract the answer from the knowledge base to facilitate forming the query response.

Figure 8F:
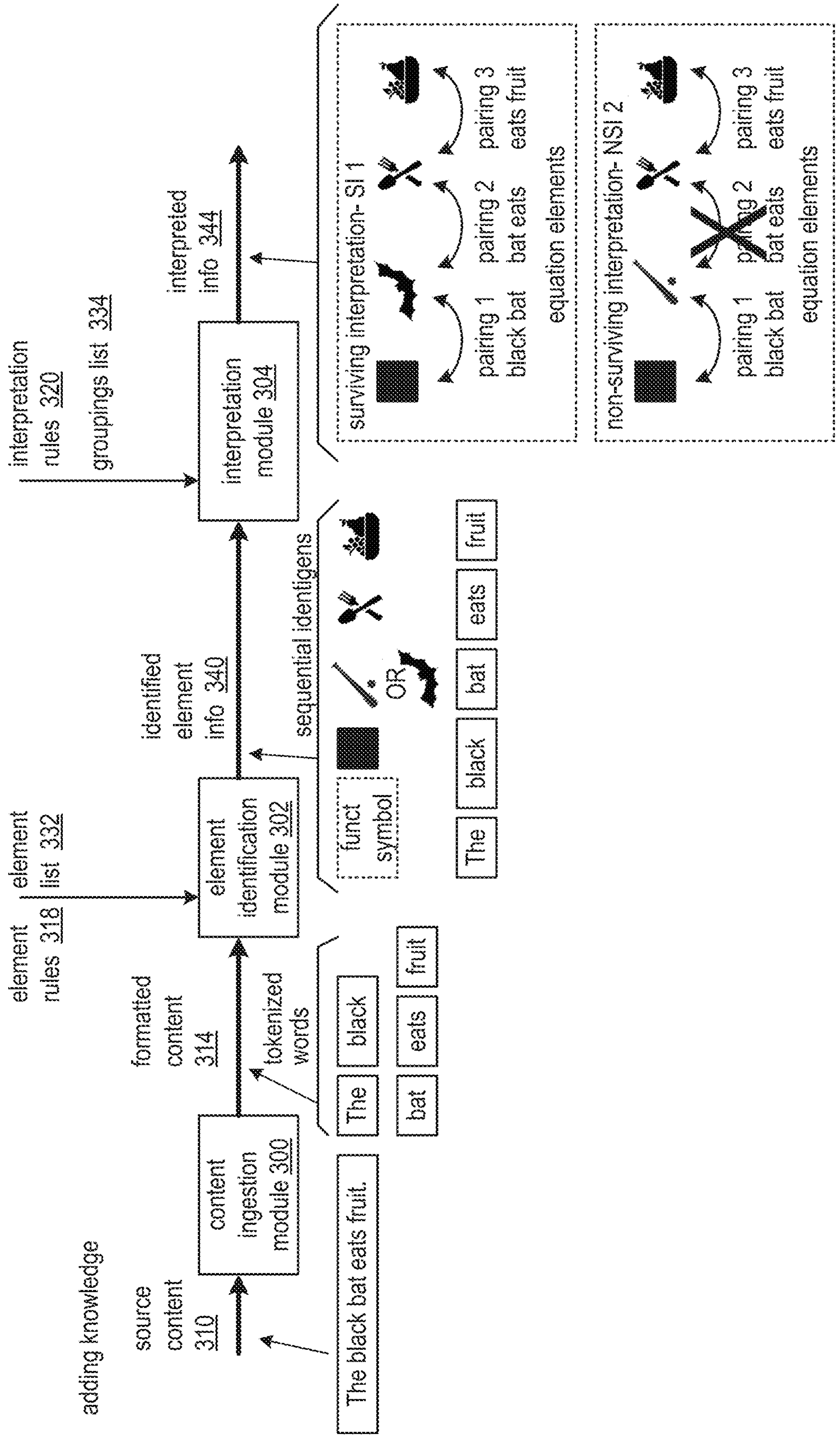
FIGS. 8F and 8G are schematic block diagrams of another embodiment of a computing system in accordance with the present invention.
Figure 8G:
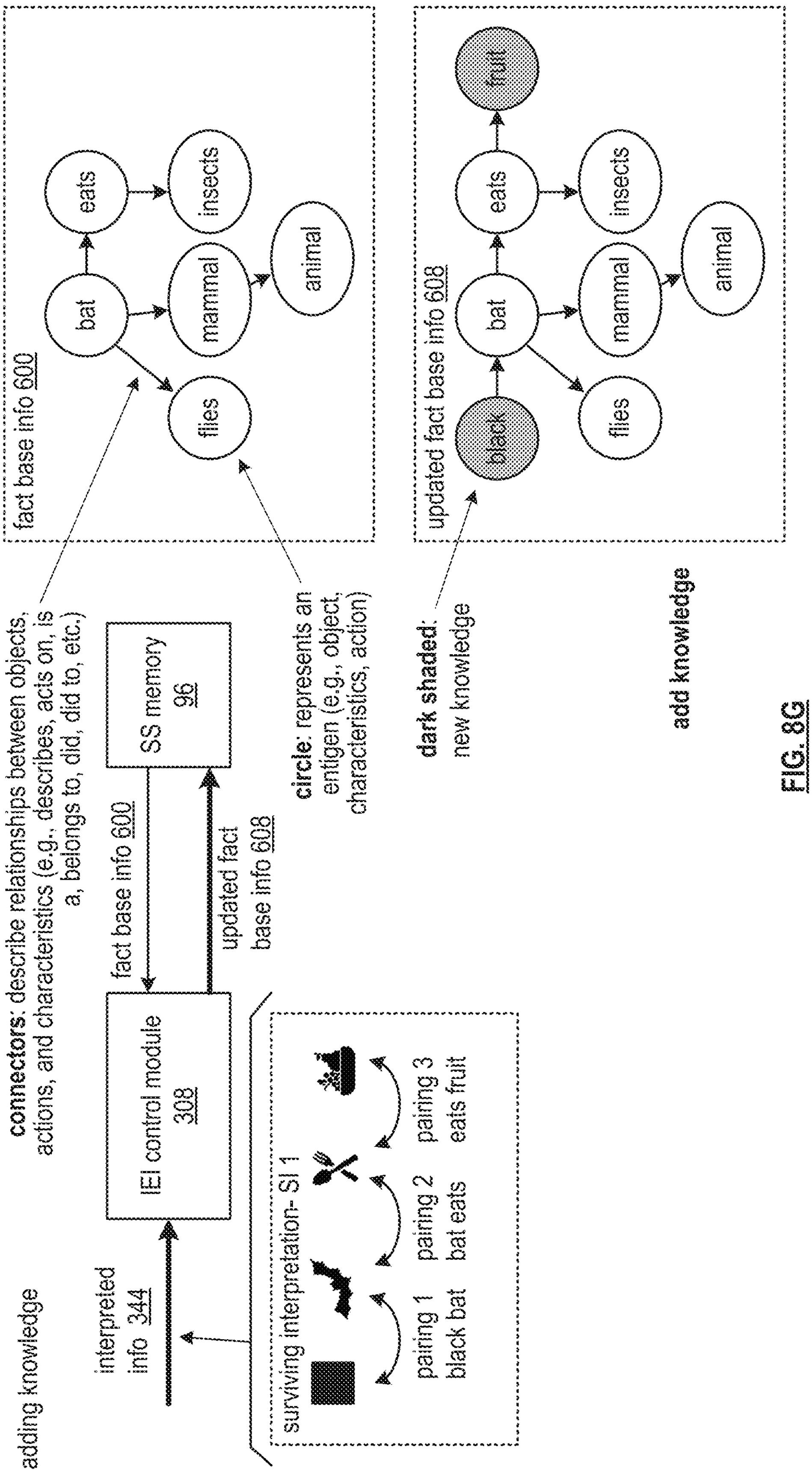

FIGS. 8F and 8G are schematic block diagrams of another embodiment of a computing system that includes the content ingestion module 300 of FIG. 5E, the element identification module 302 of FIG. 5E, the interpretation module 304 of FIG. 5E, the IEI control module 308 of FIG. 5E, and the SS memory 96 of FIG. 2. Generally, an embodiment of this invention provides presents solutions where the computing system 10 supports processing content to produce knowledge for storage in a knowledge base.

The processing of the content to produce the knowledge includes a series of steps. For example, a first step includes identifying words of an ingested phrase to produce tokenized words. As depicted in FIG. 8F, a specific example of the first step includes the content ingestion module 300 comparing words of source content 310 to dictionary entries to produce formatted content 314 that includes identifiers of known words. Alternatively, when a comparison is unfavorable, the temporary identifier may be assigned to an unknown word. For instance, the content ingestion module 300 produces identifiers associated with the words "the", "black", "bat", "eats", and "fruit" when the ingested phrase includes "The black bat eats fruit", and generates the formatted content 314 to include the identifiers of the words.

A second step of the processing of the content to produce the knowledge includes, for each tokenized word, identifying one or more identigens that correspond the tokenized word, where each identigen describes one of an object, a characteristic, and an action. As depicted in FIG. 8F, a specific example of the second step includes the element identification module 302 performing a look up of identigen identifiers, utilizing an element list 332 and in accordance with element rules 318, of the one or more identigens associated with each tokenized word of the formatted content 314 to produce identified element information 340.

A unique identifier is associated with each of the potential object, the characteristic, and the action (OCA) associated with the tokenized word (e.g. sequential identigens). For instance, the element identification module 302 identifies a functional symbol for "the", identifies a single identigen for "black", identifies two identigens for "bat" (e.g., baseball bat and flying bat), identifies a single identigen for "eats", and identifies a single identigen for "fruit." When at least one tokenized word is associated with multiple identigens, two or more permutations of sequential combinations of identigens for each tokenized word result. For example, when "bat" is associated with two identigens, two permutations of sequential combinations of identigens result for the ingested phrase.

A third step of the processing of the content to produce the knowledge includes, for each permutation of sequential combinations of identigens, generating a corresponding equation package (i.e., candidate interpretation), where the equation package includes a sequential linking of pairs of identigens (e.g., relationships), where each sequential linking pairs a preceding identigen to a next identigen, and where an equation element describes a relationship between paired identigens (OCAs) such as describes, acts on, is a, belongs to, did, did to, etc. Multiple OCAs occur for a common word when the word has multiple potential meanings (e.g., a baseball bat, a flying bat).

As depicted in FIG. 8F, a specific example of the third step includes the interpretation module 304, for each permutation of identigens of each tokenized word of the identified element information 340, the interpretation module 304 generates, in accordance with interpretation rules 320 and a groupings list 334, an equation package to include one or more of the identifiers of the tokenized words, a list of identifiers of the identigens of the equation package, a list of pairing identifiers for sequential pairs of identigens, and a quality metric associated with each sequential pair of identigens (e.g., likelihood of a proper interpretation). For instance, the interpretation module 304 produces a first equation package that includes a first identigen pairing of a black bat (e.g., flying bat with a higher quality metric level), the second pairing of bat eats (e.g., the flying bat eats, with a higher quality metric level), and a third pairing of eats fruit, and the interpretation module 304 produces a second equation package that includes a first pairing of a black bat (e.g., baseball bat, with a neutral quality metric level), the second pairing of bat eats (e.g., the baseball bat eats, with a lower quality metric level), and a third pairing of eats fruit.

A fourth step of the processing of the content to produce the knowledge includes selecting a surviving equation package associated with a most favorable confidence level. As depicted in FIG. 8F, a specific example of the fourth step includes the interpretation module 304 applying interpretation rules 320 (i.e., inference, pragmatic engine, utilizing the identifiers of the identigens to match against known valid combinations of identifiers of entigens) to reduce a number of permutations of the sequential combinations of identigens to produce interpreted information 344 that includes identification of at least one equation package as a surviving interpretation SI (e.g., higher quality metric level).

Non-surviving equation packages are eliminated that compare unfavorably to pairing rules and/or are associated with an unfavorable quality metric levels to produce a non-surviving interpretation NSI 2 (e.g., lower quality metric level), where an overall quality metric level may be assigned to each equation package based on quality metric levels of each pairing, such that a higher quality metric level of an equation package indicates a higher probability of a most favorable interpretation. For instance, the interpretation module 304 eliminates the equation package that includes the second pairing indicating that the “baseball bat eats” which is inconsistent with a desired quality metric level of one or more of the groupings list 334 and the interpretation rules 320 and selects the equation package associated with the “flying bat eats” which is favorably consistent with the one or more of the quality metric levels of the groupings list 334 and the interpretation rules 320.

A fifth step of the processing of the content to produce the knowledge utilizing the confidence level includes integrating knowledge of the surviving equation package into a knowledge base. For example, integrating at least a portion of the reduced OCA combinations into a graphical database to produce updated knowledge. As another example, the portion of the reduced OCA combinations may be translated into rows and columns entries when utilizing a rows and columns database rather than a graphical database. When utilizing the rows and columns approach for the knowledge base, subsequent access to the knowledge base may utilize structured query language (SQL) queries.

As depicted in FIG. 8G, a specific example of the fifth step includes the IEI control module 308 recovering fact base information 600 from SS memory 96 to identify a portion of the knowledge base for potential modification utilizing the OCAs of the surviving interpretation SI 1 (i.e., compare a pattern of relationships between the OCAs of the surviving interpretation SI 1 from the interpreted information 344 to relationships of OCAs of the portion of the knowledge base including potentially new quality metric levels).

The fifth step further includes determining modifications (e.g., additions, subtractions, further clarifications required when information is complex, etc.) to the portion of the knowledge base based on the new quality metric levels. For instance, the IEI control module 308 causes adding the element “black” as a “describes” relationship of an existing bat OCA and adding the element “fruit” as an eats “does to” relationship to implement the modifications to the portion of the fact base information 600 to produce updated fact base information 608 for storage in the SS memory 96.

Figure 8H:
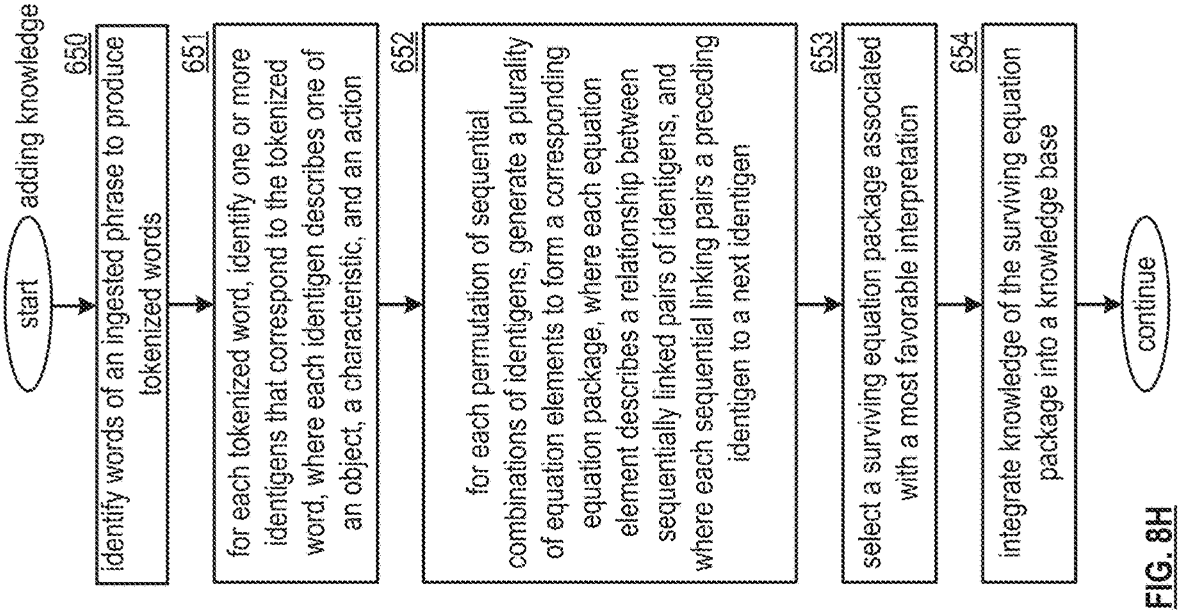
FIG. 8H is a logic diagram of an embodiment of a method for processing content to produce knowledge within a computing system in accordance with the present invention.

FIG. 8H is a logic diagram of an embodiment of a method for processing content to produce knowledge for storage within a computing system. In particular, a method is presented for use in conjunction with one or more functions and features described in conjunction with FIGS. 1-8E, 8F, and also FIG. 8G. The method includes step 650 where a processing module of one or more processing modules of one or more computing devices of the computing system identifies words of an ingested phrase to produce tokenized words. The identified includes comparing words to known words of dictionary entries to produce identifiers of known words.

For each tokenized word, the method continues at step 651 where the processing module identifies one or more identigens that corresponds to the tokenized word, where each identigen describes one of an object, a characteristic, and an action (e.g., OCA). The identifying includes performing a lookup of identifiers of the one or more identigens associated with each tokenized word, where he different identifiers associated with each of the potential object, the characteristic, and the action associated with the tokenized word.

The method continues at step 652 where the processing module, for each permutation of sequential combinations of identigens, generates a plurality of equation elements to form a corresponding equation package, where each equation element describes a relationship between sequentially linked pairs of identigens, where each sequential linking pairs a preceding identigen to a next identigen. For example, for each permutation of identigens of each tokenized word, the processing module generates the equation package to include a plurality of equation elements, where each equation element describes the relationship (e.g., describes, acts on, is a, belongs to, did, did too, etc.) between sequentially adjacent identigens of a plurality of sequential combinations of identigens. Each equation element may be further associated with a quality metric to evaluate a favorability level of an interpretation in light of the sequence of identigens of the equation package.

The method continues at step 653 where the processing module selects a surviving equation package associated with most favorable interpretation. For example, the processing module applies rules (i.e., inference, pragmatic engine, utilizing the identifiers of the identigens to match against known valid combinations of identifiers of entigens), to reduce the number of permutations of the sequential combinations of identigens to identify at least one equation package, where non-surviving equation packages are eliminated the compare unfavorably to pairing rules and/or are associated with an unfavorable quality metric levels to produce a non-surviving interpretation, where an overall quality metric level is assigned to each equation package based on quality metric levels of each pairing, such that a higher quality metric level indicates an equation package with a higher probability of favorability of correctness.

The method continues at step 654 where the processing module integrates knowledge of the surviving equation package into a knowledge base. For example, the processing module integrates at least a portion of the reduced OCA combinations into a graphical database to produce updated knowledge. The integrating may include recovering fact base information from storage of the knowledge base to identify a portion of the knowledge base for potential modifications utilizing the OCAs of the surviving equation package (i.e., compare a pattern of relationships between the OCAs of the surviving equation package to relationships of the OCAs of the portion of the knowledge base including potentially new quality metric levels). The integrating further includes determining modifications (e.g., additions, subtractions, further clarifications required when complex information is presented, etc.) to produce the updated knowledge base that is based on fit of acceptable quality metric levels, and implementing the modifications to the portion of the fact base information to produce the updated fact base information for storage in the portion of the knowledge base.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 8J:
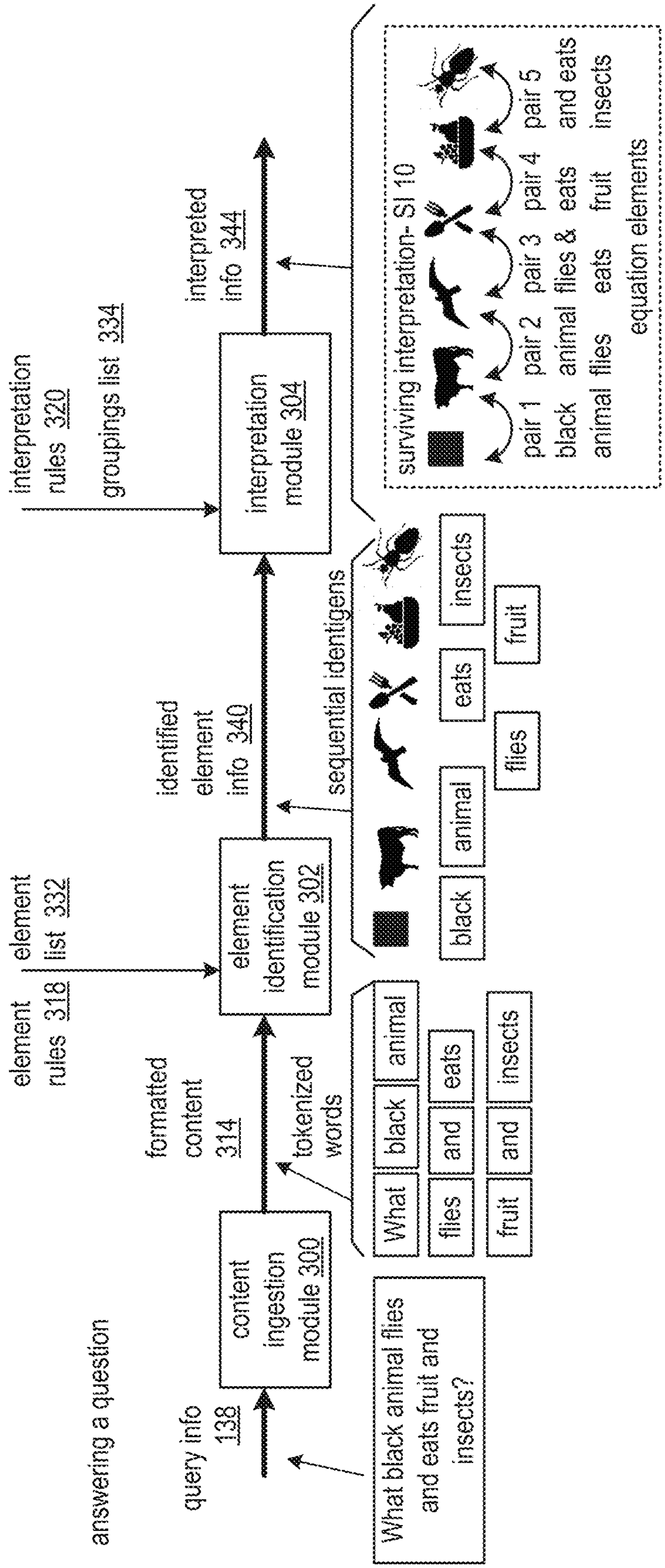
FIGS. 8J and 8K are schematic block diagrams another embodiment of a computing system in accordance with the present invention.
Figure 8K:
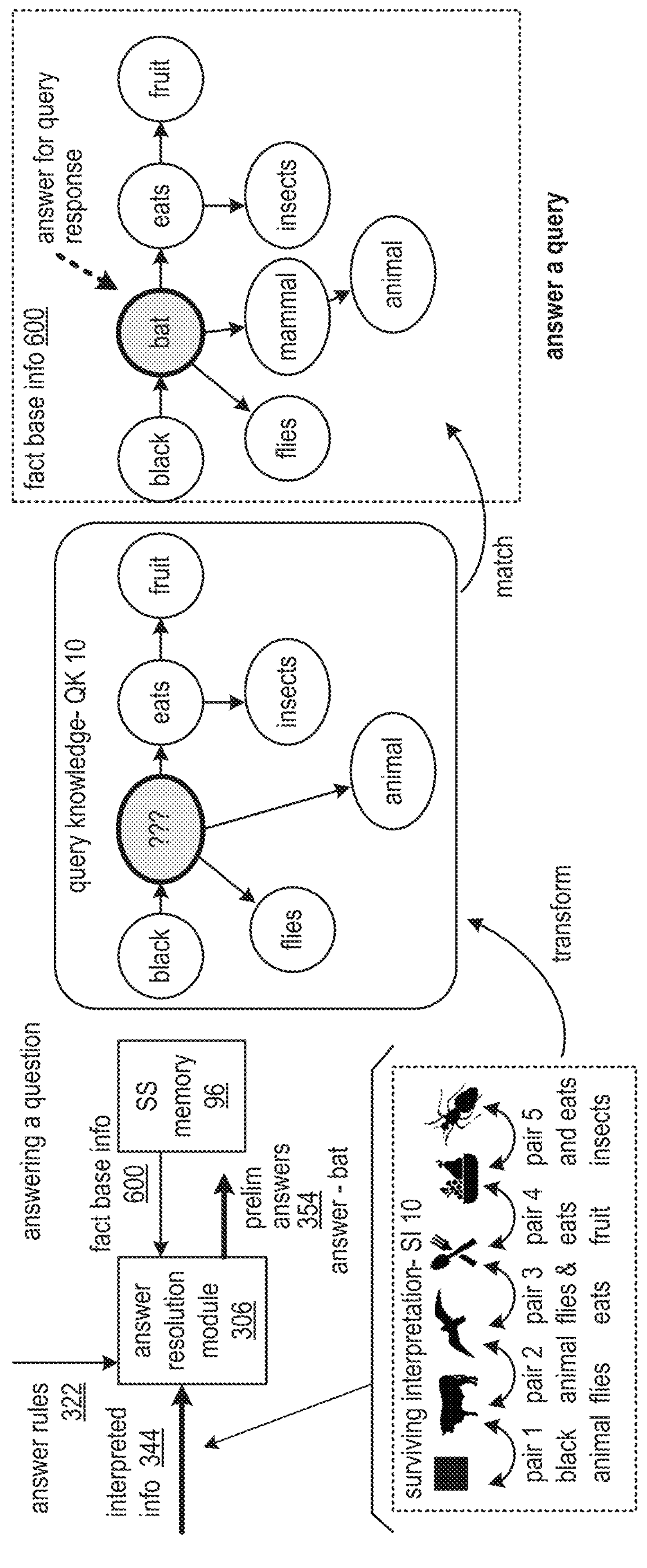

FIGS. 8J and 8K are schematic block diagrams of another embodiment of a computing system that includes the content ingestion module 300 of FIG. 5E, the element identification module 302 of FIG. 5E, the interpretation module 304 of FIG. 5E, the answer resolution module 306 of FIG. 5E, and the SS memory 96 of FIG. 2. Generally, an embodiment of this invention provides solutions where the computing system 10 supports for generating a query response to a query utilizing a knowledge base.

The generating of the query response to the query includes a series of steps. For example, a first step includes identifying words of an ingested query to produce tokenized words. As depicted in FIG. 8J, a specific example of the first step includes the content ingestion module 300 comparing words of query info 138 to dictionary entries to produce formatted content 314 that includes identifiers of known words. For instance, the content ingestion module 300 produces identifiers for each word of the query "what black animal flies and eats fruit and insects?"

A second step of the generating of the query response to the query includes, for each tokenized word, identifying one or more identigens that correspond the tokenized word, where each identigen describes one of an object, a characteristic, and an action (OCA). As depicted in FIG. 8J, a specific example of the second step includes the element identification module 302 performing a look up of identifiers, utilizing an element list 332 and in accordance with element rules 318, of the one or more identigens associated with each tokenized word of the formatted content 314 to produce identified element information 340. A unique identifier is associated with each of the potential object, the characteristic, and the action associated with a particular tokenized word. For instance, the element identification module 302 produces a single identigen identifier for each of the black color, an animal, flies, eats, fruit, and insects.

A third step of the generating of the query response to the query includes, for each permutation of sequential combinations of identigens, generating a corresponding equation package (i.e., candidate interpretation). The equation package includes a sequential linking of pairs of identigens, where each sequential linking pairs a preceding identigen to a next identigen. An equation element describes a relationship between paired identigens (OCAs) such as describes, acts on, is a, belongs to, did, did to, etc.

As depicted in FIG. 8J, a specific example of the third step includes the interpretation module 304, for each permutation of identigens of each tokenized word of the identified element information 340, generating the equation packages in accordance with interpretation rules 320 and a groupings list 334 to produce a series of equation elements that include pairings of identigens. For instance, the interpretation module 304 generates a first pairing to describe a black animal, a second pairing to describe an animal that flies, a third pairing to describe flies and eats, a fourth pairing to describe eats fruit, and a fifth pairing to describe eats fruit and insects.

A fourth step of the generating the query response to the query includes selecting a surviving equation package associated with a most favorable interpretation. As depicted in FIG. 8J, a specific example of the fourth step includes the interpretation module 304 applying the interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344. The interpreted information 344 includes identification of at least one equation package as a surviving interpretation SI 10, where non-surviving equation packages, if any, are eliminated that compare unfavorably to pairing rules to produce a non-surviving interpretation.

A fifth step of the generating the query response to the query includes utilizing a knowledge base, generating a query response to the surviving equation package of the query, where the surviving equation package of the query is transformed to produce query knowledge for comparison to a portion of the knowledge base. An answer is extracted from the portion of the knowledge base to produce the query response.

As depicted in FIG. 8K, a specific example of the fifth step includes the answer resolution module 306 interpreting the surviving interpretation SI 10 of the interpreted information 344 in accordance with answer rules 322 to produce query knowledge QK 10 (i.e., a graphical representation of knowledge when the knowledge base utilizes a graphical database). For example, the answer resolution module 306 accesses fact base information 600 from the SS memory 96 to identify the portion of the knowledge base associated with a favorable comparison of the query knowledge QK 10 (e.g., by comparing attributes of the query knowledge QK 10 to attributes of the fact base information 600), and generates preliminary answers 354 that includes the answer to the query. For instance, the answer is "bat" when the associated OCAs of bat, such as black, eats fruit, eats insects, is an animal, and flies, aligns with OCAs of the query knowledge.

Figure 8L:
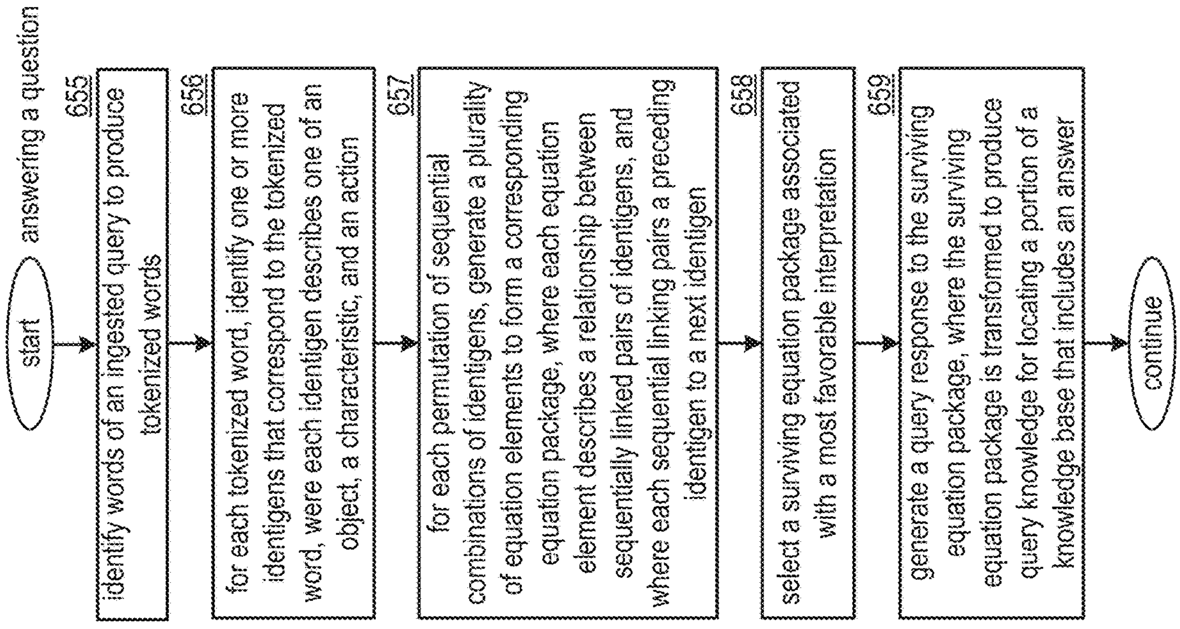
FIG. 8L is a logic diagram of an embodiment of a method for generating a query response to a query within a computing system in accordance with the present invention.

FIG. 8L is a logic diagram of an embodiment of a method for generating a query response to a query utilizing knowledge within a knowledge base within a computing system. In particular, a method is presented for use in conjunction with one or more functions and features described in conjunction with FIGS. 1-8D, 8J, and also FIG. 8K. The method includes step 655 where a processing module of one or more processing modules of one or more computing devices of the computing system identifies words of an ingested query to produce tokenized words. For example, the processing module compares words to known words of dictionary entries to produce identifiers of known words.

For each tokenized word, the method continues at step 656 where the processing module identifies one or more identigens that correspond to the tokenized word, where each identigen describes one of an object, a characteristic, and an action. For example, the processing module performs a lookup of identifiers of the one or more identigens associated with each tokenized word, where different identifiers associated with each permutation of a potential object, characteristic, and action associated with the tokenized word.

For each permutation of sequential combinations of identigens, the method continues at step 657 where the processing module generates a plurality of equation elements to form a corresponding equation package, where each equation element describes a relationship between sequentially linked pairs of identigens. Each sequential linking pairs a preceding identigen to a next identigen. For example, for each permutation of identigens of each tokenized word, the processing module includes all other permutations of all other tokenized words to generate the equation packages. Each equation package includes a plurality of equation elements describing the relationships between sequentially adjacent identigens of a plurality of sequential combinations of identigens.

The method continues at step 658 where the processing module selects a surviving equation package associated with a most favorable interpretation. For example, the processing module applies rules (i.e., inference, pragmatic engine, utilizing the identifiers of the identigens to match against known valid combinations of identifiers of entigens) to reduce the number of permutations of the sequential combinations of identigens to identify at least one equation package. Non-surviving equation packages are eliminated the compare unfavorably to pairing rules.

The method continues at step 659 where the processing module generates a query response to the surviving equation package, where the surviving equation package is transformed to produce query knowledge for locating the portion of a knowledge base that includes an answer to the query. As an example of generating the query response, the processing module interprets the surviving the equation package in accordance with answer rules to produce the query knowledge (e.g., a graphical representation of knowledge when the knowledge base utilizes a graphical database format).

The processing module accesses fact base information from the knowledge base to identify the portion of the knowledge base associated with a favorable comparison of the query knowledge (e.g., favorable comparison of attributes of the query knowledge to the portion of the knowledge base, aligning favorably comparing entigens without conflicting entigens). The processing module extracts an answer from the portion of the knowledge base to produce the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 9A:
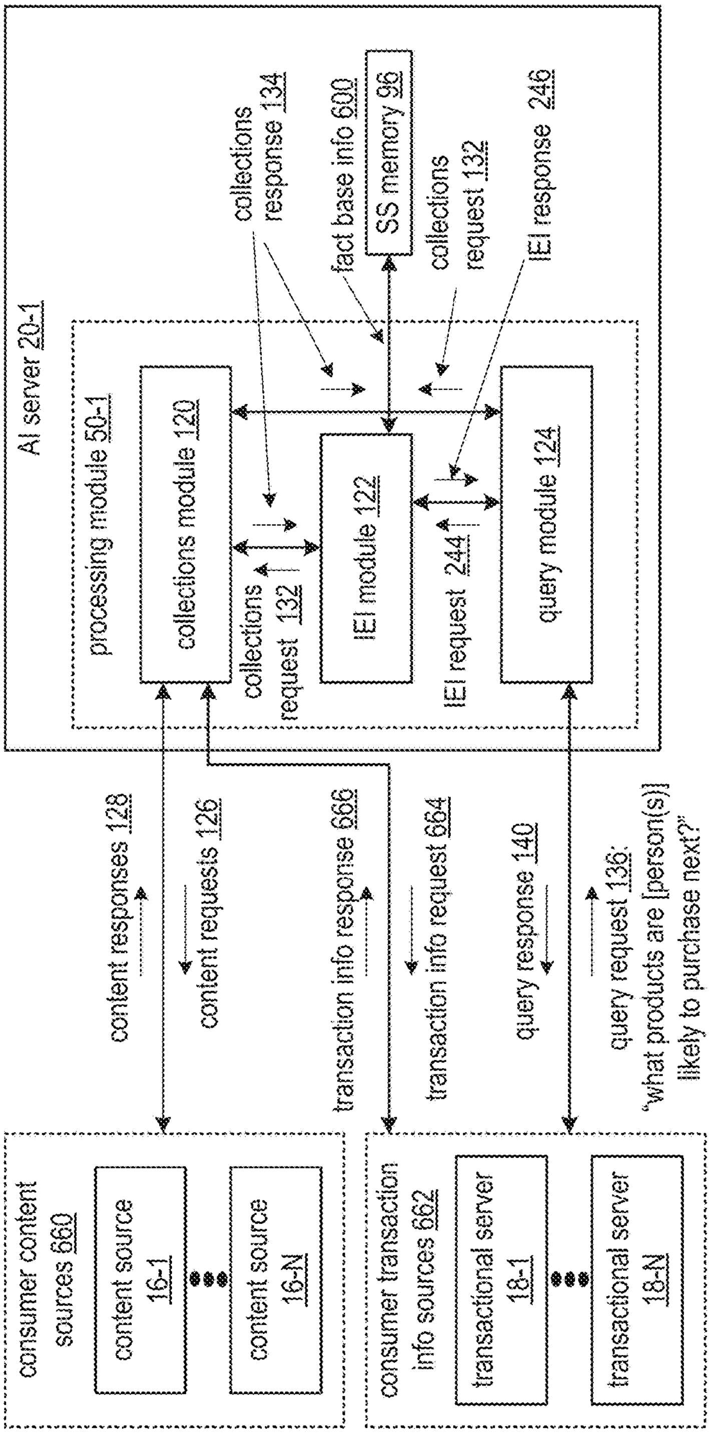
FIG. 9A is a schematic block diagram of another embodiment of a computing system in accordance with the present invention.

FIG. 9A is a schematic block diagram of another embodiment of a computing system that includes consumer content sources 660, consumer transaction information sources 662, and the artificial intelligence (AI) server 20-1 of FIG. 1. The consumer transaction information sources 662 includes the transactional servers 18-1 through 18-N. The consumer content sources 660 includes the content sources 16-1 through 16-N of FIG. 1. In particular, content sources associated with the consumer content sources 660 provides one or more of social media information, newsfeeds, user activities, user location information, user schedule information, etc. and the transactional servers associated with the consumer transaction information sources 662 provide one or more of group and/or individual consumer purchasing history, transaction information, product availability information, product description information, historical product performance information, product pricing information, etc. The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to produce a response to a query with regards to likelihood to purchase.

In an example of operation of the responding to the query, the query module 124 interprets a received query request 136 (e.g., from the transactional server 18-1) to produce query requirements. The interpreting includes one or more of determining content requirements, determining source requirements, determining answer timing requirements, and identifying at least one domain associated with the query request 136. For example, the query module 124 determines the content requirements to include a query with regards to what products that a person is likely to purchase next, determines the source requirements to include the consumer content sources 660 and the consumer transaction information sources 662, determines the answer timing requirements to include a two hour time frame, and identifies consumer likelihood to purchase as the domain when receiving the query request 136 that includes a question "what products are [person(s)] likely to purchase next?"

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next two hours and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., facts pertaining to likelihood to purchase) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer (e.g., likelihood of purchase of a particular product by a particular person), and generating the answer quality level based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the consumer content sources 660 and to include selecting the transactional servers 18-1 through 18-N of the consumer transaction information sources 662, determines the content selection requirements to include content associated with the likelihood to purchase, and determines the content acquisition timing requirements to include a two hour time span.

Having produced the content requirements, the collections module 120 issues a plurality of content requests 126 to a plurality of content sources identified by the content requirements (e.g., to the content sources 16-1 through 16-N) and issues one or more transaction information requests 664 to the consumer transaction information sources 662. For example, the collections module 120 identifies the plurality of consumer content sources, generates the content requests 126 based on the content requirements, and sends the plurality of content requests on 26 to the identified plurality of content sources 16-1 through 16-N. As another example, the collection module 120 identifies one or more transactional servers of the consumer transaction information sources 662 based on the content requirements (e.g., historical consumer purchasing history, availability of the consumer to make a purchase within the next two hours, likely needs of the consumer within the next two hours), generates the one or more transaction information requests 664, and sends the one or more transaction information request 664 to the identified one or more transactional servers of the consumer transaction information sources 662.

Having issued the plurality of content requests 126 and the one or more transaction information request 664, the collections module 120 interprets a plurality of content responses 128 and one or more transaction information responses 666 to determine whether a response quality level is favorable. The interpreting includes analyzing the plurality of content responses 128 and the one or more transaction information responses 666 to produce an estimated response quality level, and indicating a favorable response quality level when the estimated response quality level compares favorably to a minimum response quality threshold level (e.g., greater than). When the response quality level is favorable, the collections module 120 issues a collections response 134 to the IEI module 122, where the collections response 134 includes further content. For example, the collections module 120 generates the collections response 134 to include the further content and the estimated response quality level, and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which identifies the consumer likelihood to purchase. When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the transactional server 18-1, where the query response 140 includes the answer associated with the favorable quality level of the answer.

Figure 9B:
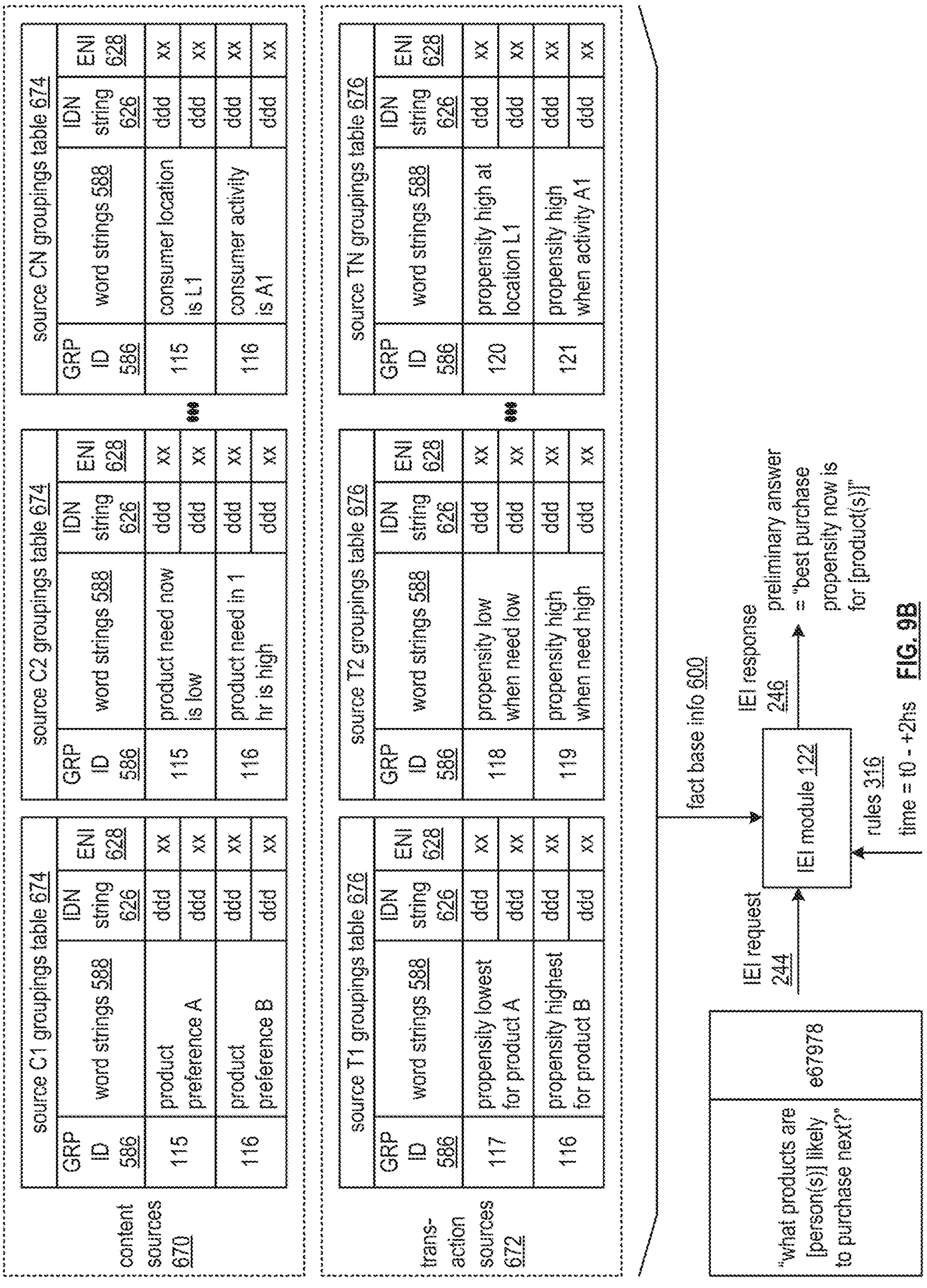
FIG. 9B is a data flow diagram for answering questions utilizing accumulated knowledge within a computing system in accordance with the present invention.

FIG. 9B is a data flow diagram for answering questions utilizing accumulated knowledge within a computing system. The data flow diagram includes the IEI module 122 of FIG. 9A and fact base information 600 in the form of content sources 670 and transaction sources 672. The content sources 670 includes a plurality of source C1-CN groupings table 674 and the transaction sources 672 includes a plurality of source T1-TN groupings table 676. Each groupings table 674 and 676 includes multiple fields including fields for a group (GRP) identifier (ID) 586, word strings 588, identigen (IDN) string 626, and an entigen (ENI) 628. For instance, the groupings tables 674 of the content sources 670 includes word strings and identifiers associated with consumer content, such as the a consumer has a preference for product A, the product need in one hour is high, and the consumer location is at L1. As another instance, the groupings tables 676 of the transaction sources 672 includes purchase propensity lowest for product A, purchase propensity is low when needed is low, and purchase propensity is high when the consumer is at location L1.

As an example of operation of providing an answer to a query, the IEI module 122 interprets the IEI request 244, facilitates obtaining the fact base information 600, and generates the preliminary answer based on the rules 316 and associated time frames relevant to the question of the IEI request 244. For example, the IEI module 122 generates the preliminary answer to indicate that "best purchase propensity now is for product B". For instance, the IEI module 122 identifies the preference for product B, the product need is highest in one hour, the consumer activity is A1, the purchase propensity is highest when the consumer is engaged in the activity A1, the purchase propensity is highest when the consumer is at location L1, and the consumer location is location L1.

Figure 9C:
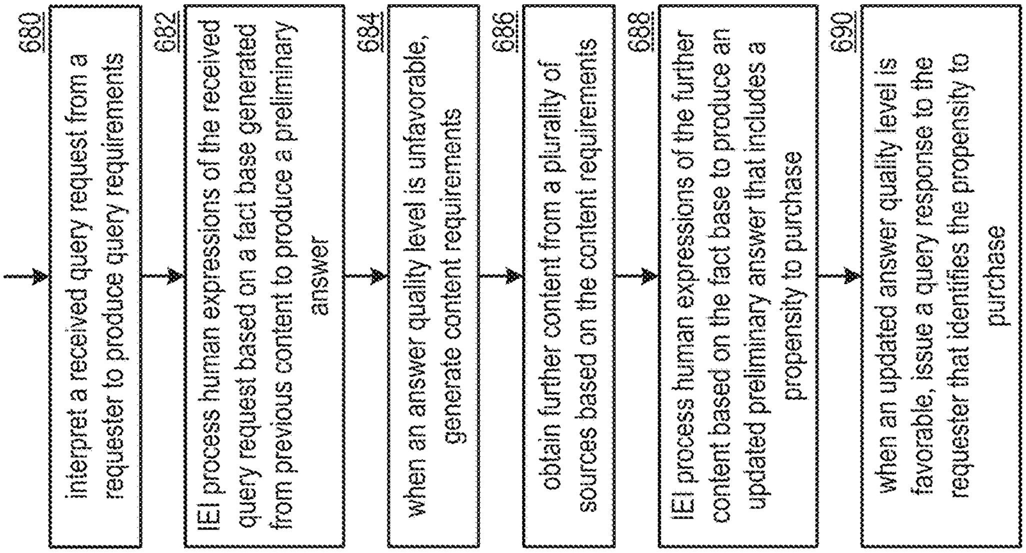
FIG. 9C is a logic diagram of an embodiment of a method for producing a response to a query within a computing system in accordance with the present invention.

FIG. 9C is a logic diagram of an embodiment of a method for producing a response to a query within a computing system. In particular, a method is presented for use in conjunction with one or more functions and features described in conjunction with FIGS. 1-8L, 9A-9B, and also FIG. 9C. The method includes step 680 where a processing module of one or more processing modules of one or more computing devices of the computing system interprets a received query request from a requester to produce query requirements. The interpreting includes one or more of determining content requirements, (e.g., to determine propensity to purchase), determining source requirements, determining answer timing requirements, and identifying a domain (e.g., consumer purchasing) associated with the query request.

The method continues at step 682 where the processing module IEI processes human expressions of the received query request based on a fact base generated from previous content to produce a preliminary answer. The processing may include formatting portions of the query request in accordance with formatting rules to produce recognizable human expressions of content and question information. For example, the processing module produces the question information to include a request to determine consumer purchase likelihood for a particular domain (e.g., purchasing propensity). The processing may further include identifying permutations of identigens within the human expressions, reducing the permutations, mapping the reduce permutations to entigens to produce knowledge, processing the knowledge in accordance with a fact base to produce the preliminary answer, and generating an answer quality level associated with the preliminary answer. For instance, the processing module generates a relatively low answer quality level when the question relates to gathering information over a subsequent two hours such that more content must be gathered to produce an answer associated with a higher and more favorable answer quality level.

When the answer quality level is unfavorable, the method continues at step 684 where the processing module generates content requirements. The generating of the content requirements includes determining, based on one or more of the query requirements, preliminary answer, and the answer quality level, one or more of content selection requirements, source selection requirements, and acquisition timing requirements.

The method continues at step 686 for the processing module obtains further content from a plurality of sources based on the content requirements. For example, the processing module identifies the plurality of sources (e.g., consumer content sources, consumer transaction information sources), generates requests based on the content requirements, and sends the plurality of content requests to the plurality of identified content sources, analyzes a plurality of content responses to produce an estimated quality level, indicates favorable quality level when the estimated quality level compares favorably to a minimum quality threshold level, and indicates unfavorable quality level to facilitate collective more content when the estimated quality level compares unfavorably to the minimum quality threshold level.

The method continues at step 688 where the processing module IEI processes human expressions of the further content based on the fact base to produce an updated preliminary answer that includes a propensity to purchase. For example, the processing module analyzes, based on one or more of the query request, the fact base info associated with the identified domain, and the further content to produce one or more of updated fact base info (e.g., new knowledge), the updated preliminary answer (e.g., updated consumer purchase history and general consumer information), and an associated answer quality level. The analyzing may include reasoning the further content with the fact base to produce the updated fact base info and the preliminary answer to include the purchasing propensity.

When the updated answer quality level is favorable, the method continues at step 690 where the processing module issues a query response to the request are that identifies the propensity to purchase. The issuing includes one or more of analyzing the preliminary answers in accordance with the query requirements and the rules to generate the updated quality level, generating the query response to include the answer associated with favorable quality level, and sending the query response to the requester The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 10A:
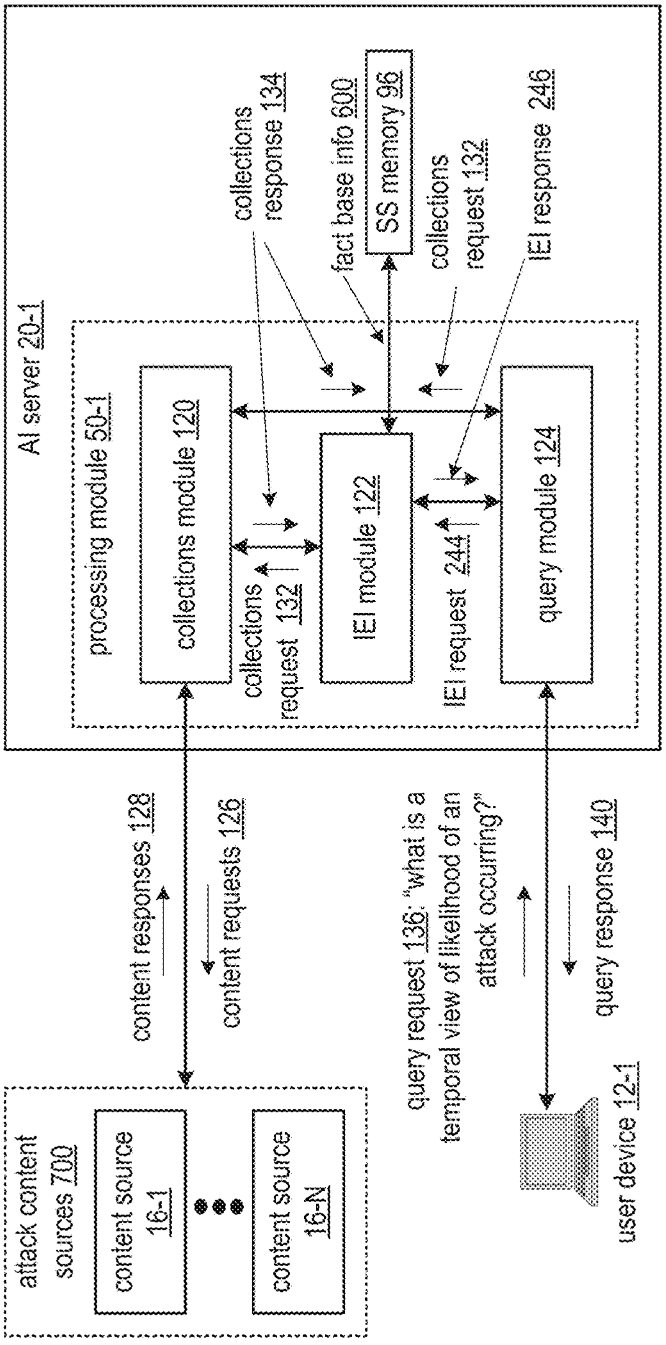
FIG. 10A is a schematic block diagram of another embodiment of a computing system in accordance with the present invention.

FIG. 10A is a schematic block diagram of another embodiment of a computing system that includes attack content sources 700, the artificial intelligence (AI) server 20-1 of FIG. 1, and the user device 12-1 of FIG. 1. The attack content sources 700 includes the content sources 16-1 through 16-N of FIG. 1. In particular, content sources associated with attack content provide one or more of Internet traffic, Internet traffic summaries, people information (e.g., medical records, court records, school records, police reports, terrorist watchlist, gun registration lists, group affiliations, etc.), physical world data (environmental, structural, machine, etc.), community beliefs (e.g., social media), and news outlet information (e.g., press releases, periodicals, radio broadcast, television news, financial market news, etc.), etc. The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to produce a response to a query regarding likelihood of an attack (e.g., of a physical event, a cyber-attack, a physical attack, a political attack, etc.) based on factual interpretations of early stages of the attack and/or likely distractions of a pre-attack sequence.

In an example of operation of the responding to the query, the query module 124 interprets a received query request 136 to produce query requirements. The interpreting includes one or more of determining content requirements, determining source requirements, determining answer timing requirements, and identifying at least one domain associated with the query request 136. For example, the query module 124 determines the content requirements to include facts that can lead to prediction of the attack, determines the source requirements to include the attack content sources 700, determines the answer timing requirements to include a timeframe associated with the predicted occurrence, and identifies a particular type of attack (e.g., cyber) as the domain when receiving the query request 136 that includes a question "what is a temporal view of likelihood of an attack occurring."

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next 20 minutes associated with a typical pre-attack distraction of the query request 136 and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., facts pertaining to the attack) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer, and generating the answer quality level based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the attack content sources 700, determines the content selection requirements to include content associated with the attack (e.g., scenarios that are affiliated with the pre-attack distractions and/or the attack), and determines the content acquisition timing requirements to include a time span for collection if any.

Having produced the content requirements, the collections module 120 issues a plurality of content requests 126 to a plurality of content sources identified by the content requirements (e.g., to the content sources 16-1 through 16-N). For example, the collections module 120 identifies the plurality of content sources, generates the content requests based on the content requirements, and sends the plurality of content requests 126 to the identified plurality of content sources.

Having issued the plurality of content requests 126, the collections module 120 interprets a plurality of content responses 128 to determine whether a response quality level is favorable.

The interpreting includes analyzing the plurality of content responses 128 to produce an estimated response quality level, and indicating a favorable response quality level when the estimated response quality level compares favorably to a minimum response quality threshold level (e.g., greater than). When the response quality level is favorable, the collections module 120 issues a collections response 134 to the IEI module 122, where the collections response 134 includes further content. For example, the collections module 120 generates the collections response 134 to include the further content and the estimated response quality level, and sends the collections response 134 to the WI module 122.

The LEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which predicts the likelihood of the attack. When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer associated with the favorable quality level of the answer.

Figure 10B:
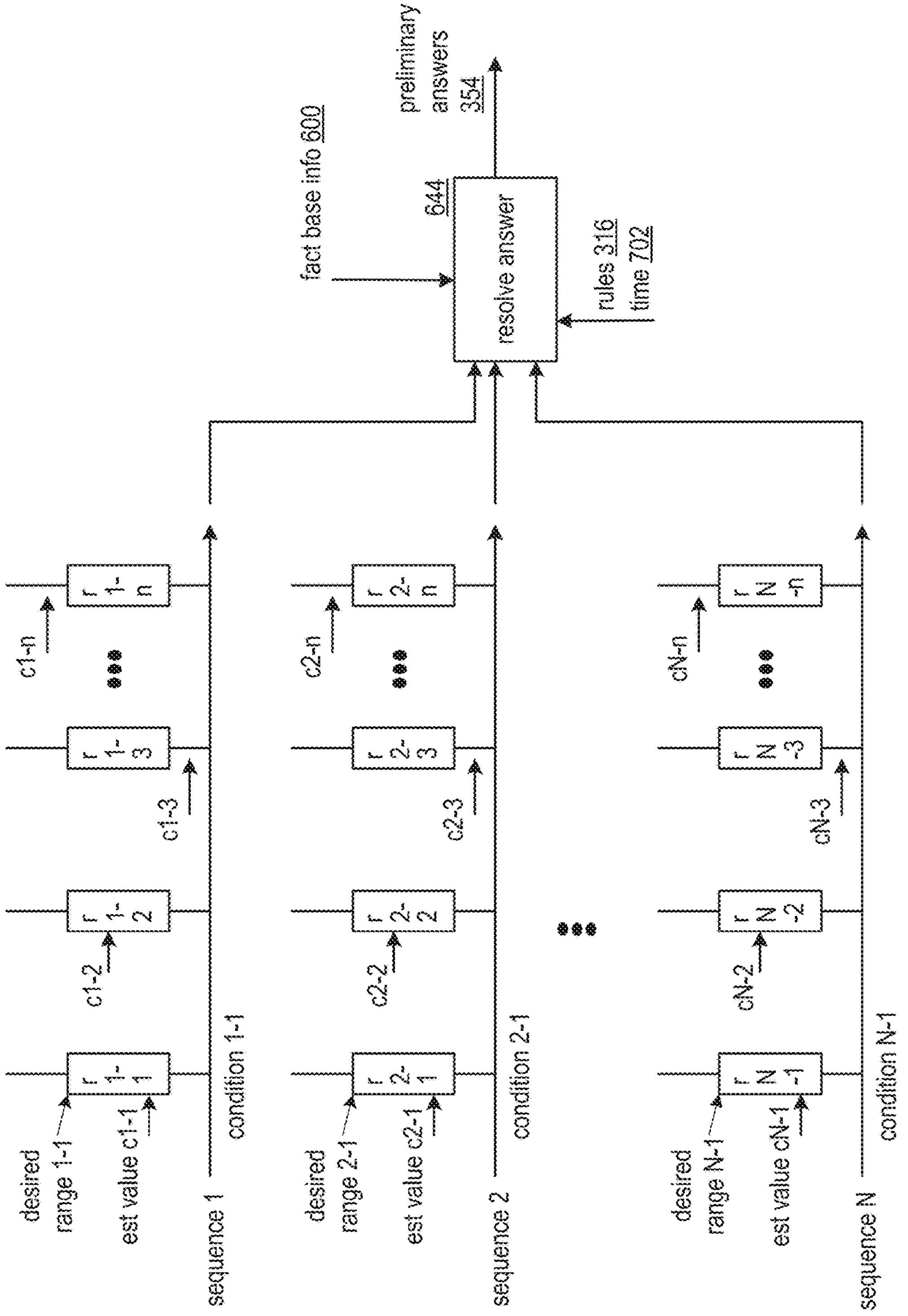
FIG. 10B is a data flow diagram for predicting an attack utilizing pre-attack sequence detection within a computing system in accordance with the present invention.

FIG. 10B is a data flow diagram for predicting an attack utilizing pre-attack sequence detection within a computing system, where a computing device of the computing system performs the resolve answer step 644, based on rules 316, time 702, and fact base info 600, on content that includes an estimated value and desired range for each of n conditions for each N sequences to produce preliminary answers 354. Each condition of the content describes status of an outside force that can be determined based on fact base info 600 (e.g., a sign of a cyber attack, etc.). The computing device compares the estimated value of the condition to a desired range (e.g., minimum/maximum of a metric) associated with the condition to produce the status (e.g., probability of a factual element based on the comparison. Each sequence includes an ordered series of conditions that are estimated to have values that compare favorably to an associated desired value range to complete the sequence (e.g., ordering may be strict or flexible). The plurality of sequences may include any number of sequences to link to the occurrence.

In an example of operation, one sequence is utilized with three conditions to provide a likelihood of a physical attack on a nuclear plant, where the first condition is an Internet capture phrase indicating an issue with regards to the nuclear plant, the second condition is a more direct phrase captured on the Internet with regards to a potential demise of the nuclear plant, and a third condition is evidence of an individual associated with the phrase captures to be within a threshold geographic proximity of the nuclear plant. The computing device obtains the content for the first through third conditions and generates a preliminary answer 354 that indicates that the likelihood of an attack is elevated.

Figure 10C:
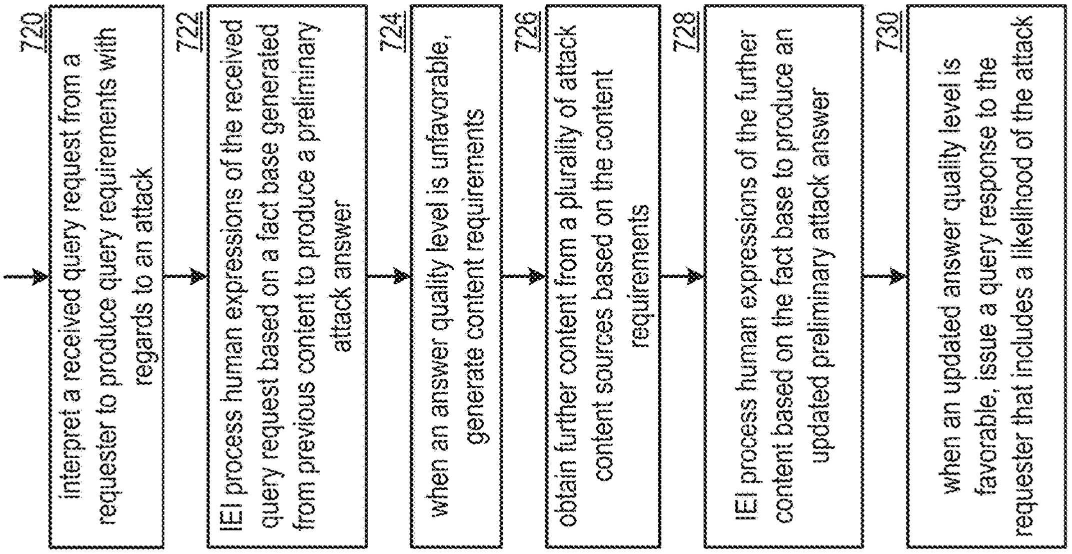
FIG. 10C is a logic diagram of an embodiment of a method for predicting an attack within a computing system in accordance with the present invention.

FIG. 10C is a logic diagram of an embodiment of a method for predicting an attack within a computing system. In particular, a method is presented for use in conjunction with one or more functions and features described in conjunction with FIGS. 1-8L, 10A-10B, and also FIG. 10C. The method includes step 720 where a processing module of one or more processing modules of one or more computing devices of the computing system interprets a received query request from a requester to produce query requirements with regards to an attack. The interpreting includes one or more of determining content requirements, (e.g., to gather conditions of sequences), determining source requirements, determining answer timing requirements, and identifying a domain associated with the query request (e.g., physical attack, cyber attack).

The method continues at step 722 where the processing module WI processes human expressions of the received query request based on a fact base generated from previous content to produce a preliminary attack answer. The processing may include formatting portions of the query request in accordance with formatting rules to produce recognizable human expressions of content and question information. For example, the processing module produces the question information to include a request to determine likelihood of the attack (e.g., identifying conditions and scenarios that lead to the attack).

The processing further includes identifying permutations of identigens within the human expressions, reducing the permutations, mapping the reduce permutations to entigens to produce knowledge, processing the knowledge in accordance with a fact base to produce the preliminary answer, and generating an answer quality level associated with the preliminary answer. For instance, the processing module generates a relatively low answer quality level when the question relates to gathering information over a subsequent time frame such that more content must be gathered to produce an answer associated with a higher and more favorable answer quality level (e.g., start looking for values of conditions associated with scenarios to support answering the likelihood of attack question).

When the answer quality level is unfavorable, the method continues at step 724 where the processing module generates content requirements. The generating of the content requirements includes determining, based on one or more of the query requirements, preliminary answer, and the answer quality level, one or more of content selection requirements, source selection requirements, and acquisition timing requirements.

The method continues at step 726 where the processing module obtains further content from a plurality of attack content sources based on the content requirements. For example, the processing module identifies the plurality of content sources, generates content requests based on the content requirements, and sends the plurality of content requests to the plurality of identified attack content sources, analyzes a plurality of content responses to produce an estimated quality level, indicates favorable quality level when the estimated quality level compares favorably to a minimum quality threshold level, and indicates unfavorable quality level to facilitate collecting more content when the estimated quality level compares unfavorably to the minimum quality threshold level.

The method continues at step 728 where the processing module IEI processes human expressions of the further content based on the fact base to produce an updated preliminary attack answer that identifies the likelihood of the attack. For example, the processing module analyzes, based on one or more of the query request, the fact base info associated with the identified domain, and the further content to produce one or more of updated fact base info (e.g., new knowledge), the updated preliminary occurrence answer (e.g., likelihood of attack), and an associated answer quality level. The analyzing may include reasoning the further content with the fact base to produce the updated fact base info and the preliminary answer to include the likelihood of the attack.

When the updated answer quality level is favorable, the method continues at step 730 where the processing module issues a query response to the request are that predicts the likelihood of the attack. The issuing includes one or more of analyzing the preliminary answers in accordance with the query requirements and the rules to generate the updated quality level, generating the query response to include the answer associated with favorable quality level, and sending the query response to the requester The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 11A:
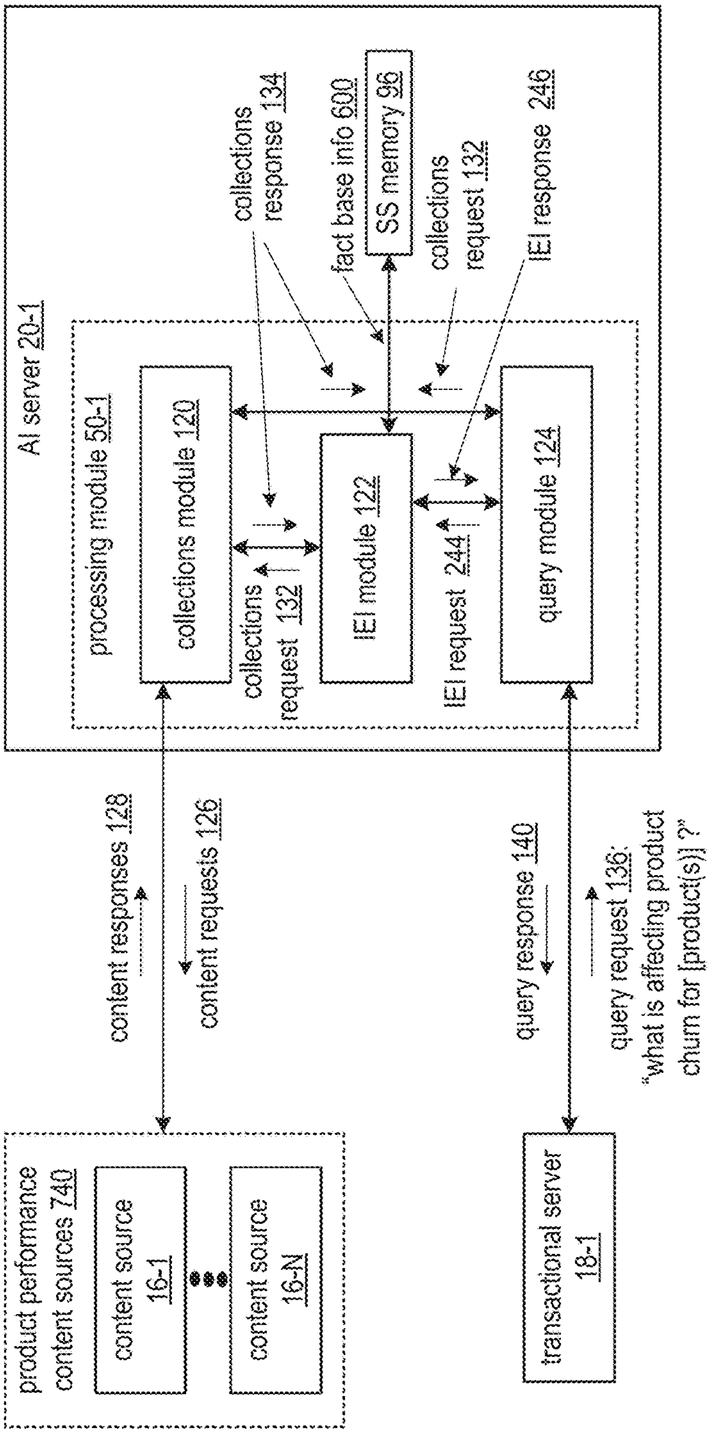
FIG. 11A is a schematic block diagram of another embodiment of a computing system in accordance with the present invention.

FIG. 11A is a schematic block diagram of another embodiment of a computing system that includes product performance content sources 740, the transactional server 18-1 of FIG. 1, and the artificial intelligence (AI) server 20-1 of FIG. 1. The product performance content sources 740 includes the content sources 16-1 through 16-N of FIG. 1. In particular, the content sources 16-1 through 16-N provides one or more of social media information, user activities, user location information, user schedule information, user product comments, use time of products, Internet of things product data, product warranty information, etc. The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to produce a response to a query with regards to perceptions of product performance.

In an example of operation of the responding to the query, the query module 124 interprets a received query request 136 (e.g., from the transactional server 18-1) to produce query requirements. The interpreting includes one or more of determining content requirements, determining source requirements, determining answer timing requirements, and identifying at least one domain associated with the query request 136. For example, the query module 124 determines the content requirements to include a query with regards to perceptions of product performance, determines the source requirements to include the product performance content sources 740, determines the answer timing requirements to include a two week time frame, and identifies product performance perceptions as the domain when receiving the query request 136 that includes a question "what is affecting product churn for [product(s)]?"

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next two weeks and subsequently issues the IEI request 244 to the LEI module 122 to generate the response to the query.

When receiving the LEI request 244, the LEI module 122 formats the LEI request 244 to produce human expressions that include question content and question information. The formatting includes analyzing the LEI request 244 for recognizable human expressions of question content and question information in accordance with rules and fact base information 600 (e.g., facts pertaining to perceptions of product performance) obtained from the SS memory 96.

Having produced the human expressions, the LEI module 122 applies "IEI processing" to the human expressions to produce one or more of new knowledge, a preliminary answer, and an answer quality level associated with the preliminary answer. The LEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer (e.g., perceptions of product performance), and generating the answer quality level based on the preliminary answer and the request (e.g., the LEI request 244, the query request 136).

When the answer quality level is unfavorable, the LEI module 122 issues a collections request 132 to the collections module 120 to gather more content to produce knowledge to enable a desired favorable quality level of the answer. The issuing includes generating the collections request 132 based on one or more of the LEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the product performance content sources 740, determines the content selection requirements to include content associated with the likelihood to purchase, and determines the content acquisition timing requirements to include a two week time span.

Having produced the content requirements, the collections module 120 issues a plurality of content requests 126 to a plurality of content sources identified by the content requirements (e.g., to the content sources 16-1 through 16-N). For example, the collections module 120 identifies the plurality of product performance content sources, generates the content requests 126 based on the content requirements, and sends the plurality of content requests 126 to the identified plurality of content sources 16-1 through 16-N.

Having issued the plurality of content requests 126, the collections module 120 interprets a plurality of content responses 128 to determine whether a response quality level is favorable. The interpreting includes analyzing the plurality of content responses 128 to produce an estimated response quality level, and indicating a favorable response quality level when the estimated response quality level compares favorably to a minimum response quality threshold level (e.g., greater than). When the response quality level is favorable, the collections module 120 issues a collections response 134 to the IEI module 122, where the collections response 134 includes further content. For example, the collections module 120 generates the collections response 134 to include the further content and the estimated response quality level, and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which identifies the perceptions of product performance. When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the transactional server 18-1, where the query response 140 includes the answer associated with the favorable quality level of the answer.

Figure 11B:
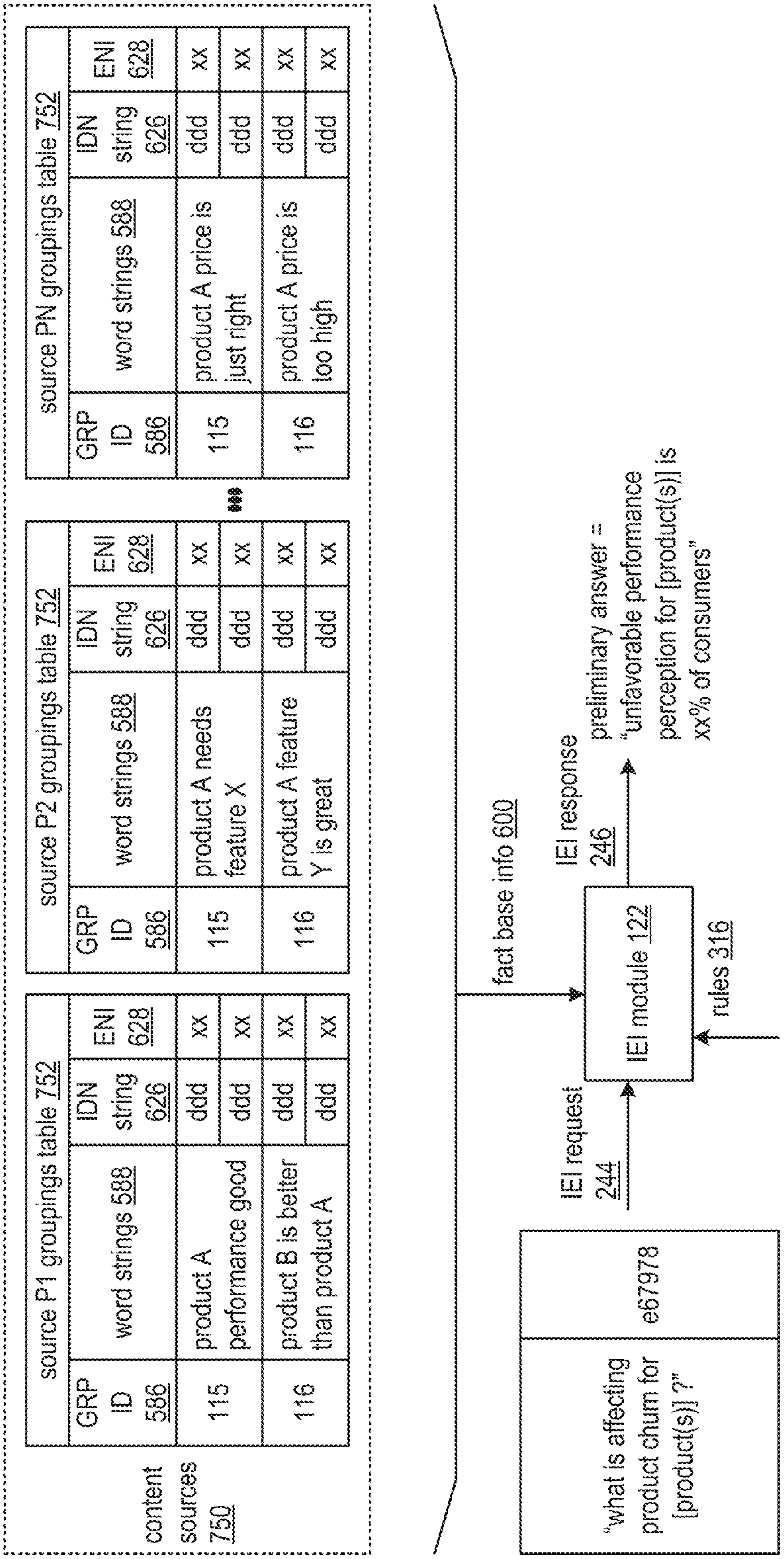
FIG. 11B is a data flow diagram for providing an answer to a question within a computing system in accordance with the present invention.

FIG. 11B is a data flow diagram for providing an answer to a question within a computing system. The data flow diagram includes the IEI module 122 of FIG. 11A and fact base information 600 in the form of content sources 750. The content sources 750 includes a plurality of source P1-PN groupings table 752. Each groupings table 752 includes multiple fields including fields for a group (GRP) identifier (ID) 586, word strings 588, identigen (IDN) string 626, and an entigen (ENI) 628. For instance, the groupings tables 752 of the content sources 750 includes word strings and identifiers associated with consumer product performance perceptions, such as product B is better than product A, product A needs feature X, and product A price is too high.

As an example of operation of providing an answer to a query, the IEI module 122 interprets the IEI request 244, facilitates obtaining the fact base information 600, and generates the preliminary answer based on the rules 316 and associated time frames relevant to the question of the IEI request 244. For example, the IEI module 122 generates the preliminary answer to indicate that "unfavorable performance perception for product A is 30% of consumers". For instance, the IEI module 122 identifies the preference for product B over product A, the product A needs feature X, and the product A price is too high.

Figure 11C:
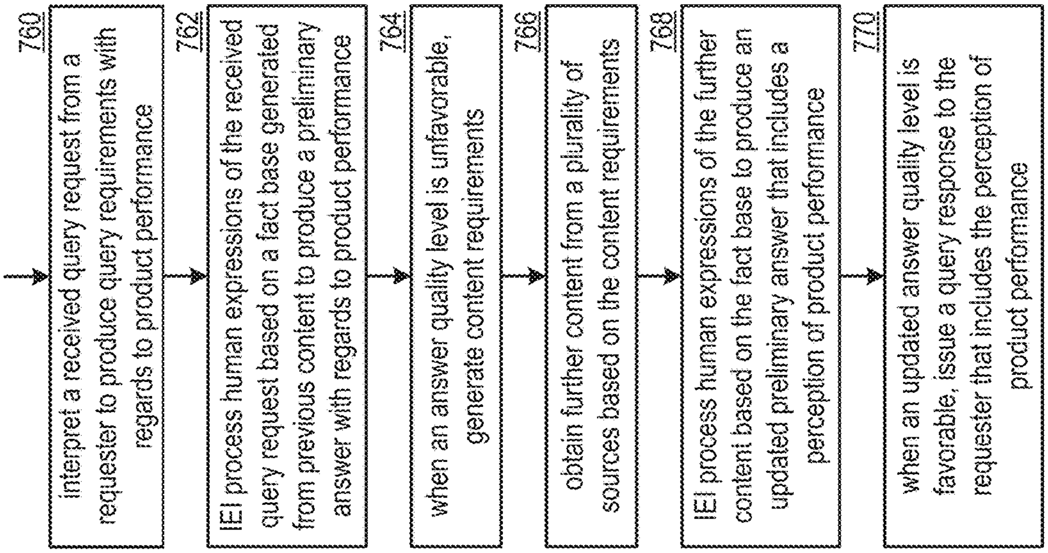
FIG. 11C is a logic diagram of an embodiment of a method for providing an answer to a question within a computing system in accordance with the present invention.

FIG. 11C is a logic diagram of an embodiment of a method for providing an answer to a question within a computing system. In particular, a method is presented for use in conjunction with one or more functions and features described in conjunction with FIGS. 1-8L, 11A-11B, and also FIG. 11C. The method includes step 760 where a processing module of one or more processing modules of one or more computing devices of the computing system interprets a received query request from a requester to produce query requirements. The interpreting includes one or more of determining content requirements, (e.g., to determine product performance perceptions), determining source requirements, determining answer timing requirements, and identifying a domain (e.g., consumer product performance perceptions) associated with the query request.

The method continues at step 762 where the processing module IEI processes human expressions of the received query request based on a fact base generated from previous content to produce a preliminary answer with regards to product performance. The processing may include formatting portions of the query request in accordance with formatting rules to produce recognizable human expressions of content and question information. For example, the processing module produces the question information to include a request to determine consumer product performance perceptions for a particular domain (e.g., product churn). The processing may further include identifying permutations of identigens within the human expressions, reducing the permutations, mapping the reduced permutations to entigens to produce knowledge, processing the knowledge in accordance with a fact base to produce the preliminary answer, and generating an answer quality level associated with the preliminary answer. For instance, the processing module generates a relatively low answer quality level when the question relates to gathering information over a subsequent two weeks such that more content must be gathered to produce an answer associated with a higher and more favorable answer quality level.

When the answer quality level is unfavorable, the method continues at step 764 where the processing module generates content requirements. The generating of the content requirements includes determining, based on one or more of the query requirements, preliminary answer, and the answer quality level, one or more of content selection requirements, source selection requirements, and acquisition timing requirements.

The method continues at step 766 where the processing module obtains further content from a plurality of sources based on the content requirements. For example, the processing module identifies the plurality of sources (e.g., product performance content sources), generates requests based on the content requirements, and sends the plurality of content requests to the plurality of identified content sources, analyzes a plurality of content responses to produce an estimated quality level, indicates favorable quality level when the estimated quality level compares favorably to a minimum quality threshold level, and indicates unfavorable quality level to facilitate collective more content when the estimated quality level compares unfavorably to the minimum quality threshold level.

The method continues at step 768 where the processing module IEI processes human expressions of the further content based on the fact base to produce an updated preliminary answer that includes a perception of product performance. For example, the processing module analyzes, based on one or more of the query request, the fact base info associated with the identified domain, and the further content to produce one or more of updated fact base info (e.g., new knowledge), the updated preliminary answer (e.g., updated consumer product performance perceptions over the last two weeks and an associated answer quality level. The analyzing may include reasoning the further content with the fact base to produce the updated fact base info and the preliminary answer to include the product performance perceptions.

When the updated answer quality level is favorable, the method continues at step 770 where the processing module issues a query response to the request are that identifies the propensity to purchase. The issuing includes one or more of analyzing the preliminary answers in accordance with the query requirements and the rules to generate the updated quality level, generating the query response to include the answer associated with favorable quality level, and sending the query response to the requester The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 12A is a schematic block diagram of another embodiment of a computing system that includes media sources 780, the user device 12-1 of FIG. 1, and the artificial intelligence (AI) server 20-1 of FIG. 1. The media sources 780 includes the content sources 16-1 through 16-N of FIG. 1. In particular, the content sources 16-1 through 16-N provides one or more of social media information, newsfeeds, press releases, blog info, periodicals, library info, records, etc. The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to produce a response to a query with regards to factual likelihood of a topic based on curated knowledge.

In an example of operation of the responding to the query, the query module 124 interprets a received query request 136 (e.g., from the user device 12-1) to produce query requirements. The interpreting includes one or more of determining content requirements, determining source requirements, determining answer timing requirements, and identifying at least one domain associated with the query request 136. For example, the query module 124 determines the content requirements to include a query with regards to factual likelihood of a topic, determines the source requirements to include the media sources 780, determines the answer timing requirements to include one hour time frame, and identifies factual likelihood of a topic as the domain when receiving the query request 136 that includes a question: "what is most likely factual about [topic]?"

Having produced the query requirements, the query module 124 issues at least one of an IEI request 244 and a collections request 132 based on the query request 136. For example, the query module 124 generates the LEI request 244 and sends the LEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next hour and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., factual likelihood of a topic) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer (e.g., factual likelihood of a topic), and generating the answer quality level based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the media content sources 780, determines the content selection requirements to include content associated with the factual likelihood of a topic, and determines the content acquisition timing requirements to include a one hour time span.

Having produced the content requirements, the collections module 120 issues a plurality of content requests 126 to a plurality of media sources identified by the content requirements (e.g., to the content sources 16-1 through 16-N). For example, the collections module 120 identifies the plurality of media sources, generates the content requests 126 based on the content requirements, and sends the plurality of content requests 126 to the identified plurality of content sources 16-1 through 16-N.

Having issued the plurality of content requests 126, the collections module 120 interprets a plurality of content responses 128 to determine whether a response quality level is favorable. The interpreting includes analyzing the plurality of content responses 128 to produce an estimated response quality level, and indicating a favorable response quality level when the estimated response quality level compares favorably to a minimum response quality threshold level (e.g., greater than). When the response quality level is favorable, the collections module 120 issues a collections response 134 to the IEI module 122, where the collections response 134 includes further content. For example, the collections module 120 generates the collections response 134 to include the further content and the estimated response quality level, and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which identifies the factual likelihood of a topic. When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the transactional server 18-1, where the query response 140 includes the answer associated with the favorable quality level of the answer.

FIG. 12B is a data flow diagram for providing an answer to a question with regards to factual likelihood within a computing system using curated knowledge. The data flow diagram includes the IEI module 122 of FIG. 12A and fact base information 600 in the form of the media sources 790. The media sources 790 includes a plurality of source MI-MN groupings table 792. Each groupings table 792 includes multiple fields including fields for a group (GRP) identifier (ID) 586, word strings 588, identigen (IDN) string 626, and an entigen (ENI) 628. For instance, the groupings tables 792 of the media sources 790 includes word strings and identifiers associated with factual likelihood of a topic including instances of B and C being true about A, and instances when B is not true about A and C is not true about A.

As an example of operation of providing an answer to a query, the IEI module 122 interprets the IEI request 244, facilitates obtaining the fact base information 600, and generates the preliminary answer based on the rules 316 and associated time frames relevant to the question of the IEI request 244. For example, the IEI module 122 generates the preliminary answer to indicate that "B is likely true about A". For instance, the IEI module 122 identifies that B is true about A in an instance and B is likely true about A in another instance associated with the timeframe. FIGS. 12C-D are data flow diagrams for curating knowledge within a computing system.

FIG. 12C illustrates the curating of the knowledge and includes step 793 where an initial interpretation is generated for raw content (e.g., source content 310). For example, a plurality of phrases, including true and false phrases, of a related topic (e.g., an aspect of current events, a historical topic, a topic requiring interpretation, etc.) are ingested from a plurality of sources 1-S, including trusted and un-trusted sources. The characters of strings of words of the phrases are compared to entries of a dictionary to produce valid words (e.g., known words). The valid words are compared to entries of an identigen list (e.g., from a knowledge database) to produce, for each word, a set of identigens (e.g., possible meanings of the word). Language specific rules are applied to the identified identigens with regards to ordering of the identigens (e.g., simple pairs of identigens to complex strings of identigens) to determine the validity of various combinations of the identigens to produce entigen groups for each phrase, where each entigen group represents a most likely meaning of the corresponding phrase.

Generating the initial interpretation from the entigen groups includes a variety of approaches. One approach includes identifying a most common meaning of the entigen groups. Another approach includes identifying an entigen group that compares favorably to a search phrase (e.g., buzzword search).

The curating of the knowledge continues at step 794 where the initial interpretation is scored to determine whether the initial interpretation is reliable based on phrases gathered so far. For example, each entigen group is analyzed to determine whether it supports the initial interpretation as a confirming entigen group or the opposite, where the entigen group provides negative support for the initial interpretation as he does confirming entigen group. Still other entigen groups may be neutral and not confirm or disconfirm the initial interpretation. Each entigen group is scored based on its affiliation as a confirming or does confirming entigen group, age of the phrase associated with the entigen group (e.g., fresher data may be more reliable), and a historical record of reliability of the source associated with the phrase of the entigen group. For instance, a score associated with a more favorable level of confidence is associated with an entigen group that aligns with the confirming of the initial interpretation and is based on newer information from more reliable sources.

The curating of the knowledge continues at step 795 where the scores are interpreted to determine whether the initial interpretation is reliable and, when reliable, adds the initial interpretation to a knowledge database. For example, a weighting approach is utilized to aggregate scores to produce a confidence level. For instance, weighting factors are multiplied by each component of the scores (e.g., an alignment component, the source reliability component, an information age component) to produce intermediate scores for aggregation to produce the conference level. The confidence level indicates that the initial interpretation is reliable when the confidence level is greater than a confidence threshold.

When the initial interpretation is reliable, one or more of the initial interpretation and the entigen groups are added to the knowledge base to create the updated fact base information 608. Additional knowledge is added to previous knowledge to create the curated knowledge.

FIG. 12D illustrates an example of the curated knowledge, where raw content (e.g., source content 310) is ingested and analyzed to produce uncurated knowledge 798. The uncurated knowledge 798 is scored for further analysis of the scores to produce curated knowledge (fact base information 600) when a confidence level based on the scores indicates that the initial interpretation 801 of the uncurated knowledge 798 is reliable.

In an example, phrases 800-1 through 800-3 are received from known reliable sources S1-S3, phrases 800-11 through 800-13 are received from unknown reliable sources S11 through S13, and phrases 800-41 through 800-43 are received from known unreliable sources S41 through S43, where the phrases are associated with a related topic. Each phrase is processed to produce a corresponding entigen group, wherein each entigen group represents a most likely meaning of the phrase. The initial interpretation 801 is produced based on the entigen groups (e.g., a most frequent most likely meaning).

To score the un-curated knowledge 798, each entigen group is affiliated with one of confirming entigen groups 802 (e.g., when the entigen group confirms the initial interpretation 801), inconclusive entigen groups 804 (e.g., when the entigen group neither confirms or disconfirm the initial interpretation 801), and disconfirming entigen groups 806 (e.g., when the entigen group does confirms the initial interpretation 801). For instance, the confirming entigen groups 802 includes entigen groups 810-001 through 810-200, the inconclusive entigen groups 804 includes entigen groups 810-301 through 810-320, and the disconfirming entigen groups 806 includes entigen groups 810-401 through 810-405. Each entigen group is associated with a score based on one or more of affiliation with one of the entigen groups 801, 804, and 806, age of the associated phrase, and reliability of the source associated with the phrase. For example, more favorable (e.g., higher scores) are assigned to entigen groups that confirm the initial interpretation and that are from known reliable sources.

A weighted scoring approaches applied to the scores for the entigen groups to produce a confidence level of the initial interpretation 801. For example, a sum of the scores of the confirming entigen groups 802 is multiplied by a confirming weighting factor to produce a confirming intermediate confidence level, the sum of the scores of the inconclusive entigen groups 804 is multiplied by an inconclusive weighting factor to produce an inconclusive intermediate confidence level, and a sum of the scores of the disconfirming entigen groups 806 is multiplied by a disconfirming weighting factor to produce a disconfirming intermediate conference level. The disconfirming intermediate confidence level is subtracted (e.g., to lower an overall conference level) from a sum of the confirming intermediate confidence level and the inconclusive intermediate confidence level to produce the overall confidence level.

When the confidence level is greater than a confidence threshold level, a reliable interpretation 807 is produced based on the initial interpretation 801 (e.g., the same, modified based on some of the entigen groups) and confirmed entigen groups 808 are produced to include at least some of the entigen groups associated with the confirming entigen groups 802.

FIG. 12E is a logic diagram of an embodiment of a method for curating knowledge within a computing system. In particular, a method is presented for use in conjunction with one or more functions and features described in conjunction with FIGS. 1-8L, and also 12A-12D. The method includes step 812 where a processing module of one or more processing modules of one or more computing devices of the computing system generates generating a plurality of entigen groups from a plurality of phrases. The plurality of entigen groups represents a plurality of most likely meanings for the plurality of phrases. The plurality of phrases is of a related topic.

The generating the plurality of entigen groups from the plurality of phrases includes a series of generating steps. As an example of processing a first phrase, a first generating step includes determining a set of identigens for each word of at least some words of a string of words of the first phrase of the plurality of phrases to produce a plurality of sets of identigens. Each identigen of the set of identigens is a different meaning of a corresponding word. Each phrase is processed in a similar manner.

A second generating step includes interpreting, based on a knowledge database, the plurality of sets of identigens to produce the first entigen group. Each entigen of the first entigen group corresponds to a selected identigen of one of the plurality of sets of identigens that represents a most likely meaning of a corresponding word of the at least some of the words of the string of words. The first entigen group is a most likely meaning of the string of words. The knowledge database includes a plurality of records that link words having a connected meaning. For example, a graphical database is utilized to represent entigens and linkages between the entigens.

The method continues at step 813 where the processing module determines an initial interpretation of the related topic based on the plurality of most likely meanings for the plurality of phrases. The determining the initial interpretation of the related topic based on the plurality of most likely meanings for the plurality of phrases includes utilizing one or more of a variety of interpretation approaches.

A first interpretation approach includes identifying a most frequent most likely meaning of the plurality of most likely meanings for the plurality of phrases as the initial interpretation. For example, the processing module stratified is the entigen groups by their associated most likely meaning and identifies the most likely meaning that occurs more often than others.

A second interpretation approach includes identifying an entigen group associated with the most frequent most likely meaning of the plurality of most likely meanings for the plurality of phrases as the initial interpretation. For example, the processing module identifies an entigen group that corresponds to the identified most frequent most likely meaning.

The third interpretation approach includes identifying an entigen group associated with a most likely meaning that compares favorably to a search phrase as the initial interpretation. For example, the processing module obtains the search phrase (e.g., a buzzword, a string of words), produces a search phrase entigen group using the search phrase, and compares the search phrase entigen group to the plurality of entigen groups to identify an entigen group that compares favorably to the search phrase entigen group.

The method continues at step 814 where the processing module generates a plurality of scores for the plurality of entigen groups based on the initial interpretation of the related topic and source information (e.g., source reliability, age of phrase) of the plurality of phrases. A first score of the plurality of scores is for a first entigen group of the plurality of entigen groups. The generating of the scores includes utilizing one or more of a variety of score generating approaches.

A first score generating approach includes determining a reliability score for the first entigen group based on a reliability level of a first source associated with a first phrase that is utilized to generate the first entigen group. For example, the processing module obtains a historical record of the reliability level of the first source to produce the reliability score.

A second score generating approach includes determining an aging score for the first entigen group based on an age of the first phrase. For example, the processing module obtains a freshness level (e.g., a timestamp of generation of the first phrase, a timestamp of receipt of the first phrase, a timeframe between generation of the phrase and a current time, a timeframe between receipt of the phrase and a current time) and calculates the aging score utilizing the freshness level, where an aging score for an older phrase is less favorable (e.g., less than) that an aging score for a newer phrase.

A third score generating approach includes determining an alignment score for the first entigen group based on alignment with the initial interpretation. The alignment score for a confirming alignment is greater than (e.g., more favorable) an alignment score for a disconfirming alignment. For example, the processing module compares the most likely meaning of the first entigen group to the initial interpretation and indicates the confirming alignment when the comparison is favorable (e.g., the entigen group supports the initial interpretation). As another example, the processing module indicates disconfirming alignment when the comparison is unfavorable (e.g., the entigen group opposes the initial interpretation). As yet another example, the processing module indicates neutral alignment when the comparison is neither favorable or unfavorable (e.g., the entigen group does not support or oppose the initial interpretation).

A fourth score generating approach includes determining the first score for the first entigen group based on a weighting approach and the reliability score for the first entigen group, the aging score for the first entigen group, and the alignment score for the first entigen group. The weighting approaches includes establishing higher weighting to the reliability score when the first source has a superior historical record of issuing true phrases and establishes higher weighting to age when information freshness matters more.

The method continues at step 815 where the processing module interprets the plurality of scores in relation to the initial interpretation to determine a confidence level of the initial interpretation. The interpreting of the plurality of scores includes a series of interpreting steps.

A first interpreting step includes identifying confirming entigen groups of the plurality of entigen groups favorably aligned with the initial interpretation. For example, the processing module counts the number of entigen groups that support the initial interpretation.

A second interpreting step includes identifying disconfirming entigen groups of the plurality of entigen groups unfavorably aligned with the initial interpretation. For example, the processing module counts the number of entigen groups that oppose the initial interpretation.

A third interpreting step includes determining the confidence level based on a weighting approach and scores for the confirming entigen groups and other scores for the disconfirming entigen groups. For example, the processing module multiplies each score by a weighting factors for confirming and disconfirming to produce an intermediate confidence level and aggregates the intermediate confidence levels to produce the confidence level.

When the confidence level of the initial interpretation compares unfavorably to a confidence threshold, the method branches to step 818 (e.g., the processing module indicates the unfavorable comparison when the confidence level is less than the confidence threshold). When the conference level of the initial interpretation compares favorably to the confidence threshold, the method continues at step 816 (e.g., the processing module indicates the favorable comparison when the confidence level is greater than the confidence threshold).

When the confidence level of the initial interpretation compares favorably to a confidence threshold, the method continues at step 816 where the processing module indicates that the initial interpretation is reliable (e.g., ready for further processing is curated knowledge). The method continues at step 817 where the processing module stores a representation of the initial interpretation in a knowledge database as curated knowledge. For example, the processing module stores and the initial interpretation entigen group as the curated knowledge in the knowledge database. As another example, the processing module stores at least some of the plurality of entigen groups in the knowledge database as further curated knowledge (e.g., entigen groups that support the initial interpretation).

When the confidence level of the initial interpretation compares unfavorably to the confidence threshold, the method continues at step 818 where the processing module facilitates one or more further steps to gather and process more uncurated knowledge to lead to producing curated knowledge by looping back to step 812.

A first further step includes generating an updated plurality of entigen groups from an updated plurality of phrases. The updated plurality of entigen groups represents a plurality of most likely meanings for the updated plurality of phrases. The updated plurality of phrases is of the related topic (e.g., the same topic when trying to curate knowledge around the related topic, alternatively a different related topic when several loops have occurred without generating curated knowledge).

A second further step includes determining an updated initial interpretation of the related topic based on the plurality of most likely meanings for the updated plurality of phrases. For instance, the processing module modifies the initial interpretation to produce the updated initial interpretation based on more insights from the updated plurality of entigen groups.

A third further step includes generating an updated plurality of scores for the updated plurality of entigen groups based on the updated initial interpretation of the related topic and updated source information (e.g., new sources, new timing) of the updated plurality of phrases. A first score of the updated plurality of scores is for a first entigen group of the updated plurality of entigen groups. For example, the processing module re-scores previously scored entigen groups and a science a score to new entigen groups resulting from the further gathering of more phrases.

A fourth further step includes interpreting the updated plurality of scores in relation to the updated initial interpretation to determine an updated confidence level of the updated initial interpretation. For example, the processing module recalculates the confidence level based on all of the newly collected knowledge (e.g., the updated plurality of entigen groups etc.)

A fifth further step includes, when the updated confidence level of the updated initial interpretation compares favorably to the confidence threshold, the processing module indicates that the updated initial interpretation is reliable. For example, the processing module utilizes the same confidence threshold with the new curated knowledge to determine whether the comparison is favorable. As another example, the processing module utilizes an updated confidence threshold (e.g., a lower threshold level) to determine whether the updated initial interpretation is reliable.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 13A is a schematic block diagram of another embodiment of a computing system that includes language sources 820, the user device 12-1 of FIG. 1, and the artificial intelligence (AI) server 20-1 of FIG. 1. The language sources 820 includes the content sources 16-1 through 16-N of FIG. 1. In particular, the content sources 16-1 through 16-N provides one or more of dictionaries, language translation references, dialect information, cultural information, historical language evolution information, regional language information, spoken versus written language similarities and differences information, entertainment media, social media information, newsfeeds, press releases, blog info, periodicals, library info, records, etc.

The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to produce a response to a query with regards to translating a phrase from one language into one or more other target languages.

In an example of operation of the responding to the query, the query module 124 interprets a received query request 136 (e.g., from the user device 12-1) to produce query requirements. The interpreting includes one or more of determining content requirements, determining source requirements, determining answer timing requirements, and identifying at least one domain associated with the query request 136. For example, the query module 124 determines the content requirements to include a query with regards to translating a phrase from one language into one or more other target languages, determines the source requirements to include the language sources 820, determines the answer timing requirements to include current times with regards to utilizing languages, and identifies language translation as the domain when receiving the query request 136 that includes a question "how does this [first language phrase] translate into [other language(s)] given associated [context]?"

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that an immediate update of language utilization is associated with the query request 136 and more content is required. For instance, the query module 124 issues the collections request 132 to the collections module 120 to facilitate collecting content and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions (e.g., strings of words) of question content and question information in accordance with rules and fact base information 600 (e.g., language translation information such as word meanings, grammar rules, local dialect nuances, context shifters, etc.) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer (e.g., a language translation output), and generating the answer quality level based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the language sources 820, determines the content selection requirements to include content associated with language translation and determines the content acquisition timing requirements to include an immediate analysis.

Having produced the content requirements, the collections module 120 issues a plurality of content requests 126 to a plurality of language sources identified by the content requirements (e.g., to the content sources 16-1 through 16-N). For example, the collections module 120 identifies the plurality of language sources, generates the content requests 126 based on the content requirements, and sends the plurality of content requests 126 to the identified plurality of content sources 16-1 through 16-N.

Having issued the plurality of content requests 126, the collections module 120 interprets a plurality of content responses 128 to determine whether a response quality level is favorable. The interpreting includes analyzing the plurality of content responses 128 to produce an estimated response quality level, and indicating a favorable response quality level when the estimated response quality level compares favorably to a minimum response quality threshold level (e.g., greater than). When the response quality level is favorable, the collections module 120 issues a collections response 134 to the IEI module 122, where the collections response 134 includes further content. For example, the collections module 120 generates the collections response 134 to include the further content and the estimated response quality level, and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which produces the language translation. When the answer quality level is favorable, the IEI module 122 issues an IEI response 246 to the query module 124 where the IEI response 246 includes the preliminary answer associated with a favorable answer quality level.

The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the transactional server 18-1, where the query response 140 includes the answer associated with the favorable quality level of the answer.

FIGS. 13B-13D are process flow diagrams of another embodiment of a method to translate words of a first language into words of a second language within a computing system. The method includes interpreting true meaning of a sentence for translation and transforming the true meaning into a sentence of another language.

The interpreting of the true meaning of the sentence for translation includes a series of interpreting steps. FIG. 13B illustrates a first interpreting step includes identifying textual words 528-1 (e.g., in the first language) utilizing a dictionary associated with the first language. For example, the words "the", "black", "bat", "eats", and "fruit" are identified as valid words when the sentence includes: "The black that eats fruit."

A second interpreting the step includes identifying grammatical use 649-1 (e.g., for the first language, English in a specific example), where the ordering of the words establishes grammatical use in accordance with norms for the first language. A third interpreting step includes identifying a word type 542 (e.g., object, characteristic, action, functional) for each word in accordance with the first language. For example, "black" is a color characteristic, "bat" is an object or an action, "eats" is an action, and "fruit" is an object.

A fourth interpreting step includes, for each word, listing possible identigens 718-1 (e.g., with different meanings in the first language). For example, a knowledge database includes a list of all possible identigens for known words of the first language.

A fifth interpreting step includes selecting, for each word, a corresponding identigen to produce an entigen resulting in a most likely meaning entigen group 823-1. The selecting includes utilizing first language rules (e.g., which pairings, groupings, and ordering of two or more identigens are allowed in accordance with the first language) to pare down the permutations of identigens to select the surviving entigens. For example, entigen e452 corresponding to a flying bat is selected since a baseball bat is eliminated since the first language rules do not include a baseball bat eating anything and the flying bat can eat fruit. In a similar manner, entigen e3282 is selected for the first language word "black", entigen e7398 is selected for the first language word "eats", and entigen e8272 is selected for the first language word "fruit."

The most likely meaning entigen group 823-1 is language independent even though it was generated from the first language. Each entigen of the most likely meaning entigen group is linked by a connected meaning that is language independent. For example, the bat "is" of the black color, the bat "does" eat, and the eating "does to" the fruit. The most likely meaning entigen group and 23-1 may be further integrated with a knowledge database to build the knowledge database and/or verify that the most likely meaning entigen group is valid. For example, the black that eats fruit is integrated into the knowledge database where the bat is connected to a flying mammal that also eats insects. The interpreting steps will be discussed in greater detail with reference to FIG. 13C.

The transforming of the true meaning into a sentence of the other language includes a series of transformation steps. For each desired second language, the most likely meaning entigen group 823-1 is processed utilizing associative meanings (e.g., identigens 718-2 of the second language Spanish) to produce, for each entigen of the most likely meaning entigen group, a set of identigens of the second language, where the meanings of the set of identigens of the second language are similar to the meaning of the entigen.

The resulting groupings of identigens are processed using grammatical use 649-2 (e.g., logical associations of words that map to the selected identigens) to produce textual words 528-2 in the second language. For instance, the Spanish words "el murciélago negro come fruta" are produced utilizing the Spanish grammar rules when applied to the permutations of identigens for Spanish.

In a similar manner, the most likely meaning entigen group 823-1 may be utilized to produce textual words 528-3 for a third language (e.g., German) by utilizing grammatical rules 649-3 for third language German and associated meaning identigens 718-3 for their language German. For instance, the German words "die schwarze Fledermaus isst obst" are produced utilizing the German grammar rules when applied to the permutations of identigens for German. The translation may include any number of languages and dialects. Alternatively, or in addition to, the output textual words may be applied to the interpreting steps to reproduce the most likely meaning entigen group for verification of the translation process. The verification step will be discussed in greater detail with reference to FIG. 13D.

FIG. 13C further illustrates the interpreting steps and transformation, where the English input for translation "The black that eats fruit" is processed to determine first language identigens 824-1. For example, the identigen I1-10 is identified for "black", identigens I1-438 (e.g., baseball bat), I1-390 (e.g., flying bat), and I1-238 (e.g., action to hit) are identified for "bat", identigen I1-940 is identified for "eats", and identigen I1-829 is identified for "fruit" utilizing a knowledge database associated with the English language.

The plurality of sets of first language identigens 824-1 is interpreted to produce an entigen group 823-1 as a representation of the true meaning of the English input for translation. For example, entigen e3282 is selected for the English language word "black", entigen e7398 is selected for the English language word "eats", and entigen e8272 is selected for the English language word "fruit" in accordance with the first language rules pertaining to valid orderings and pairings of first language words.

A plurality of second language identigens 825-1 are identified for the entigen group 823-1, where the second language identigens are associated with similar or the same meanings as the entigens. Words of the second language (e.g., Spanish) are produced based mapping the plurality of second language identigens 825-2 to second language words using second language rules. In a first step, that may produce words in an incorrect order for the second language. For example, a simple mapping of the identigens for black that eats fruit to the corresponding Spanish words will have the words "el negro murciélago come fruta" which is noncompliant to a typical ordering of the words when utilizing the Spanish language.

When the incorrect ordering has occurred, the correct ordering is provided by applying the second language rules once again to the incorrectly ordered words to produce the correctly ordered words. For example, "el negro murciélago come fruta" is rearranged to produce "el murciélago negro come fruta" in accordance with the second language rules for Spanish.

FIG. 13D illustrates an example of the verification of the translation, that includes the interpretation and translation steps as previously discussed (e.g., producing "el murciélago negro come fruta" in accordance with the second language rules for Spanish).

The words of the second language are processed to determine, for each word of the translation, a set of second language identigens of a plurality of sets of second language identigens 824-2. For example, identigens I2-447 (e.g., baseball bat), I2-831 (e.g., flying bat), and I2-647 (e.g., to hit) are identified for "murciélago" since they are all similar. Further, identigen I2-10 is identified for "negro", identigen I2-355 is identified for "come", and identigen I2-774 is identified for "fruta" in accordance with second language rules.

The plurality of sets of second language identigens 824-2 are interpreted to produce an entigen group 823-2. For example, the identigens are interpreted to produce entigens e3282, e452, e7398, and e8272 in accordance with the second language rules. For instance, for each entigen, an entigen is selected that has a meaning that most closely matches the meaning of a selected identigen of a corresponding set of second language identigens.

The entigen group 823-2 is compared to the entigen group 823-1 and when the comparison is favorable (e.g., substantially the same) the output of the translation is verified. Alternatively, or in addition to, the entigen group 823-2 is utilized to create a string of words in the English language for comparison to the original English input for translation as an alternative verification approach. As a still further alternative, the entigen group 823-2 is utilized to generate a string of words in a fourth language where the string of words of the fourth language is ingested and translated into the words of the second language for verification of the translation.

FIG. 13E is a logic diagram of an embodiment of a method for translating words of a first language into words of a second language within a computing system. In particular, a method is presented for use in conjunction with one or more functions and features described in conjunction with FIGS. 1-8L, and also FIGS. 13A-D. The method includes step 830 where a processing module of one or more processing modules of one or more computing devices of the computing system interprets, based on first language rules, a plurality of sets of first language identigens to produce an entigen group. The entigen group represents a most likely meaning of a string of first language words. A set of the plurality of sets of first language identigens includes one or more different meanings of a word of the string of first language words.

An entigen of the entigen group corresponds to an identigen of the set of first language identigens having a selected meaning of the different meanings of the word. For example, the processing module uses a dictionary to identify words of the string of first language words, performs a lookup (e.g., in a knowledge database) of the words to identify each set of first language identigens for each word of the string of words, and applies the first language rules to exclude disallowed combinations of first language identigens and to include the allowed combinations of first language identigens to produce the entigen group.

The method continues at step 832 where the processing module identifies, for each entigen of the entigen group, a corresponding set of second language identigens to identify a plurality of sets of second language identigens. For example, the processing module accesses, for each entigen of the entigen group, the knowledge database to recover the corresponding set of second language identigens. The knowledge database includes a plurality of records that link words having a connected meaning. For example, the processing module finds the identigen(s) with a same meaning from a record of the knowledge for the entigen.

The method continues at step 834 where the processing module selects, for each entigen of the entigen group, a selected second language identigen from the corresponding set of second language identigens based on meaning of the entigen to produce an initial string of second language words. For example, the processing module identifies, for each entigen of the entigen group, the selected second language identigen from the corresponding set of second language identigens to produce a second language identigen group when a meaning of the selected second language identigen compares favorably to the meaning of the entigen based on second language rules. For instance, the processing module finds the identigen(s) with the same meaning from the record of the knowledge database as the entigen.

The producing of the initial string of second language words further includes mapping each selected second language identigen of the second language identigen group to a word of the initial string of second language words based on the second language rules. For example, the processing module performs perform a lookup of each word for each identigen, selects a best word when there are multiple alternatives based on the second language rules by reversing the process, where, a candidate string of words is mapped to identigens for comparison to the second language identigen group.

The method continues at step 836 for the processing module adjusts, based on the second language rules, the initial string of second language words to produce a translated string of words having a substantially similar meaning as the string of first language words. For example, the processing module utilizes the second language rules to determine a re-ordering of the words or different forms of the words that comply with the second language.

The method continues at step 838 where the processing module interprets, based on the second language rules, a plurality of sets of verification second language identigens to produce a verification entigen group. The verification entigen group represents a most likely meaning of the initial string of second language words. A set of the plurality of sets of verification second language identigens includes one or more different meanings of a word of the initial string of second language words. An entigen of the verification entigen group corresponds to an identigen of the set of verification second language identigens having a selected meaning of the different meanings of the word. For example, the processing module interprets the initial string of second language words or a variant, i.e., re-ordering of the words, to produce another entigen group for comparison to the entigen group produced from the first language.

When the verification entigen group compares favorably to the entigen group, the method continues at step 840 where the processing module indicates that the initial string of second language words is valid. Alternatively, or in addition to, the processing module generates a verification string of first language words for comparison to the string of first language words using the other entigen group. The processing module indicates that the translation is valid when the verification string of first language words compares favorably (e.g., substantially the same) to the string of first language words.

Alternatively, or in addition to, the processing module identifies, for each entigen of the entigen group, a corresponding set of third language identigens to identify a plurality of sets of third language identigens. The processing module selects, for each entigen of the entigen group, a selected third language identigen from the corresponding set of third language identigens based on meaning of the entigen to produce an initial string of third language words.

When producing the initial string of third language words, the processing module may verify the initial string of third language words by interpreting the initial string of third language words or a variant, i.e., re-ordering of the words, to produce another entigen group for comparison to the entigen group produced from the first language. The processing module further generates a verification string of third language words for comparison to the string of first language words, or another string of another language words, using the other entigen group.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 14A is a schematic block diagram of another embodiment of a computing system that includes route content sources 850, the artificial intelligence (AI) server 20-1 of FIG. 1, and the transactional server 18-1 of FIG. 1. The route content sources 850 includes the content sources 16-1 through 16-N of FIG. 1. In particular, content sources associated with route information provided one or more of traffic monitor information, wrote sensor information, road condition information, construction information, accident information, public safety information, traffic camera feeds, digital short-range communication card data, navigation routing data, destination information, current routing information, social media information, newsfeeds, user activity indicators, user location information, user scheduling information, Internet of things card data, detailed weather information, etc. The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to produce a response to a query regarding determining improved route guidance.

In an example of operation of the responding to the query, the query module 124 interprets a received query request 136 to produce query requirements. The interpreting includes one or more of determining content requirements, determining source requirements, determining answer timing requirements, and identifying at least one domain associated with the query request 136. For example, the query module 124 determines the content requirements to include routing information, determines the source requirements to include the route content sources 850, determines the answer timing requirements to include a timeframe associated with the routing, and obtains as the domain when receiving the query request 136 that includes a question "is there a better [route] to [destination] from [location]?"

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over a timeframe associated with a vehicle traveling to a next interim waypoint of a plurality of waypoints that lead to a final destination, where the current route may be amended at the next interim waypoint of the query request 136 and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., facts pertaining to alternative routes) obtained from the SS memory 96.

Having produced the human expressions, the LEI module 122 applies "IEI processing" to the human expressions to produce one or more of new knowledge, a preliminary answer, and an answer quality level associated with the preliminary answer. The LEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer, and generating the answer quality level based on the preliminary answer and the request (e.g., the LEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the route content sources 850, determines the content selection requirements to include content associated with the route guidance (e.g., estimated travel times for each alternative route), and determines the content acquisition timing requirements to include a time span for collection if any (e.g., within a timeframe that it takes for a vehicle to travel to the next interim waypoint where a rerouting can be implemented).

Having produced the content requirements, the collections module 120 issues a plurality of content requests 126 to a plurality of content sources identified by the content requirements (e.g., to the content sources 16-1 through 16-N). For example, the collections module 120 identifies the plurality of content sources, generates the content requests based on the content requirements, and sends the plurality of content requests to the identified plurality of content sources.

Having issued the plurality of content requests 126, the collections module 120 interprets a plurality of content responses 128 to determine whether a response quality level is favorable. The interpreting includes analyzing the plurality of content responses 128 to produce an estimated response quality level, and indicating a favorable response quality level when the estimated response quality level compares favorably to a minimum response quality threshold level (e.g., greater than). When the response quality level is favorable, the collections module 120 issues a collections response 134 to the IEI module 122, where the collections response 134 includes further content. For example, the collections module 120 generates the collections response 134 to include the further content and the estimated response quality level, and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which indicates whether the current route is optimal and another route that is highly optimized for reducing time to destination. When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer associated with the favorable quality level of the answer.

FIG. 14B is a logic diagram of an embodiment of a method for providing an answer to a question with regards to improved route guidance within a computing system. In particular, a method is presented for use in conjunction with one or more functions and features described in conjunction with FIGS. 1-8L, 14A, and also FIG. 14B. The method includes step 860 where a processing module of one or more processing modules of one or more computing devices of the computing system interprets a received query request from a requester to produce query requirements with regards to improved route guidance. The interpreting includes one or more of determining content requirements, (e.g., to provide an improved route), determining source requirements, determining answer timing requirements, and identifying a domain associated with the query request (e.g., real-time route guidance, estimated future-time route guidance).

The method continues at step 862 where the processing module IEI processes human expressions of the received query request based on a fact base generated from previous content to produce a preliminary answer with regards to the improved route guidance. The processing may include formatting portions of the query request in accordance with formatting rules to produce recognizable human expressions of content and question information. For example, the processing module produces the question information to include a request to determine the improved route guidance (e.g., provide an alternative route with improved time to destination over a current route).

The processing further includes identifying permutations of identigens within the human expressions, reducing the permutations, mapping the reduced permutations to entigens to produce knowledge, processing the knowledge in accordance with a fact base to produce the preliminary answer, and generating an answer quality level associated with the preliminary answer. For instance, the processing module generates a relatively low answer quality level when the question relates to gathering information over a subsequent time frame such that more content must be gathered (e.g., with regards to near-term actual traffic conditions) to produce an answer associated with a higher and more favorable answer quality level (e.g., to estimate future traffic conditions that matter to a vehicle utilizing the route guidance).

When the answer quality level is unfavorable, the method continues at step 864 where the processing module generates content requirements. The generating of the content requirements includes determining, based on one or more of the query requirements, preliminary answer, and the answer quality level, one or more of content selection requirements, source selection requirements, and acquisition timing requirements.

The method continues at step 866 where the processing module obtains further content from a plurality of route guidance content sources based on the content requirements. For example, the processing module identifies the plurality of route guidance content sources, generates content requests based on the content requirements, and sends the plurality of content requests to the plurality of identified route guidance content sources, analyzes a plurality of content responses to produce an estimated quality level, indicates favorable quality level when the estimated quality level compares favorably to a minimum quality threshold level, and indicates unfavorable quality level to facilitate collecting more content when the estimated quality level compares unfavorably to the minimum quality threshold level.

The method continues at step 868 where the processing module IEI processes human expressions of the further content based on the fact base to produce an updated preliminary answer that includes the improved route guidance answer that identifies an improved route considering the current route and alternative routes based on estimations of factors that influence travel times. For example, the processing module analyzes, based on one or more of the query request, the fact base info associated with the identified domain, and the further content to produce one or more of updated fact base info (e.g., new knowledge), the updated preliminary illness diagnosis answer (e.g., likelihood of an illness), and an associated answer quality level. The analyzing may include reasoning the further content with the fact base to produce the updated fact base info and the preliminary improved route guidance answer to include the updated route.

When the updated answer quality level is favorable, the method continues at step 870 where the processing module issues a query response to the request are that predicts the likelihood of the illness. The issuing includes one or more of analyzing the preliminary illness diagnosis answers in accordance with the query requirements and the rules to generate the updated quality level, generating the query response to include the illness diagnosis answer associated with favorable quality level, and sending the query response to the requester The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 15A is a schematic block diagram of another embodiment of a computing system that includes action content sources 880, the artificial intelligence (AI) server 20-1 of FIG. 1, and the user device 12-1 of FIG. 1. The action content sources 880 includes the content sources 16-1 through 16-N of FIG. 1. In particular, the action content sources 880 provides one or more of sales records, transportation records, location information, Internet traffic, Internet traffic summaries, social media information, news outlet sources (e.g., press releases, periodicals, radial information, TV news, financial markets, etc.), etc. The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to produce a response to a query regarding detecting that an action has been invoked to produce a particular outcome.

In an example of operation of the responding to the query, the query module 124 interprets a received query request 136 to produce query requirements. The interpreting includes one or more of determining content requirements, determining source requirements, determining answer timing requirements, and identifying at least one domain associated with the query request 136. For example, the query module 124 determines the content requirements to include facts that can lead to prediction of the action, determines the source requirements to include the action content sources 880, determines the answer timing requirements to include a timeframe associated with the predicted action, and identifies a particular type of action as the domain when receiving the query request 136 that includes a question "is a predicted action alert threshold reached for [entity] causing [action, outcome]?"

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the 24 hours associated with a typical action of the query request 136 and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., facts pertaining to the action) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer, and generating the answer quality level based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the action content sources 880, determines the content selection requirements to include content associated with the action (e.g., sequences and/or chained indicators that are affiliated with the action), and determines the content acquisition timing requirements to include a time span for collection if any.

Having produced the content requirements, the collections module 120 issues a plurality of content requests 126 to a plurality of content sources identified by the content requirements (e.g., to the content sources 16-1 through 16-N). For example, the collections module 120 identifies the plurality of content sources, generates the content requests based on the content requirements, and sends the plurality of content requests to the identified plurality of content sources.

Having issued the plurality of content requests 126, the collections module 120 interprets a plurality of content responses 128 to determine whether a response quality level is favorable. The interpreting includes analyzing the plurality of content responses 128 to produce an estimated response quality level, and indicating a favorable response quality level when the estimated response quality level compares favorably to a minimum response quality threshold level (e.g., greater than). When the response quality level is favorable, the collections module 120 issues a collections response 134 to the IEI module 122, where the collections response 134 includes further content. For example, the collections module 120 generates the collections response 134 to include the further content and the estimated response quality level, and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which predicts the likelihood of the action being triggered. When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer associated with the favorable quality level of the answer.

FIG. 15B is a data flow diagram for generating a predicted action alert within a computing system, where a computing device of the computing system performs the resolve answer step 644, based on rules 316, time 702, and fact base info 600, on content that includes an estimated value and desired range for each of n conditions for each N sequences to produce preliminary answers 354. Each condition of the content describes status of an outside force that can be determined based on fact base info 600 (e.g., location, statements, detected scenarios, etc.). The computing device compares the estimated value of the condition to a desired range (e.g., minimum/maximum of a metric) associated with the condition to produce the status (e.g., probability of a factual element based on the comparison). Each sequence includes an ordered series of conditions that are estimated to have values that compare favorably to an associated desired value range to complete the sequence (e.g., ordering may be strict or flexible). The plurality of sequences may include any number of sequences to link to the occurrence.

In an example of operation, one sequence is utilized with two conditions to provide an estimated invoking of an action, where the first condition is a text message from the entity of the request, and the second condition is a detected location of the entity within a proximal location of the location of the query. The computing device obtains the content for the first and second conditions, and generates a preliminary answer 354 that indicates that the invoking of the action is detected.

FIG. 15C is a logic diagram of an embodiment of a method for generating a predicted action alert within a computing system. In particular, a method is presented for use in conjunction with one or more functions and features described in conjunction with FIGS. 1-8L, 15A-15B, and also FIG. 15C. The method includes step 890 where a processing module of one or more processing modules of one or more computing devices of the computing system interprets a received query request from a requester to produce query requirements with regards to an action and/or outcome (e.g., as a result of the action). The interpreting includes one or more of determining content requirements, (e.g., to gather conditions of sequences), determining source requirements, determining answer timing requirements, and identifying a domain associated with the query request.

The method continues at step 892 where the processing module IEI processes human expressions of the received query request based on a fact base generated from previous content to produce a preliminary action alert answer. The processing may include formatting portions of the query request in accordance with formatting rules to produce recognizable human expressions of content and question information. For example, the processing module produces the question information to include a request to determine likelihood of occurrence of an action (e.g., identifying conditions and scenarios that lead to the action or at least detection of early signs of invoking of the action). The processing may further include identifying permutations of identigens within the human expressions, reducing the permutations, mapping the reduce permutations to entigens to produce knowledge, processing the knowledge in accordance with a fact base to produce the preliminary answer, and generating an answer quality level associated with the preliminary answer. For instance, the processing module generates a relatively low answer quality level when the question relates to gathering information over a subsequent time frame such that more content must be gathered to produce an answer associated with a higher and more favorable answer quality level (e.g., start looking for values of conditions associated with scenarios to support answering the action alert question).

When the answer quality level is unfavorable, the method continues at step 894 where the processing module generates content requirements. The generating of the content requirements includes determining, based on one or more of the query requirements, preliminary answer, and the answer quality level, one or more of content selection requirements, source selection requirements, and acquisition timing requirements.

The method continues at step 896 where the processing module obtains further content from a plurality of action content sources based on the content requirements. For example, the processing module identifies the plurality of content sources, generates content requests based on the content requirements, and sends the plurality of content requests to the plurality of identified content sources, analyzes a plurality of content responses to produce an estimated quality level, indicates favorable quality level when the estimated quality level compares favorably to a minimum quality threshold level, and indicates unfavorable quality level to facilitate collective more content when the estimated quality level compares unfavorably to the minimum quality threshold level.

The method continues at step 898 where the processing module IEI processes human expressions of the further content based on the fact base to produce an updated preliminary action alert answer indicating detection of early signs of the action or clear signs of invoking of the action. For example, the processing module analyzes, based on one or more of the query request, the fact base info associated with the identified domain, and the further content to produce one or more of updated fact base info (e.g., new knowledge), the updated preliminary action alert answer (e.g., detection of action), and an associated answer quality level. The analyzing may include reasoning the further content with the fact base to produce the updated fact base info and the preliminary answer to include the action alert.

When the updated answer quality level is favorable, the method continues at step 900 where the processing module issues a query response to the request ae that includes a likelihood of the action and/or outcome. The issuing includes one or more of analyzing the preliminary answers in accordance with the query requirements and the rules to generate the updated quality level, generating the query response to include the answer associated with favorable quality level, and sending the query response to the requester The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 16A is a schematic block diagram of another embodiment of a computing system that includes author sources 910, the artificial intelligence (AI) server 20-1 of FIG. 1, and the user device 12-1 of FIG. 1. The author sources 910 includes the content sources 16-1 through 16-N of FIG. 1. In particular, the author sources 910 provides one or more of newsfeeds, social media information, press releases, information from blogs, periodical information, library information, general records, video clips, speeches, anything authored by an author, etc. The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to produce a response to a query regarding identifying authorship of a composition.

In an example of operation of the responding to the query, the query module 124 interprets a received query request 136 to produce query requirements. The interpreting includes one or more of determining content requirements, determining source requirements, determining answer timing requirements, and identifying at least one domain associated with the query request 136. For example, the query module 124 determines the content requirements to include facts that can identify authorship of a composition, determines the source requirements to include the author sources 910, determines the answer timing requirements to include a timeframe associated with the authoring, and identifies authoring as the domain when receiving the query request 136 that includes a question "who authored this [composition], or what is the likelihood that [author] created this [composition]?"

Having produced the query requirements, the query module 124 issues at least one of an IEI request 244 and a collections request 132 based on the query request 136. For example, the query module 124 generates the LEI request 244 and sends the LEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next day associated with generation of further compositions anticipated by the query request 136 and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., facts pertaining to compositions by authors including language, typical utilization of key words, style characteristics, etc.) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer, and generating the answer quality level based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the author sources 910, determines the content selection requirements to include content associated with the authors and compositions (e.g., compositions known to be composed by particular authors), and determines the content acquisition timing requirements to include a time span for collection if any (e.g., over the next day to capture further compositions associated with a handful of authors of the request).

Having produced the content requirements, the collections module 120 issues a plurality of content requests 126 to a plurality of content sources identified by the content requirements (e.g., to the content sources 16-1 through 16-N). For example, the collections module 120 identifies the plurality of content sources, generates the content requests based on the content requirements, and sends the plurality of content requests to the identified plurality of content sources.

Having issued the plurality of content requests 126, the collections module 120 interprets a plurality of content responses 128 to determine whether a response quality level is favorable. The interpreting includes analyzing the plurality of content responses 128 to produce an estimated response quality level, and indicating a favorable response quality level when the estimated response quality level compares favorably to a minimum response quality threshold level (e.g., greater than). When the response quality level is favorable, the collections module 120 issues a collections response 134 to the IEI module 122, where the collections response 134 includes further content. For example, the collections module 120 generates the collections response 134 to include the further content and the estimated response quality level, and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which predicts the likelihood that a particular author composed a particular composition or which identifies a likely candidate author that authored a particular composition of the query. When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer associated with the favorable quality level of the answer.

FIG. 16B is a data flow diagram for identifying an author within a computing system. The data flow diagram includes the IEI module 122 of FIG. 16A and fact base information 600. The fact base info 600 includes author sources 920 organized as a plurality of source A1-AN grouping stables 922. Each groupings table 922 includes multiple fields including fields for a group (GRP) identifier (ID) 586, word strings 588, identigen (IDN) string 626, and an entigen (ENI) 628. For instance, the groupings tables 922 includes word strings and identifiers associated with authorship.

As an example of operation of providing an answer to a query, the IEI module 122 interprets the IEI request 244, facilitates obtaining the fact base information 600, and generates the preliminary answer of the IEI response 246 based on the rules 316. For example, the IEI module 122 generates the preliminary answer to indicate that "[composition] likely authored by author A, when the groupings tables 922 are affiliated with relevant authorship information. For instance, the IEI module 122 indicates that the composition is likely authored by author A when the groupings tables 922 indicates that author A uses the unique word X33, the author A uses the word pattern Z1, and the author A uses language L210, when the composition includes the unique word X33, the word pattern Z1, and is written utilizing the language L210.

FIG. 16C is a logic diagram of an embodiment of a method for identifying an author within a computing system. In particular, a method is presented for use in conjunction with one or more functions and features described in conjunction with FIGS. 1-8L, 16A-16B, and also FIG. 16C. The method includes step 930 where a processing module of one or more processing modules of one or more computing devices of the computing system interprets a received query request from a requester to produce query requirements with regards to identity of an author of a composition. The interpreting includes one or more of determining content requirements, (e.g., to gather compositions and authorship information), determining source requirements, determining answer timing requirements, and identifying a domain associated with the query request.

The method continues at step 932 where the processing module IEI processes human expressions of the received query request based on a fact base generated from previous content to produce a preliminary answer with regards to the identity of an author of a composition. The processing may include formatting portions of the query request in accordance with formatting rules to produce recognizable human expressions of content and question information. For example, the processing module produces the question information to include a request to identify the author of the composition. The processing may further include identifying permutations of identigens within the human expressions, reducing the permutations, mapping the reduced permutations to entigens to produce knowledge, processing the knowledge in accordance with a fact base to produce the preliminary answer, and generating an answer quality level associated with the preliminary answer. For instance, the processing module generates a relatively low answer quality level when the question relates to gathering information over a subsequent time frame such that more content must be gathered to produce an answer associated with a higher and more favorable answer quality level (e.g., look for more compositions that fit a detected pattern of the composition associated with the query).

When the answer quality level is unfavorable, the method continues at step 934 where the processing module generates content requirements. The generating of the content requirements includes determining, based on one or more of the query requirements, preliminary answer, and the answer quality level, one or more of content selection requirements, source selection requirements, and acquisition timing requirements.

The method continues at step 936 where the processing module obtains further content from a plurality of author content sources based on the content requirements. For example, the processing module identifies the plurality of author content sources, generates content requests based on the content requirements, and sends the plurality of content requests to the plurality of identified author content sources, analyzes a plurality of content responses to produce an estimated quality level, indicates favorable quality level when the estimated quality level compares favorably to a minimum quality threshold level, and indicates unfavorable quality level to facilitate collecting more content when the estimated quality level compares unfavorably to the minimum quality threshold level.

The method continues at step 938 where the processing module IEI processes human expressions of the further content based on the fact base to produce an updated preliminary answer that indicates the identity of an author of a composition. For example, the processing module analyzes, based on one or more of the query request, the fact base info associated with the identified domain, and the further content to produce one or more of updated fact base info (e.g., new knowledge), the updated preliminary answer of authorship (e.g., identity of an author), and an associated answer quality level. The analyzing may include reasoning the further content with the fact base to produce the updated fact base info and the preliminary authorship answer to include the likelihood of the composition being authored by the identified author.

When the updated answer quality level is favorable, the method continues at step 940 where the processing module issues a query response to the request are that predicts the likelihood of the illness. The issuing includes one or more of analyzing the preliminary illness diagnosis answers in accordance with the query requirements and the rules to generate the updated quality level, generating the query response to include the illness diagnosis answer associated with favorable quality level, and sending the query response to the requester The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as ‘data’).

As may be used herein, the terms “substantially” and “approximately” provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) “configured to”, “operably coupled to”, “coupled to”, and/or “coupling” includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as “coupled to”. As may even further be used herein, the term “configured to”, “operable to”, “coupled to”, or “operably coupled to” indicates that an item includes one or more of power connections, input(s), output(s), etc., to perform, when activated, one or more its corresponding functions and may further include inferred coupling to one or more other items. As may still further be used herein, the term “associated with”, includes direct and/or indirect coupling of separate items and/or one item being embedded within another item.

As may be used herein, the term “compares favorably”, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device, the method comprises:

determining a set of identigens for each word of each phrase of a plurality of phrases of a related topic to produce a plurality of sets of identigens for each phrase, wherein each identigen of the set of identigens includes a meaning identifier, an instance identifier, and a time reference, wherein each meaning identifier associated with a particular set of identigens represents a different meaning of one or more different meanings of a corresponding word;

interpreting, based on identigen pairing rules of a knowledge database, the plurality of sets of identigens of each phrase of the plurality of phrases to determine a most likely meaning interpretation of the phrase and produce a corresponding entigen group of a plurality of entigen groups, wherein each entigen of a first entigen group of the plurality of entigen groups corresponds to a selected identigen of one of the plurality of sets of identigens having a selected meaning of the one or more different meanings of a corresponding word for a first phrase of the plurality of phrases, wherein the first entigen group represents the most likely meaning of the first phrase, wherein the plurality of entigen groups represents a plurality of most likely meanings for the plurality of phrases, wherein each entigen of the first entigen group represents a most likely meaning of a corresponding word of the first phrase, wherein each entigen of the first entigen group represents a single conceivable and perceivable thing in space and time that is independent of language and corresponds to a time reference of a corresponding selected identigen associated with the first entigen group, wherein the knowledge database includes a plurality of records that link entigens having a connected meaning, wherein each selected identigen favorably pairs with at least one corresponding sequentially adjacent identigen of an adjacent set of identigens in accordance with the identigen pairing rules;

determining an initial interpretation of the related topic based on the plurality of most likely meanings for the plurality of phrases;

generating a plurality of scores for the plurality of entigen groups based on the initial interpretation of the related topic and source information of the plurality of phrases, wherein a first score of the plurality of scores is for the first entigen group of the plurality of entigen groups;

interpreting the plurality of scores in relation to the initial interpretation to determine a confidence level of the initial interpretation by:

identifying confirming entigen groups of the plurality of entigen groups that support the initial interpretation with similar meaning;

identifying disconfirming entigen groups of the plurality of entigen groups that oppose the initial interpretation with dissimilar meaning; and determining the confidence level based on a weighting approach and scores for the confirming entigen groups and other scores for the disconfirming entigen groups by:

multiplying a first confirming score of a first confirming entigen group of the confirming entigen groups by a first confirming weighting factor of the weighting approach to produce a first confirming intermediate confidence level, multiplying a first disconfirming score of a first disconfirming entigen group of the disconfirming entigen groups by a first disconfirming weighting factor of the weighting approach to produce a first disconfirming intermediate confidence level, and aggregating the first confirming intermediate confidence level and the first disconfirming intermediate confidence level to produce the confidence level;

determining that the confidence level of the initial interpretation is greater than a confidence threshold;

indicating that the initial interpretation is reliable; and storing a representation of the initial interpretation in the knowledge database as curated knowledge.

2. The method of claim 1 further comprises:

when the confidence level of the initial interpretation is greater than the confidence threshold, facilitating:

storing at least some of the plurality of entigen groups in the knowledge database as further curated knowledge; and when the confidence level of the initial interpretation is less than the confidence threshold, facilitating:

generating an updated plurality of entigen groups from an updated plurality of phrases, wherein the updated plurality of entigen groups represents a plurality of most likely meanings for the updated plurality of phrases, wherein the updated plurality of phrases is of the related topic;

generating an updated plurality of scores for the updated plurality of entigen groups based on the initial interpretation of the related topic and updated source information of the updated plurality of phrases, wherein a first score of the updated plurality of scores is for a first entigen group of the updated plurality of entigen groups;

interpreting the updated plurality of scores in relation to the initial interpretation to determine an updated confidence level of the initial interpretation; and when the updated confidence level of the initial interpretation is greater than the confidence threshold, indicating that the initial interpretation is reliable.

3. The method of claim 1, wherein the determining the initial interpretation of the related topic based on the plurality of most likely meanings for the plurality of phrases comprises at least one of:

identifying a most frequent most likely meaning of the plurality of most likely meanings for the plurality of phrases as the initial interpretation;

identifying an entigen group associated with the most frequent most likely meaning of the plurality of most likely meanings for the plurality of phrases as the initial interpretation; and identifying an entigen group associated with a most likely meaning that matches a search phrase as the initial interpretation.

4. The method of claim 1, wherein the generating the plurality of scores for the plurality of entigen groups based on the initial interpretation of the related topic and source information of the plurality of phrases comprises one or more of:

determining a reliability score for the first entigen group based on a reliability level of a first source associated with the first phrase that is utilized to generate the first entigen group;

determining an aging score for the first entigen group based on an age of the first phrase;

determining an alignment score for the first entigen group based on alignment with the initial interpretation, wherein an alignment score for a confirming alignment is greater than an alignment score for a disconfirming alignment; and determining the first score for the first entigen group based on a weighting approach and the reliability score for the first entigen group, the aging score for the first entigen group, and the alignment score for the first entigen group.

5. A computing device of a computing system, the computing device comprises:

an interface;

a local memory; and a processing module operably coupled to the interface and the local memory, wherein the processing module functions to:

determine a set of identigens for each word of each phrase of a plurality of phrases of a related topic to produce a plurality of sets of identigens for each phrase, wherein each identigen of the set of identigens includes a meaning identifier, an instance identifier, and a time reference, wherein each meaning identifier associated with a particular set of identigens represents a different meaning of one or more different meanings of a corresponding word;

interpret, based on identigen pairing rules of a knowledge database, the plurality of sets of identigens of each phrase of the plurality of phrases to determine a most likely meaning interpretation of the phrase and produce a corresponding entigen group of a plurality of entigen groups, wherein each entigen of a first entigen group of the plurality of entigen groups corresponds to a selected identigen of one of the plurality of sets of identigens having a selected meaning of the one or more different meanings of a corresponding word for a first phrase of the plurality of phrases, wherein the first entigen group represents the most likely meaning of the first phrase, wherein the plurality of entigen groups represents a plurality of most likely meanings for the plurality of phrases, wherein each entigen of the first entigen group represents a most likely meaning of a corresponding word of the first phrase, wherein each entigen of the first entigen group represents a single conceivable and perceivable thing in space and time that is independent of language and corresponds to a time reference of a corresponding selected identigen associated with the first entigen group, wherein the knowledge database includes a plurality of records that link entigens having a connected meaning, wherein each selected identigen favorably pairs with at least one corresponding sequentially adjacent identigen of an adjacent set of identigens in accordance with the identigen pairing rules;

determine an initial interpretation of the related topic based on the plurality of most likely meanings for the plurality of phrases;

generate a plurality of scores for the plurality of entigen groups based on the initial interpretation of the related topic and source information of the plurality of phrases, wherein a first score of the plurality of scores is for the first entigen group of the plurality of entigen groups;

interpret the plurality of scores in relation to the initial interpretation to determine a confidence level of the initial interpretation by:

identifying confirming entigen groups of the plurality of entigen group that support the initial interpretation with similar meaning;

identifying disconfirming entigen groups of the plurality of entigen groups that oppose the initial interpretation with dissimilar meaning; and determining the confidence level based on a weighting approach and scores for the confirming entigen groups and other scores for the disconfirming entigen groups by:

multiplying a first confirming score of a first confirming entigen group of the confirming entigen groups by a first confirming weighting factor of the weighting approach to produce a first confirming intermediate confidence level, multiplying a first disconfirming score of a first disconfirming entigen group of the disconfirming entigen groups by a first disconfirming weighting factor of the weighting approach to produce a first disconfirming intermediate confidence level, and aggregating the first confirming intermediate confidence level and the first disconfirming intermediate confidence level to produce the confidence level;

determine that the confidence level of the initial interpretation is greater than a confidence threshold;

indicate that the initial interpretation is reliable; and store, via the interface, a representation of the initial interpretation in the knowledge database as curated knowledge.

6. The computing device of claim 5, wherein the processing module further functions to:

when the confidence level of the initial interpretation is greater than the confidence threshold, facilitate:

storing, via the interface, at least some of the plurality of entigen groups in the knowledge database as further curated knowledge; and when the confidence level of the initial interpretation is less than the confidence threshold, facilitate one or more of:

generating an updated plurality of entigen groups from an updated plurality of phrases, wherein the updated plurality of entigen groups represents a plurality of most likely meanings for the updated plurality of phrases, wherein the updated plurality of phrases is of the related topic;

generating an updated plurality of scores for the updated plurality of entigen groups based on the initial interpretation of the related topic and updated source information of the updated plurality of phrases, wherein a first score of the updated plurality of scores is for a first entigen group of the updated plurality of entigen groups;

interpreting the updated plurality of scores in relation to the initial interpretation to determine an updated confidence level of the initial interpretation; and when the updated confidence level of the initial interpretation is greater than the confidence threshold, indicating that the initial interpretation is reliable.

7. The computing device of claim 5, wherein the processing module functions to determine the initial interpretation of the related topic based on the plurality of most likely meanings for the plurality of phrases by at least one of:

identifying a most frequent most likely meaning of the plurality of most likely meanings for the plurality of phrases as the initial interpretation;

identifying an entigen group associated with the most frequent most likely meaning of the plurality of most likely meanings for the plurality of phrases as the initial interpretation; and identifying an entigen group associated with a most likely meaning that matches a search phrase as the initial interpretation.

8. The computing device of claim 5, wherein the processing module functions to generate the plurality of scores for the plurality of entigen groups based on the initial interpretation of the related topic and source information of the plurality of phrases by one or more of:

determining a reliability score for the first entigen group based on a reliability level of a first source associated with the first phrase that is utilized to generate the first entigen group;

determining an aging score for the first entigen group based on an age of the first phrase;

determining an alignment score for the first entigen group based on alignment with the initial interpretation, wherein an alignment score for a confirming alignment is greater than an alignment score for a disconfirming alignment; and determining the first score for the first entigen group based on a weighting approach and the reliability score for the first entigen group, the aging score for the first entigen group, and the alignment score for the first entigen group.

9. A computer readable memory comprises:

a first memory element that stores operational instructions that, when executed by a processing module, causes the processing module to:

determine a set of identigens for each word of each phrase of a plurality of phrases of a related topic to produce a plurality of sets of identigens for each phrase, wherein each identigen of the set of identigens includes a meaning identifier, an instance identifier, and a time reference, wherein each meaning identifier associated with a particular set of identigens represents a different meaning of one or more different meanings of a corresponding word; and interpret, based on identigen pairing rules of a knowledge database, the plurality of sets of identigens of each phrase of the plurality of phrases to determine a most likely meaning interpretation of the phrase and produce a corresponding entigen group of a plurality of entigen groups, wherein each entigen of a first entigen group of the plurality of entigen groups corresponds to a selected identigen of one of the plurality of sets of identigens having a selected meaning of the one or more different meanings of a corresponding word for a first phrase of the plurality of phrases, wherein the first entigen group represents the most likely meaning of the first phrase, wherein the plurality of entigen groups represents a plurality of most likely meanings for the plurality of phrases, wherein each entigen of the first entigen group represents a most likely meaning of a corresponding word of the first phrase, wherein each entigen of the first entigen group represents a single conceivable and perceivable thing in space and time that is independent of language and corresponds to a time reference of a corresponding selected identigen associated with the first entigen group, wherein the knowledge database includes a plurality of records that link entigens having a connected meaning, wherein each selected identigen favorably pairs with at least one corresponding sequentially adjacent identigen of an adjacent set of identigens in accordance with the identigen pairing rules;

a second memory element that stores operational instructions that, when executed by the processing module, causes the processing module to:

determine an initial interpretation of the related topic based on the plurality of most likely meanings for the plurality of phrases;

a third memory element that stores operational instructions that, when executed by the processing module, causes the processing module to:

generate a plurality of scores for the plurality of entigen groups based on the initial interpretation of the related topic and source information of the plurality of phrases, wherein a first score of the plurality of scores is for the first entigen group of the plurality of entigen groups; and a fourth memory element that stores operational instructions that, when executed by the processing module, causes the processing module to:

interpret the plurality of scores in relation to the initial interpretation to determine a confidence level of the initial interpretation by:

identifying confirming entigen groups of the plurality of entigen groups that support the initial interpretation with similar meaning;

identifying disconfirming entigen groups of the plurality of entigen groups that oppose the initial interpretation with dissimilar meaning; and determining the confidence level based on a weighting approach and scores for the confirming entigen groups and other scores for the disconfirming entigen groups by:

multiplying a first confirming score of a first confirming entigen group of the confirming entigen groups by a first confirming weighting factor of the weighting approach to produce a first confirming intermediate confidence level, multiplying a first disconfirming score of a first disconfirming entigen group of the disconfirming entigen groups by a first disconfirming weighting factor of the weighting approach to produce a first disconfirming intermediate confidence level, and aggregating the first confirming intermediate confidence level and the first disconfirming intermediate confidence level to produce the confidence level;

determine that the confidence level of the initial interpretation is greater than a confidence threshold;

indicate that the initial interpretation is reliable; and store a representation of the initial interpretation in the knowledge database as curated knowledge.

10. The computer readable memory of claim 9 further comprises:

the fourth memory element further stores operational instructions that, when executed by the processing module, causes the processing module to:

when the confidence level of the initial interpretation is greater than the confidence threshold, facilitate:

storing at least some of the plurality of entigen groups in the knowledge database as further curated knowledge; and when the confidence level of the initial interpretation is less than the confidence threshold, facilitate one or more of:

generating an updated plurality of entigen groups from an updated plurality of phrases, wherein the updated plurality of entigen groups represents a plurality of most likely meanings for the updated plurality of phrases, wherein the updated plurality of phrases is of the related topic;

generating an updated plurality of scores for the updated plurality of entigen groups based on the initial interpretation of the related topic and updated source information of the updated plurality of phrases, wherein a first score of the updated plurality of scores is for a first entigen group of the updated plurality of entigen groups;

interpreting the updated plurality of scores in relation to the initial interpretation to determine an updated confidence level of the initial interpretation; and when the updated confidence level of the initial interpretation is greater than the confidence threshold, indicating that the initial interpretation is reliable.

11. The computer readable memory of claim 9, wherein the processing module functions to determine the initial interpretation of the related topic based on the plurality of most likely meanings for the plurality of phrases by at least one of:

identifying a most frequent most likely meaning of the plurality of most likely meanings for the plurality of phrases as the initial interpretation;

identifying an entigen group associated with the most frequent most likely meaning of the plurality of most likely meanings for the plurality of phrases as the initial interpretation; and identifying an entigen group associated with a most likely meaning that matches a search phrase as the initial interpretation.

12. The computer readable memory of claim 9, wherein the processing module functions to generate the plurality of scores for the plurality of entigen groups based on the initial interpretation of the related topic and source information of the plurality of phrases by one or more of:

determining a reliability score for the first entigen group based on a reliability level of a first source associated with the first phrase that is utilized to generate the first entigen group;

determining an aging score for the first entigen group based on an age of the first phrase;

determining an alignment score for the first entigen group based on alignment with the initial interpretation, wherein an alignment score for a confirming alignment is greater than an alignment score for a disconfirming alignment; and determining the first score for the first entigen group based on a weighting approach and the reliability score for the first entigen group, the aging score for the first entigen group, and the alignment score for the first entigen group.

* * * * *